(12) United States Patent
Kobylarz

(10) Patent No.: US 8,577,344 B2
(45) Date of Patent: *Nov. 5, 2013

(54) APPLICATION OF THE INVOKE FACILITY SERVICE TO RESTRICT INVOCATION OF COMPOUND WIRELESS MOBILE COMMUNICATION SERVICES

(76) Inventor: Thaddeus John Kobylarz, Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/506,339

(22) Filed: Apr. 13, 2012

(65) Prior Publication Data

US 2012/0220276 A1   Aug. 30, 2012

Related U.S. Application Data

(63) Continuation of application No. 12/931,172, filed on Jan. 27, 2011.

(60) Provisional application No. 61/338,080, filed on Feb. 16, 2010.

(51) Int. Cl.
*H04M 3/42* (2006.01)

(52) U.S. Cl.
USPC ........ 455/414.1; 455/418; 455/419; 455/420; 455/466; 455/550.1; 455/566; 455/556.2; 379/93.23; 379/93.24; 705/39

(58) Field of Classification Search
USPC ........... 455/414.1, 418–420, 466, 550.1, 566, 455/556.2; 379/93.23, 93.24; 705/39
See application file for complete search history.

(56) References Cited

U.S. PATENT DOCUMENTS

| | | | |
|---|---|---|---|
| 7,076,255 B2 * | 7/2006 | Parupudi et al. | 455/456.1 |
| 7,376,909 B1 * | 5/2008 | Coyle | 715/778 |
| 7,908,211 B1 * | 3/2011 | Chen et al. | 705/39 |
| 2008/0059060 A1 * | 3/2008 | Irish et al. | 701/207 |

* cited by examiner

*Primary Examiner* — Steve D Agosta

(57) ABSTRACT

This invention provides a mechanism for enhancing safe use of wireless mobile terminals (smartphones) in a moving vehicle. The Invoke facility service's Boolean expression controls the conditions which invoke smartphone apps into execution. Smartphone apps, which are dangerous to execute in a moving vehicle, are prevented from invocation. Elimination of all smartphone apps in moving vehicles is inadvisable. An app, deploying an accelerometer to sense the impact of a serious collision to call "911" with a recorded message and provides the vehicle's GPS location, is an example. This invention allows an app builder to select invocation conditions for apps. Significant is the use manner of the operation "Not". The contradiction of an event is also an event meaning that if an event is false, its contradictory event is true. Another important aspect is the conjunctive operation "And Then". This operation implies an efficient algorithm to evaluate Boolean expressions.

10 Claims, 27 Drawing Sheets

| # | Event Type ← 16 | Description | Contradictory Event |
|---|---|---|---|
| 1 | Displayed app selection | Wireless mobile terminal user scrolls through displayed list to select app. | Test of app selection is "False" |
| 2 | Manual app selection | Wireless mobile terminal user types name of or depresses a dedicated key for the selected app. | Test of app selection is "False" |
| 3 | Voice app selection | User speaks name of an app to voice recognition Wireless mobile terminal. | Test of app selection is "False" |
| 4 | Voice command | A spoken voice command matches a recorded audio command pattern. | Test of voice command is "False" |
| 5 | Audio recognition | A received or transmitted audio signal matches a Wireless mobile terminal stored audio pattern and may include the signal's minimum intensity and minimum time duration as event criteria. | Test of audio signal is "False" |
| 6 | Video recognition | A received or transmitted video signal matches a Wireless mobile terminal stored video pattern and may include the signal's minimum intensity and minimum time duration as event criteria. | Test of video signal is "False" |
| 7 | Temporal range | A range of time (start time, end time) specified as any combination pair of seconds, minutes, hours, days, months, years | Test of temporal range is "False" |
| 8 | Repeated Temporal range | A range of time (start time, end time) that is repeated and can be specified as any combination of time of a day, days of a week, weeks of a month, months of a year. | Test of repeated temporal range is "False" |
| 9 | Wireless mobile terminal in a planar spatial range | A range of planar space (polygonal or circular). A polygon is identified by a set of geographic points that forms a closed figure in a plane. A circular plane is identified by a center and a radius. | Test of wireless mobile terminal in a planar spatial range is "False" |
| 10 | Wireless mobile terminal in a detector defined planar spatial range | A range of planar space as defined by the apparatus that detects the Wireless mobile terminal location. | Test of wireless mobile terminal in a detector defined planar spatial range is "False" |
| 11 | Wireless mobile terminal in a volume spatial range | A range of space volume (polyhedron or sphere). A polyhedron with a polygon base and sides that converge to a point above (below) the polygon's plane or a frustum of this configuration. A spherical volume is identified by a center and a radius. | Test of wireless mobile terminal in a volume spatial range is "False" |
| 12 | Wireless mobile terminal in a detector defined volume spatial range | A range of space volume defined by the apparatus that detects the Wireless mobile terminal location. | Test of wireless mobile terminal in a detector defined volume spatial range is "False" |
| 13 | Wireless mobile terminal in a specific location | A specifically identified location such as a resting/storage cradle for the Wireless mobile terminal, perhaps in a vehicle. | Test of wireless mobile terminal in a specific location is "False" |
| 14 | An electro-mechanical system status data | Sensors within a Wireless mobile terminal detect the status data from an electro-mechanical system. | Test of received electro-mechanical system status data is "False" |
| 15 | Remote app command | A remote signal is an event for the invocation of an app. | Test of remote app command is "False" |

FIG. 1

Polyhedron construction algorithm for: $((x_1, y_1), (x_2, y_2), (x_3, y_3), \ldots, (x_n, y_n), (x_c, y_c, z_c, z_f))$
Step 1 to 2n
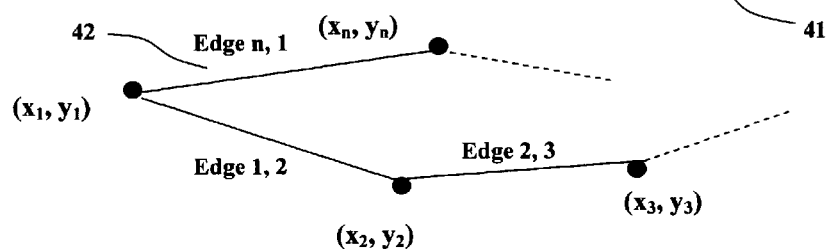
Step 2n+1
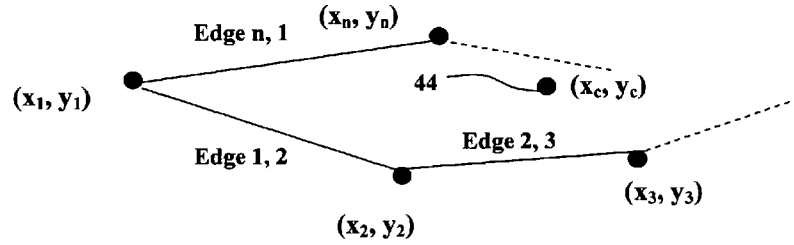
Step 3n+2
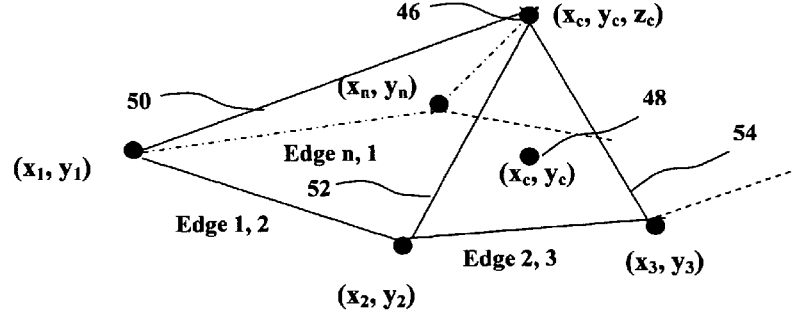
Step 4n+4
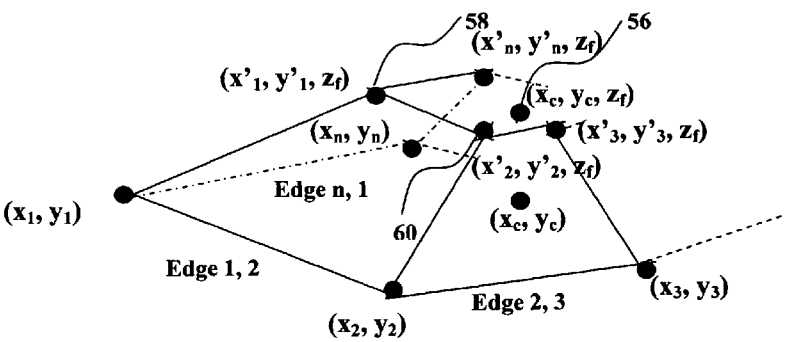
FIG. 3

{*AppVoiceCommand* And Then ((Not *DriverVoice*) Or (Not *VehicleMoving*))}

| AppVoiceCommand | Not DriverVoice | Not VehicleMoving | Boolean Expression |
|---|---|---|---|
| True | True | True | True |
| True | True | False | True |
| True | False | True | True |
| True | False | False | False |
| False | True | True | False |
| False | True | False | False |
| False | False | True | False |
| False | False | False | False |

FIG. 18

| PrecedingExpression | FollowingExpression | PrecedingExpression And FollowingExpression | PrecedingExpression And Then FollowingExpression | If PrecedingExpression Then FollowingExpression |
|---|---|---|---|---|
| True | True | True | True | True |
| True | False | False | False | False |
| False | True | False | False | True |
| False | False | False | False | True |

{AppVoiceCommand And Then ((Not EngineRunning) Or (InCradle And ((Not VehicleMoving) Or (Not DriverVoice))))}
                                                        ↑
                                                       324

| AppVoiceCommand | Not EngineRunning | InCradle | Not VehicleMoving | Not DriverVoice | Boolean Expression |
|---|---|---|---|---|---|
| True | True | True / False | True / False | True / False | True |
| True | False | True | True | False | True |
| True | False | True | False | True | True |
| True | False | True | True | True | True |
| For all other event value combinations (21 more rows) | | | | | False |

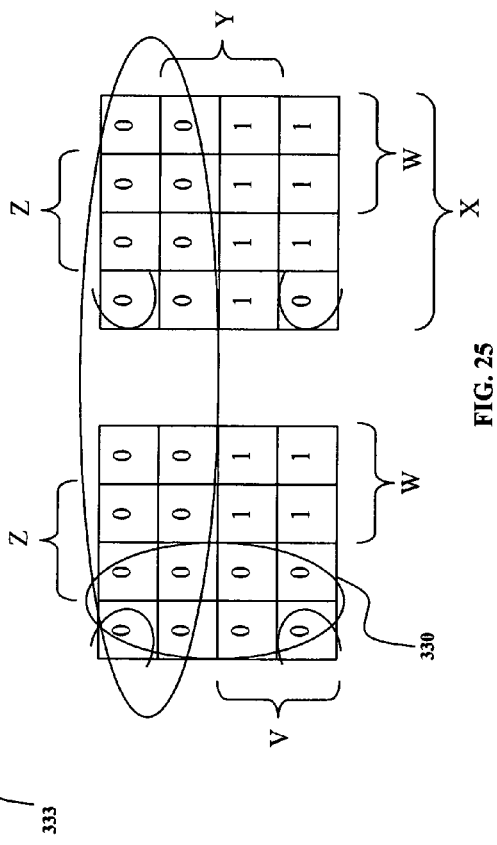

FIG. 25

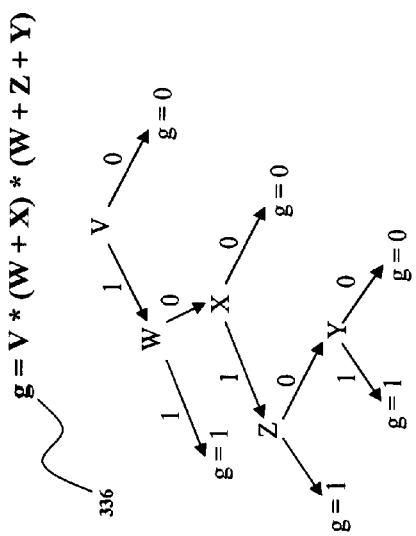

FIG. 26

| AppVoiceCommand | Not EngineRunning | Not VehicleMoving | Not DriverVoice | Boolean Expression |
|---|---|---|---|---|
| True | True | True | True | True |
| True | True | True | False | True |
| True | True | False | True | True |
| True | False | True | True | True |
| True | False | True | False | True |
| True | False | False | True | True |
| | For all other event value combinations (9 more rows) | | | False |

{AppVoiceCommand And Then ((Not EngineRunning) Or (Not VehicleMoving) Or (Not DriverVoice))}

FIG. 27

{*AppVoiceCommand* And Then ((Not *EngineRunning*) Or (Not *VehicleMoving*) Or (Not *DriverVoice*))}

$g = V * (W + Y + Z)$ — 345

| {*AppVoiceCommand* And Then (Not *EngineRunning*)} — 348 | | |
|---|---|---|
| *AppVoiceCommand* | Not *EngineRunning* | Boolean Expression |
| True | True | True |
| True | False | False |
| False | True | False |
| False | False | False |

{*ManufacturerDefault* And Then (Not *EngineRunning*)} — 351

| *ManufacturerDefault* | Not *EngineRunning* | Boolean Expression |
|---|---|---|
| True | True | True |
| True | False | False |
| False | True | False |
| False | False | False |

FIG. 30

{*AppVoiceCommand* And Then (Not *VehicleMoving*)} — 354

| *AppVoiceCommand* | Not *VehicleMoving* | Boolean Expression |
|---|---|---|
| True | True | True |
| True | False | False |
| False | True | False |
| False | False | False |

FIG. 31

{*ManufacturerDefault* And Then (Not *VehicleMoving*)} ~ 357

| *ManufacturerDefault* | Not *VehicleMoving* | Boolean Expression |
|---|---|---|
| True | True | True |
| True | False | False |
| False | True | False |
| False | False | False |

FIG. 32

APPLICATION OF THE INVOKE FACILITY SERVICE TO RESTRICT INVOCATION OF COMPOUND WIRELESS MOBILE COMMUNICATION SERVICES

CROSS-REFERENCE TO RELATED APPLICATIONS

This application is a continuation of prior application Ser. No. 12/931,172, filed Jan. 27, 2011, the priority of which is hereby claimed. The prior United States Patent Application is entitled "Invoke facility service and its applications to compound wireless mobile communication services" and has publication number 20110201318. The United States Provisional Application "The invoke facility service and its applications to compound wireless mobile communication services" (No. 61/338,080), provides a basis for both of these applications.

STATEMENT REGARDING FEDERALLY SPONSORED RESEARCH OR DEVELOPMENT

Not Applicable.

REFERENCE TO SEQUENCE LISTING, A TABLE, OR A COMPUTER LISTING COMPACT DISC APPENDIX

Not Applicable.

BACKGROUND OF THE INVENTION

This invention is an extension to the invention entitled "Compound wireless mobile communication services", U.S. Pat. No. 7,424,292 and the U.S. Provisional application for Patent 60/454,412 entitled "Creation of compound wireless mobile services from fundamental wireless services".

In the U.S. Pat. No. 7,424,292 and the U.S. Provisional application for Patent 60/454,412, Kobylarz teaches the concept, processes, and methods to graphically combine, by means of an interactive graphical compiler, an assortment of individually available and executable wireless mobile communication services for the purpose of achieving a desired objective(s). Once combined, these individual services represent an executable sequence that can be appropriately stored in the memory of a communications terminal for future invocations by a user/subscriber. That is, a single invocation of the built service combination will execute the sequence of services whenever desired by a user/subscriber.

A combined wireless mobile communication service is identified as a compound wireless mobile communication service (abbreviated CWS for the diminutive identification Compound Wireless Service). The generic identifier of the services being combined is "component service" (CS). A CS can be one of three service types: a facility service, another CWS (recursive property), or a Fundamental Wireless mobile communication Service (FWS). The distinctions among the three service types is that: (1) facility services are not in themselves wireless mobile communication services, but essential for properly executing a compound wireless mobile communication service (e.g., invoke the execution of a CWS, determine if equality exists between two parameter values), (2) a CWS can have within it components that are themselves CWS, and (3) FWS represent the basic kernels upon which a CWS is formed (e.g., dial a telephone number, send a text message). It is possible to decompose a CWS into its components. If a component is a CWS, then it too can be decomposed into finer components. This successive decomposition terminates when only facility services and FWS exist.

The patent also invented an interactive graphical compiler to "compile a compound wireless mobile communication service for a wireless mobile terminal" and the compiled CWS is executed within the wireless mobile terminal upon invocation. Either a wireless mobile terminal or a computer is used to build compound wireless mobile communication services. Because of its greater computational power, the building facilities are much more extensive with a computer. Consequently, a wireless mobile terminal is used to build less complex CWS or to modify those built on a computer. When a CWS is built and compiled on a computer, the compiled CWS must be down-loaded to the wireless mobile terminal for the execution of the CWS.

The above work on wireless communication services had its origin in the year 2003. Of late, much interest and progress has been made in the area of wireless communication services. A disparity of nomenclature exists between this latter work and that described in the aforementioned patent and patent applications. Although this invention will preserve original nomenclature, the latter terminology will, at times, be used and an association needs to be made. The term wireless mobile terminal is today usually known as a "smartphone" or "(wireless) tablet", which has apps to provide service capabilities. Compound wireless services (CWSs) are intended to provide service capabilities on smartphones, wireless tablets, or any other type of wireless mobile terminal. That is, a CWS is a special type of smartphone app, or tablet app, or any other type of wireless mobile terminal app. The term "wireless mobile terminal" will be preserved with the understanding that it represents a smartphone, or tablet, or any other wireless mobile terminal. The use of "CWS" will be appended to appear as "CWS app" to remind one of having the same purpose, as a conventional app, of providing wireless service capabilities. There exist important distinctions between a CWS app and a conventional app. A notable distinction is the manner in which the two types of apps are built. A conventional app is built in the traditional way of textual line coding using a higher level language. The higher level code is afterwards translated by a compiler into a machine language that is appropriate for a wireless mobile terminal's software platform and thereby executable by the wireless mobile terminal. A CWS app is built graphically, using an interactive graphical compiler that conducts dialog with the CWS builder. The CWS graph is translated by the interactive graphical compiler into machine code for downloading to a wireless mobile terminal for later execution. An important feature of a CWS app is its recursive capability; i.e., the reuse of a CWS app as a Component Service (CS) within another CWS app. It is the close association of ordinary language with the algorithms for building a CWS app and the interactive relationship between the interactive graphical compiler and the builder that avails CWS app recursion. Recursion is not a natural attribute of conventional apps. Another CWS app attribute is derived from the close association of ordinary language with the CWS app building algorithms and the graphical build process. Building a CWS app is intuitive. No formal training in computer programming is needed to build a CWS app. Simplicity is not a feature when using line coding to build conventional apps.

This application for patent is a continuation of the patent application Ser. No. 12/931,172 and its basis, the U.S. Provisional Application No. 61/338,080). These prior applications invented a facility service ascribed the name of Invoke. The purpose of Invoke is to detect the events needed for a CWS app execution to commence and then initiate (or invoke) the CWS app execution. The events represent variables within a Boolean expression parameter of an Invoke facility service. Boolean expression parameters allow Invoke to be very versatile with respect to the possible combination of events for CWS app invocation. Versatility is enhanced by the wide variety of events that are recognized; e.g., entering a geographical location, recognizing an audio signal, reaching a time of day, observing a specific caller ID.

The use of a Boolean expression to accompany an Invoke facility service is at the discretion of a CWS app builder. If no Boolean expression exists, a default event is used for invocation; e.g., selecting a CWS app from a displayed list. A default event is at the discretion of the wireless service provider and implemented by the wireless mobile terminal manufacturer.

The Invoke facility service contains other parameters useful for CWS app invocation. For example, CWS app password protection, CWS app initialization of constants and variables, linkage to other CWS apps to acquire data.

BRIEF SUMMARY OF THE INVENTION

An important feature of the Invoke facility service is its capability of general deployment. It can be compatible with an app in any wireless mobile terminal, regardless of the wireless mobile terminal's platform (e.g., Android, iOS, webOS, Blackberry OS, and Windows Phone). This arises from the fact that a CWS is built from Component Services (CS) that may be Fundamental Wireless Services (FWS), facility services, and/or CWS themselves (recursive feature). The FWS and the facility services are built in a conventional manner; i.e., they are line coded in a high level language such as C++, Java, and HTML. Hence, any conventional app can be made into a FWS. By deploying a common platform for the wireless mobile terminal app and the Invoke facility service, the two can be made compatible. The CWS graphical building software, which is platform independent, can be used the same as for any other CS to build a more elaborate CWS. The more elaborate CWS would constitute an Invoke facility service for the conventional app's invocation. Although an Invoke facility service is generally applicable to any app by employing the above procedure, the term CWS app will be henceforth used. The term CWS app is intended to connote the concatenation of the Invoke facility service to any app to form a CWS.

The National Transportation Safety Board called for a ban on all wireless mobile terminal use by vehicle drivers. This was based on a decade of investigations into distraction related accidents. Concern has been heightened by increasingly powerful smartphones that people can use to e-mail, watch movies, and play games. A complete ban on wireless mobile terminal use by vehicle drivers would have enormous impact that results in negative, as well as positive consequences. Laws that totally prohibit use of wireless mobile terminals in automobiles will eliminate some potentially life saving communication availed with wireless mobile terminals. For example, a CWS app that deploys an accelerometer to sense the impact of serious vehicle's collision, which thereby calls "911" to transmit a recorded message and a GPS location, should be allowed to execute when a vehicle is moving. A CWS app that calls for an ambulance when an injurious vehicular accident had occurred can save a life. Limiting wireless mobile terminal commercial usage in vehicles can erode/interfere with business profits; e.g., communicating with a delivery vehicle to pick-up an unscheduled shipment from a customer. Wireless mobile terminal usage is an important "quality of life" consideration; e.g., being able to place a call when encountering a traffic delay.

This invention provides the means for utilizing the Invoke facility service in order to apply invocation restrictions to a wireless mobile terminal CWS app, so that the National Transportation Safety Board concerns can be allayed, while simultaneously availing wireless mobile terminal CWS apps that enhance safety and wireless mobile terminal CWS apps that are crucial to commerce. Additionally, polls show that, even when prohibited by laws, many people continue to use their wireless mobile terminals behind the wheel. The Invoke facility service can be used to restrict this behavior whenever extremely dangerous conditions can result.

Most significant and pertinent to the invention described herein is that the operation "Not" exists for Boolean algebra. Whereas conventional apps are invoked by a positive assertion of an event (the usual event constituting the action of pointing to an iconic representation of an app in a scrolled list) the use of the operation "Not" avails negative assertions in the Boolean expression of an Invoke facility service. Also relevant is that an event can contain the operation "Not". Consider the event "vehicle is parked". An equivalent event is "Not vehicle moving". Observe that if "vehicle is parked" is "True", then "Not vehicle moving" is concurrently "True". That is, "vehicle is parked" and "Not vehicle moving" can be considered to concurrently occur.

For this invention, the contradiction of an event is also an event. For example; the event "vehicle moving" has the contradiction "Not vehicle moving" which is also an event. The words "contradiction" and "contradictory" will be utilized in the following sense. Assertions that are contradictory (or contradictions) can neither simultaneously be "True" nor simultaneously be "False". If the test of an event "E" indicates that it has occurred (i.e., is "True"), then the event "Not E" has not occurred (i.e., is "False"). Conversely, if the test of an event "E" indicates that it has not occurred (i.e., is "False"), then the event "Not E" has occurred (i.e., is "True"). Considering an event and its contradiction to both be events is pertinent and significant to this invention, in that this consideration plays an important role in the algorithms to evaluate a Boolean expression.

BRIEF DESCRIPTION OF THE SEVERAL VIEWS OF THE DRAWING

FIG. 1 names types of events, describes them, and identifies their contradictions.

FIG. 3 illustrates an algorithm to construct polyhedrons.

FIG. 18 presents the truth table for the Boolean expression {AppVoiceCommand And Then ((Not Driver Voice) Or (Not VehicleMoving))}.

FIG. 19 presents truth tables to indicate distinctions among And, And Then, and If . . . , Then.

$$g = X_1 X_2 X_3 + X_1 X'_3 X_4 + X_1 X_2 X'_3 X'_2 X'_3 X_4 + X_1 X'_3 X'_4 + X_2 X'_3 X_4.$$

Figure 21:
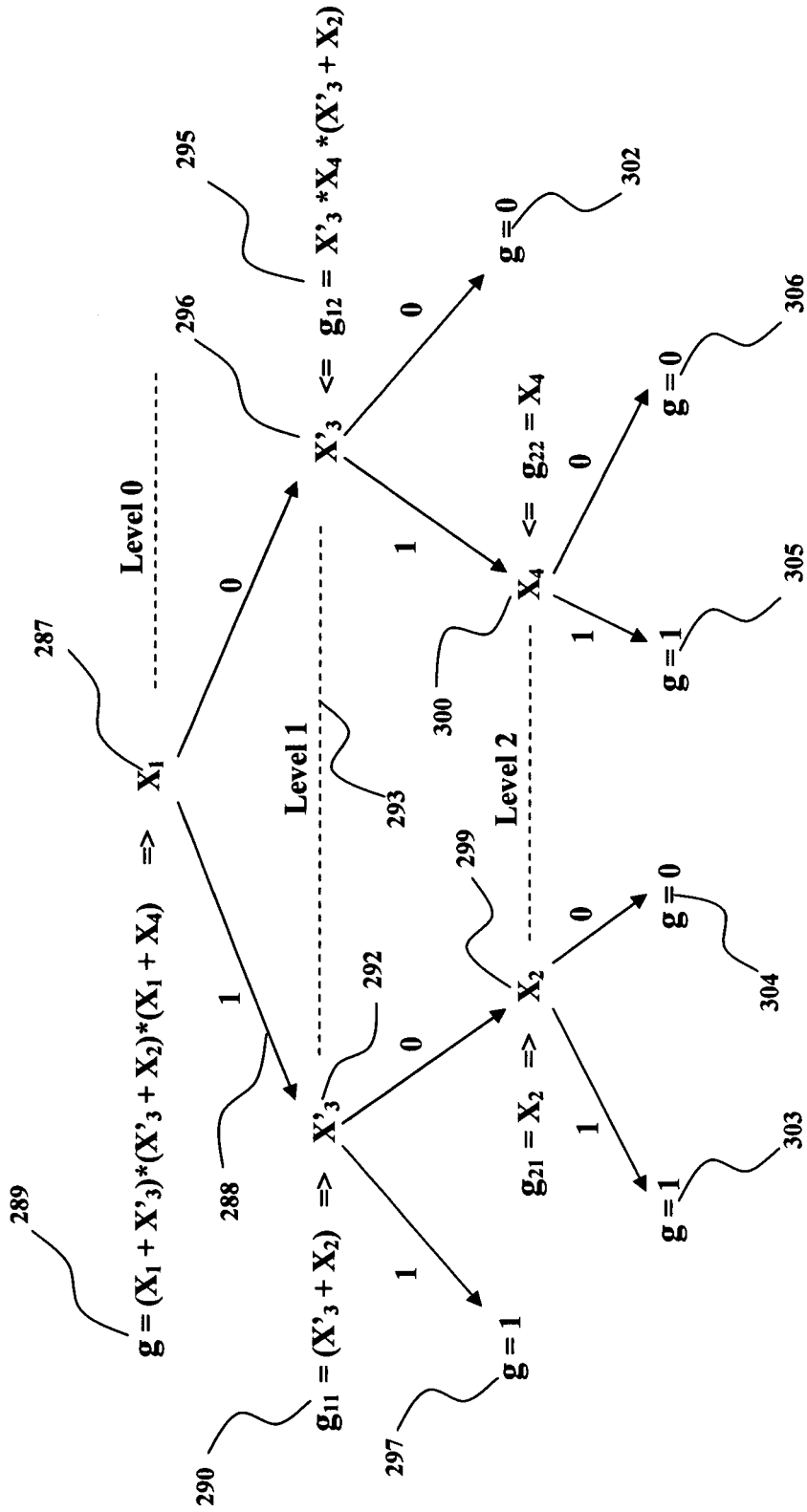

FIG. 21 illustrates an example application of the two algorithms to generate a Boolean expression's event test paths.

Figure 22:
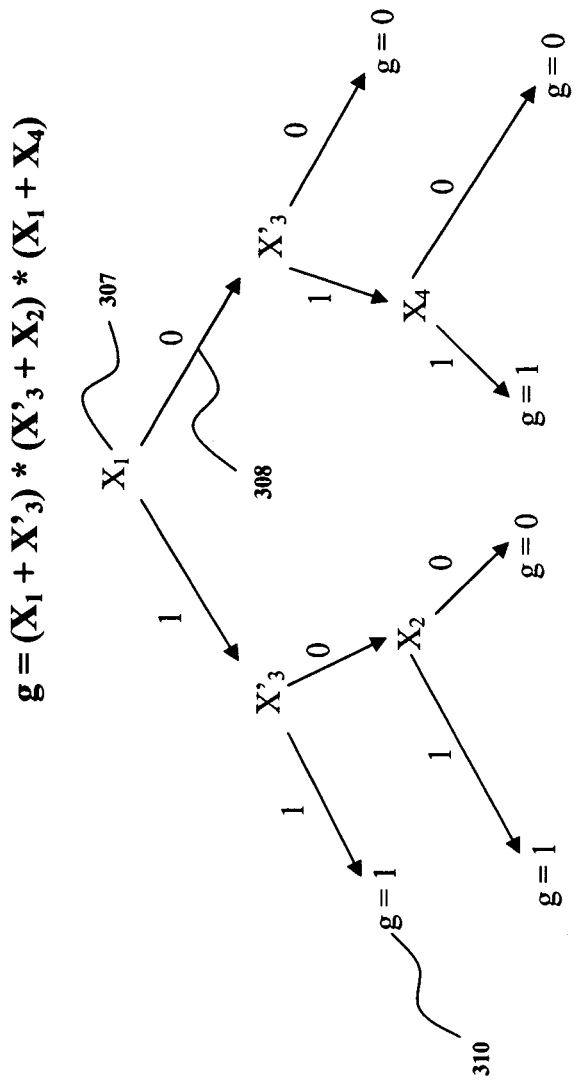

FIG. 22 illustrates the event test paths for $g=(X_1+X'_3)*(X'_3+X_2)*(X_1+X_4)$.

Figure 23:
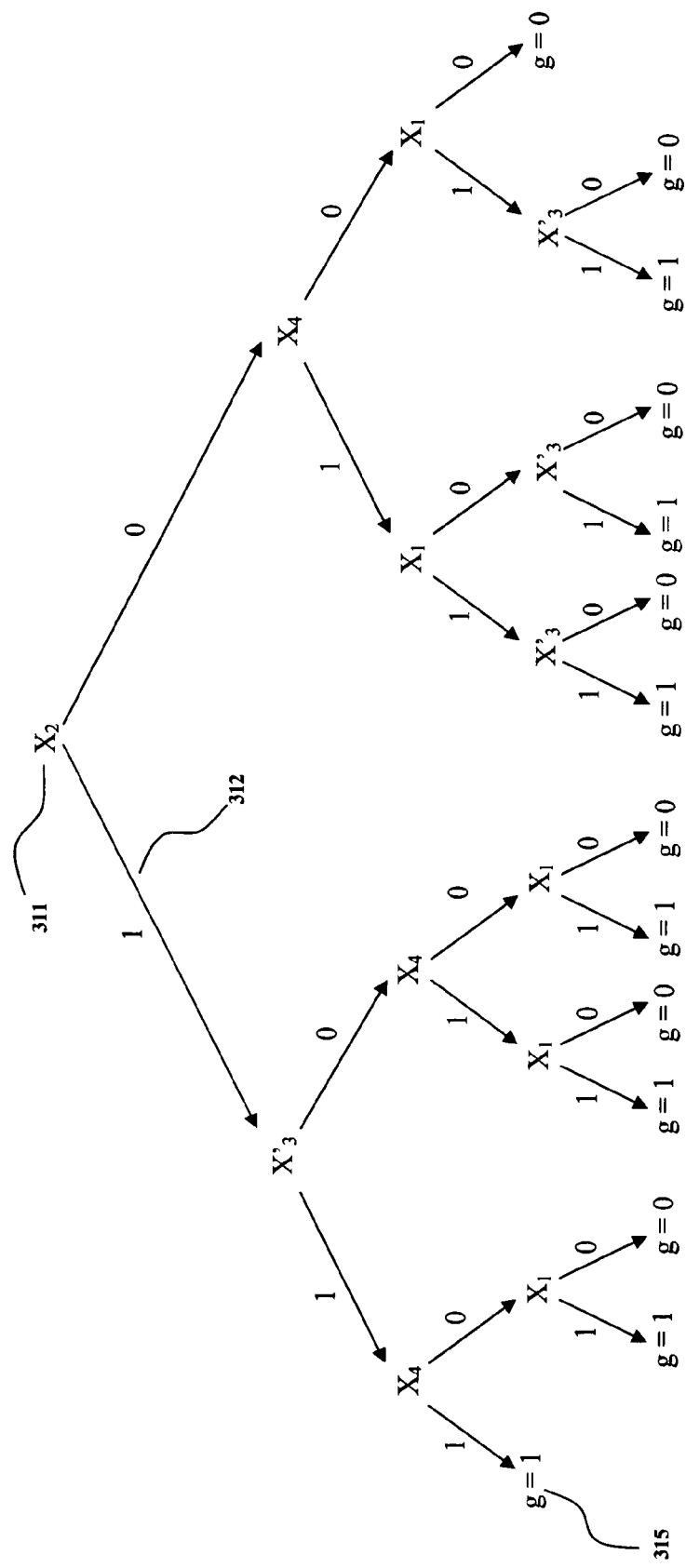

FIG. 23 illustrates the event test paths for $g=(X_2+X'_3)*(X_4+X_1)*(X'_3+X_1)$.

FIG. 24 presents the truth table for the Boolean expression {AppVoiceCommand And Then ((Not EngineRunning) Or (In Cradle And ((Not VehicleMoving) Or (Not Driver Voice))))}

FIG. 25 illustrates the Karnough map for $g=V*(W+X+Z)*(W+Y+Z)$

FIG. 26 shows the event test paths for $g=V*(W+Z+X)*(W+Z+Y)$

FIG. 27 presents the truth table for the Boolean expression {AppVoiceCommand And Then ((Not EngineRunning) Or (Not VehicleMoving) Or (Not Driver Voice))}

Figures 28, 29:
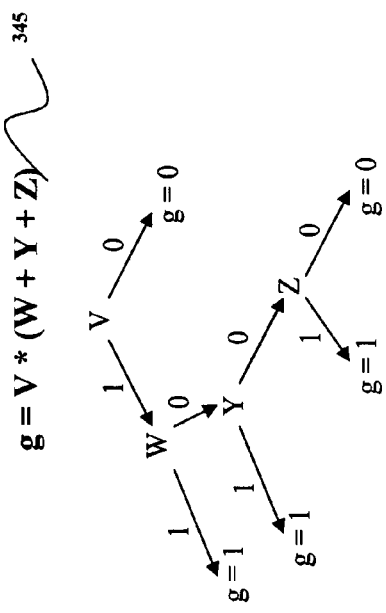

FIG. 28 shows the event test paths for $g=V*(W+Y+Z)$

FIG. 29 shows the event test paths for {AppVoiceCommand And Then (Not EngineRunning)}

FIG. 30 presents the truth table for the Boolean expression {ManufacturerDefault And Then (Not EngineRunning)}

FIG. 31 presents the truth table for the Boolean expression {AppVoiceCommand And Then (Not VehicleMoving)}

FIG. 32 presents the truth table for the Boolean expression {ManufacturerDefault And Then (Not VehicleMoving)}

DETAILED DESCRIPTION OF THE INVENTION

Syntactical Definition Conventions

A "syntactical definition" will first be provided for the Invoke facility service. Knowing the syntax of a computer operation provides insight to software programmers for coding the operation. Syntax achieves this insight by using a formal grammar of words that together imply the line code commands to realize the operation. It is important to indicate that the syntactical definition does not directly represent the manner by which the Invoke facility service is used. A description on using the Invoke facility service, specifically for enhancing the safe use of a wireless mobile terminal in a moving vehicle, will follow its syntactical definition.

The information on the Invoke facility service syntactical definition is an abbreviated description of that presented in United States patent application entitled "Invoke facility service and its applications to compound wireless mobile communication services" (publication number 20110201318, application Ser. No. 12/931,172). Its partial repetition is presented herein for the reader's convenience because the syntactical definition is crucial to understanding the invention of building Invoke facility services for enhancing the safe use of a wireless mobile terminal in a moving vehicle.

The syntactical approach begins by identifying the CS name (in bold upright letters); in this case it is Invoke. A brief behavioral description follows the CS name. Afterwards a syntactical relationship that relates the CS name with names for the parameters (in bold italicized letters) is presented. Parameters that influence the CS behavior are termed "independent (or input)" parameters. Parameters that are yielded by the CS are termed "dependent (or output)" parameters. Equal marks "=" separate dependent parameters (left side of "=") from the CS name and its independent parameters (right side of "="). It should be emphasized that the use of "=" is not necessarily the same as used for arithmetic or as used for a functional relationship. Generally speaking, it is intended to delineate between output parameters and input parameters, which can be of both types; i.e., a parameter can appear on both sides of "=" (or an equation). That is, a parameter name can appear as both an input and an output. This is especially important when the parameters are used beyond a CS and operations within the CS change the parameter value. Another reason for having a parameter as an output is to have it displayed as a user notification. As a matter of convention, all input parameters are also shown as output parameters in the syntactical representation of a CS. The syntactical appearance of a parameter (input or output) that includes the word "optional" in its name implies that it need not be used in a CS realization. For Invoke, all parameters, available to a CWS app builder, are optional.

A parameter value is described in terms of their significance, type, and range. The term "value" is intended to have its most general meaning and not limited to numerical amounts. For example, a spoken message can be a value, so can a geographic location, or a color, etc. For some CS it is permissible for an input parameter(s) to have no value(s) (null) and still participate meaningfully in the execution of the component service. The acceptance of null for an input parameter value and the consequential impact on the CS is described in a CS definition.

Independent and dependent parameters can be variable or constant. Variable parameters are represented by a bold italicized name; e.g., *VariableParameter*. A constant is manifested by straddling quotation marks. The name of a constant is bold italicized; e.g., "*ConstantValueName*". Upright characters signify the constant value; e.g., the telephone number "1.201.486.1234". When requested, the interactive compiler shows a list of appropriate parameter constants to a wireless mobile terminal CWS app builder. A constant remains unchanged during the execution of a wireless mobile terminal CWS app. The value of a named constant (e.g., "ConstantValueName") can change when an initial condition assignment is made prior to a CS execution. A named constant value, within a CS, cannot change during the execution of the CS. A constant value (e.g., "1.201.486.1234") can neither be changed as an initial condition nor during the execution of a CWS app. A CS variable is usually provided with an initial condition and can change during the execution of the CS.

An important part of the syntactical approach concerns input parameter initial conditions. Initial conditions are values assigned to the CS of a wireless mobile terminal CWS app prior to the beginning of wireless mobile terminal CWS app execution. Not all values can or need to be initialized. For example, constant values within a CS cannot be initialized. A CS builder must assure that named constants and variables have appropriate value types and appropriate values prior to their first use in a computation. If named constants' or variables' values do not acquire appropriate values before their first computational use during a CWS app execution, the values must be part of initialization. Although variables can have their values re-computed or changed while a wireless mobile terminal CWS app is executing, named constants can only have their values changed at an initialization that precedes the beginning of wireless mobile terminal CWS app execution. That is, a named constant of a wireless mobile terminal CWS app must preserve its value throughout a wireless mobile terminal CWS app execution.

The initial conditions of named constants and variables can be established in the following three ways:
1. Assigning an initial value just prior to invocation of the wireless mobile terminal CWS app.
2. An initial value assigned by the wireless mobile terminal CWS app builder during the build process.
3. A default initial value assigned by the interactive graphical compiler during the build process.

The above three ways have a superseding hierarchy. An initial value assigned prior to invocation supersedes that assigned by a wireless mobile terminal CWS app builder. Initialization by a wireless mobile terminal CWS app builder supersedes a default value initialized by a interactive graphical compiler. If initialization is done at a computer, downloading to the wireless terminal must be performed to overwrite the prior initial values.

The capability of initializing a CWS app is a valuable resource because it avails a user's opportunity for tailoring a CWS app to accommodate particular needs. The interactive graphical compiler or the CWS app builder will provide default initial values for all named constants and variables that require initialization prior to the CWS app's execution. The builder will also decide which named constants and variables and variables for which a CWS app user may assign overriding initial values. A user, if desired, may make or change the initial conditions assignments prior to using the CWS app.

Examples of initial conditions, that users may regard as desirable to tailor a CWS app, are:
1. Addresses including telephone numbers, residential, business, e-mail, web sites;
2. General textual information (i.e., QWERTY typewriter characters) including specific messages, e-mail subjects, time of day, day of the week, month of the year, any combination of the preceding three temporal variables, one or more ranges of time represented by a combination of the preceding three temporal variables, name of an individual, city, state, country, hemisphere, a planar location (i.e., akin to a longitudinal/latitudinal location), any combination of the six preceding spatial variables, one or more ranges of planar space represented by a combination of the six preceding temporal variables, a three dimensional location (i.e., akin to a longitudinal/latitudinal/altitudinal location), one or more ranges of volume space, name of a product, bar code, name of a business;
3. Audio signals including recorded voice messages, vehicle engine running, glass being broken, automobile accident, child crying, explosion, thunder, gushing wind, falling rain, falling hail, person's scream, dog barking, screeching tires from excessive vehicular braking, alarm siren, gunshot, footsteps, turning door knob, door closing;
4. Visual signals including recorded video signals, icons, retina of an eye image, image of door opening, license plate number image, image of a fire, image of an explosion, image of a bolt of lightning, bar code image, image of a person's face, image of an automobile, image of a gun, image of an animal;
5. Data signals including those indicating heart pacer malfunction occurred, blood monitor sensed excessive glucose level, insulin pump nearly empty, epileptic seizure sensed, stroke precursor symptoms observed, heart rate is dangerous, temperature too high, carbon monoxide level dangerous, smoke level suggests fire, automobile engine is running, vehicle speed is above a set maximum, vehicle brake fluid low, vehicle engine malfunction warning, accelerometer sensed impact, burglar actuated alarm, health emergency of a family member, notification to alter a business plan (e.g., an unscheduled package pick-up by a delivery service), incoming message (e.g., an e-mail) from a particular source, maintenance data from a wireless service provider, update from a wireless service provider, malfunctioning heating system, breathing support system is unsatisfactorily functioning, wireless mobile terminal is located outside the specified planar space, wireless mobile terminal is located outside the specified volume, person's face is recognized, explosion is sensed, senior family member has shouted for help, password protection is violated, credit card charge beyond maximum, bank transfer beyond maximum, check cashed beyond maximum, sold something, bought something.

The interactive graphical compiler requests that a CWS app builder identify desired CS output parameters, if any. Only the output parameters that will be used by another CS within the wireless mobile terminal CWS app or are to yield some manner of notification to the user of the wireless mobile terminal CWS app, need to be specified as outputs during the build process. Otherwise, it is not mandatory to specify an available output parameter during the build process. The interactive graphical compiler will not show the excluded output parameters in the CS label within the wireless mobile terminal CWS app graphical representation. Input parameters may also be excluded, but only if they are optional.

When building a CS, the interactive graphical compiler makes it possible to rename parameters of a CS, irrespective of being a variable or a named constant within a wireless mobile terminal CWS app. The interactive graphical compiler provides this option by associating generic names with those specified by the builder. This association is preserved so that the compiled wireless mobile terminal CWS app has the parameter names it understands, in terms of significance, type, and value.

All of the input and output parameters of the Invoke facility service are optional. This is done for two reasons. A wireless mobile terminal CWS app builder will have total flexibility to decide which parameters should play a role in the CWS app being built. Also, service providers may regard some parameters as potentially troublesome when a lay person (non-professional programmers) builds a wireless mobile terminal CWS app. It is therefore possible to make some parameters unavailable to lay people.

The final part of the syntactical approach addresses specific examples of built Invoke facility services. Only one example of building the Invoke facility service part of a CWS app will be provided here. The example has two purposes: 1. it demonstrates how an Invoke facility service can be deployed to enhance safety of a wireless mobile terminal's use in a moving vehicle and 2. it illustrates how an Invoke facility service can be built with the assistance of interactive graphical compiler interactivity.

Summary of the Invoke Facility Service

Invoke facility service: Senses the events required to invoke the operation of an associated wireless mobile terminal CWS app. Every wireless mobile terminal CWS app is associated with an Invoke facility service in order to instigate an invocation of operation. Being a Component Service (CS), Invoke is not limited to only appear at the beginning of a CWS app, but can be used within a CWS app as often as desired. When used within a CWS app, it establishes the invocation of a subset of CS.

Syntax of the Invoke Facility Service ({OptionalEventExpression}, (OptionalEventDurationList), (OptionalObservationRepetitionInterval), (OptionalPasswordPair), (OptionalDisableQuadruple), OptionalEnablingSwitch, (OptionalInitialConditionsAssignmentList), (OptionalLinkedCWSList), (OptionalLinkedCWSPasswords), (OptionalLinkedCWSData), (OptionalNotifications), (OptionalEventFailureNotification), (OptionalEventPathData), (OptionalEventFailureNotificationSchema))=Invoke ({OptionalEventExpression}, (OptionalEventDurationList), (OptionalObservationRepetitionInterval), (OptionalPasswordPair), (OptionalDisableQuadruple), OptionalEnablingSwitch, (OptionalInitialConditionsAssignmentList), (OptionalLinkedCWSList), (OptionalLinkedCWSPasswords), (OptionalLinkedCWSData), (OptionalNotifications), (OptionalEventFailureNotification), (OptionalEventPathData), (OptionalEventFailureNotificationSchema))

Parameter Definitions

{OptionalEventExpression}

An optional Boolean expression containing assertions of recognized events that are to control the invocation of an associated wireless mobile terminal CWS app. A means exists to test an event. Following a test, an assertion is assigned to the event having a Boolean value of "True" or "False". That is, when a test indicates an event has occurred, the assertion is "True". If the test manifests that the event has not occurred, the event assertion is "False". The occurrence of an event can be in its contradictory sense. For example, the event "the room is not dark" can be considered to have occurred and be "True" by virtue of the event "room has light". The {OptionalEventExpression} is associated with a tree that represents paths of sequenced events to be examined for a truth evaluation of its Boolean expression. Each path of the tree is termed an "event test path". The events have their truth values examined in the sequence that they appear in the path. An event test path is concluded when it is possible to evaluate the Boolean expression. Prior to the test of an event's occurrence, no assertion has been assigned and a flag of "Untested" exists for the event. Because Boolean expressions are in the realm of a binary algebra, events that are flagged as "Untested" cannot be used in the {OptionalEventExpression} evaluation. If an "Untested" event is encountered when proceeding in an event test path, a test is made of the event before proceeding farther in the event test path. It may be possible to evaluate the Boolean expression even when some test paths remain with "Untested" events. This can happen when an event test path, other than the one being processed for the Boolean expression evaluation, contains "Untested" events. If the Boolean expression of an {OptionalEventExpression} results in a "True" value as a consequence of the event assertion values (an event can have either a "True" or a "False" value), the wireless mobile terminal CWS app will be invoked into execution. Following invocation, the event values will remain the same or continue to be tested, according to the CWS app builder's desire. The events are regarded as parameters that are accessible to a CWS app while the CWS app is being executed. Hence, if needed by the CWS app, these values can be obtained and utilized, with or without testing following the CWS app's invocation; i.e., during the remaining CWS app execution. If the builder does not include an {OptionalEventExpression} within Invoke facility service, a default Boolean expression will be assigned by the interactive graphical compiler during the build process. The default Boolean expression is specified by the service provider and implemented by the wireless mobile terminal manufacturer. There is no intent herein to restrict possible default Boolean expressions. However, one possibility is the single event of a user scrolling through a wireless mobile terminal's CWS app list and selecting the CWS app to be invoked via a touch screen. That is, the event was the touch screen selection of the CWS app. The parameter {OptionalEventExpression} will not appear within the graphical representation of Invoke when a default Boolean expression is deployed because no event selection was made by a builder. However, the default event selection may be permitted to a CWS app builder for inclusion and appearance within {OptionalEventExpression}. Braces are used to { . . . }" distinguish the {OptionalEventExpression} from other Invoke parameters and identify it as a Boolean expression of event parameters. The event parameters are of a general type: i.e., a textual message, a special ring signal, an audio message (includes voice recognition), an image, a video, data (as a single, n-tuple, array, or structure), etc. The event parameters are linked by Boolean connectives; i.e.; "And", "And Then", "Or", "Not", "If X, Then Y"; wherein "X" and "Y" represent event parameters. Each wireless mobile terminal CWS app must have its own unique invocation means and no event test path may be included as part of another CWS app's event test path. That is, the complete or partial event test paths of a CWS app's {OptionalEventExpression} cannot result in an evaluation of a Boolean expression assigned to some other CWS app. Otherwise, CWS app invocation confusion will exist. Unique and non-included paths apply whether invocation is by an {OptionalEventExpression} or by a default event. One means, to ensure unique CWS app invocation, is to have the first examined event (beginning of each event test path) uniquely assigned to a single CWS app such that no invocation is to occur if the first event is "False". Therefore, if the first event in the path is "False", then the Boolean expression is evaluated as "False". When the parameter {OptionalEventExpression} appears in the Invoke facility service, it will be the first parameter following the left parenthesis. The {OptionalEventExpression} and all Invoke facility service parameters, but the final parameter, are followed by a comma. The number of commas is used to delineate a parameter. The final parameter is followed by a right parenthesis.

{OptionalEventDurationList}

An optional list of triples; where each triple designates 1) an event name, 2) its value of "Sustained" or "Momentary", 3) the testing repetition interval for a "Sustained" event or a null entry for a "Momentary" event. A "Sustained" event is to have testing continued beyond invocation; i.e., during the remainder of CWS app execution. A "Momentary" event will preserve its value at the CWS app invocation and throughout the CWS app execution. Both event types and their truth values are accessible throughout a CWS app execution. A significant distinction of the two events is that, although a "Sustained" event initially retains the value after a Boolean expression results in an invocation, it can experience value changes between "False" and "True", as testing is repeated and CWS app execution continues. The testing repetition interval determines when a "Sustained" event test is repeated. A default interval value, as specified by the service provider and implemented by the wireless mobile terminal manufacturer, is assigned according to the event. A service provider may also permit the CWS app builder to override the default value during the build process, with the overriding value contained by a prescribed range of values. Commas are used to distinguish parameters within the Invoke facility service. The (OptionalEventDurationList) parameter follows the first comma. If a builder does not include an event in its list of triples, the interactive graphical compiler will designate this event as "Momentary". Furthermore, the (OptionalEventDurationList) parameter will not appear within the graphical representation of Invoke when the list of triples is empty; i.e., assigned completely by default.

(OptionalObservationRepetitionInterval)

This parameter is a pair that specifies two time intervals: 1) the interval between successive evaluations the {OptionalEventExpression} truth value (i.e., to determine if invocation of wireless mobile terminal CWS app should take place) and 2) the time interval to reset all event test values to an "Untested" flag. When the previous evaluation of the {OptionalEventExpression} had a "False" result (i.e., no invocation occurred), the evaluation will be repeated according to the time interval specified by the first member of this pair (evaluation interval). When the {OptionalEventExpression} has a "True" evaluation, the wireless mobile terminal CWS app will execute and no evaluations of the {OptionalEventExpression} take place during the CWS app execution, unless the Invoke facility service exists again within the CWS app. The evaluations resume when the wireless mobile terminal CWS app concludes its execution. Events are flagged as "Untested" until they are tested to be "True" or "False". While a Boolean expression is being evaluated, only the encountered events flagged as "Untested" are tested. The second member of the pair indicates the interval to reset the events of a Boolean expression to the "Untested" state. Resetting to the "Untested" state only occurs after the interval to reset has expired and when the Boolean expression of the Invoke facility service is being evaluated for invocation. Time is saved by not resetting the events for every evaluation of an {OptionalEventExpression}. This is a consequence of having events appear in the Boolean expressions of more than one CWS app. Consider that an event was tested for one Boolean expression and, a short time later; it is used in the evaluation of another Boolean expression. It is unlikely that the event's truth value would have changed in this short time interval and retesting is pointless. It is therefore expected that the time duration between evaluations (first member of the pair) of the {OptionalEventExpression} will be less than the time duration to reset (second member of the pair) the event truth values. Additionally, the "Momentary" assignment to an event implies that no need exists to examine for a change of truth value until the related CWS app has completed its execution. The distinction between the testing repetition interval component of the (OptionalEventDurationList) parameter and the first member of the pair within (OptionalObservationRepetitionInterval) parameter may need to be explained. The testing repetition interval component of the (OptionalEventDurationList) parameter pertains to the time intervals for testing "Sustained" events and the first member of the pair within (OptionalObservationRepetitionInterval) parameter pertains to the testing interval to evaluate the {OptionalEventExpression}. Unlike "Momentary" events, the "Sustained" events are tested continually, irrespective of an "Untested" flag setting and according to the time intervals within the (OptionalEventDurationList). Only events flagged as "Untested" are tested when needed for a Boolean expression evaluation, otherwise an event's current value is used. The two time interval entries of the parameter (OptionalObservationRepetitionInterval) can be a constant, named constant, or a variable. Their values have the format "days:hours:minutes:seconds"; wherein seconds can contain a decimal fraction part, but days, hours, and minutes must be whole numbers. The (OptionalObservationRepetitionInterval) parameter follows the second comma. If a builder does not specify an (OptionalObservationRepetitionInterval), the interactive graphical compiler will provide default values for the pair's two components. The default values vary according to the wireless mobile terminal CWS app being built. The service provider specifies the default values and they are implemented by the wireless mobile terminal manufacturer. Furthermore, the parameter (OptionalObservationRepetitionInterval) will not appear within the graphical representation of Invoke when only the default values are deployed.

(OptionalPasswordPair)

This parameter is intended to provide password protection of a wireless mobile terminal CWS app. That is, a password is used to permit the invocation of a wireless mobile terminal CWS app. The pair contains an optional password name and an optional password value. A builder has the choice to leave both members of the pair blank, deploy either one of the two pair members, or deploy both pair members. A password request will be made after a successful ("True") Boolean expression result and only if a builder specifies this parameter for an Invoke facility service. This parameter is a general type; e.g., a keypad textual entry, a special externally generated audio signal, voice recognition of a recorded message. The (OptionalPasswordPair) represents the means to enhance wireless mobile terminal CWS app security. The (OptionalPasswordPair) parameter follows the third comma. If a builder elects not to deploy (OptionalPasswordPair), the parameter will not appear within the graphical representation of Invoke and no password request will be made prior to wireless mobile terminal CWS app invocation.

(OptionalDisableQuadruple)

A quadruple of entries consisting of the name of maximum permitted number of failed password attempts, the value of maximum permitted number of failed password attempts, the name of amount of time the wireless mobile terminal CWS app will be disabled if the number of failed attempts reaches the maximum, and the value of the amount of time the wireless mobile terminal CWS app will be disabled (in days:hours:minutes). The request for the password entry is made after each failed attempt and until the maximum has been reached. The (OptionalDisableQuadruple) parameter follows the fourth comma. If a builder elects not to deploy (OptionalDisableQuadruple), the parameter will not appear within the graphical representation of Invoke and no limit will exist for failed password attempts. The (OptionalDisableQuadruple) cannot exist without an (OptionalPasswordPair).

OptionalEnablingSwitch

Switches to either enable or disable the wireless mobile terminal CWS app invocation. The switch state can only be established by the wireless service provider or by downloading the state from a computer that is used to build the wireless mobile terminal CWS app. Its value is stored as an initial condition. The {OptionalEventExpression} will not be evaluated if the wireless mobile terminal CWS app is disabled. A principal use is to re-enable a wireless mobile terminal CWS app after it has been disabled by excessive password failures and the password has been forgotten. The OptionalEnablingSwitch parameter follows the fifth comma. If a builder elects not to deploy OptionalEnablingSwitch, the parameter will not appear within the graphical representation of Invoke. Some wireless service providers may obligate the inclusion of this parameter for certain CWS apps.

(OptionalInitialConditionsAssignmentList)

An optional list of pairs that consist of builder selected wireless mobile terminal CWS app parameters (named constants and variables) and their initial values when the wireless mobile terminal CWS app begins its execution. A display of these pairs will appear on the wireless mobile terminal after a "True" value results for the Boolean expression and, if password protected, an acceptable password was entered. A user will have an opportunity to change initial values for the wireless mobile terminal CWS app named constants and variables that appear within this parameter. If a named constant or variable is excluded from this list, their initial value must remain the same as that assigned during the build process. This parameter is useful to configure or provision a wireless mobile terminal CWS app following its originally built configuration. The (OptionalInitialConditionsAssignmentList) parameter follows the sixth comma. If a builder elects not to deploy (OptionalInitialConditionsAssignmentList), the parameter will not appear within the graphical representation of Invoke and no request for initial conditions will be made.

(OptionalLinkedCWSList)

An optional list of pairs that indicate the names of potentially linked CWS apps and their addresses. The list identifies other CWS apps, by their names, from which data can be received. After a successful ("True") Boolean expression and no (OptionalPasswordPair) failure, the potentially linked wireless mobile terminal CWS app address is used to request linkage for acquiring data. The name and address of the wireless mobile terminal CWS app requesting linking is included within the link request to confirm authorization for acquiring data. If the potentially linked wireless mobile terminal CWS app and the data recipient wireless mobile terminal CWS app are within the same wireless mobile terminal, then the address is "Local". Otherwise, an address that is appropriate for the type communication link must accompany the potentially linked wireless mobile terminal CWS app name. These addresses can be a World Wide Web (http) site name, an e-mail address, a Bluetooth address, a phone number, an Internet address, an Ethernet address, or a private network address. The (OptionalLinkedCWSList) parameter follows the seventh comma. If a builder elects not to deploy (OptionalLinkedCWSList), the parameter will not appear within the graphical representation of Invoke and no request for linkage will take place.

(OptionalLinkedCWSPasswords)

An optional list of pairs that associate potentially linked CWSs with passwords for those potentially linked CWSs having password protection. The passwords are entered into this parameter when the Invoke facility service is built. The data recipient wireless mobile terminal CWS app responds with the associated password after the potentially linked wireless mobile terminal CWS app makes its password request. Only the potentially linked CWSs having password protection are included within this parameter. The (OptionalLinkedCWSPasswords) parameter follows the eighth comma. If a builder elects not to deploy (OptionalLinkedCWSPasswords), the parameter will not appear within the graphical representation of Invoke and no password replies will be made to potentially linked CWSs. The (OptionalLinkedCWSPasswords) cannot exist without an (OptionalLinkedCWSList).

(OptionalLinkedCWSData)

An optional list of pairs; where the first member of a pair is a linked wireless mobile terminal CWS app name and the second member is a list of pairs that associate named constants and variables with memory locations into which a linked wireless mobile terminal CWS app will enter values. The data names, first member of the list of pairs, are the names used within the linked wireless mobile terminal CWS app (source of data). These names need not coincide with the data names used within the data recipient wireless mobile terminal CWS app. However, the builder of the data recipient wireless mobile terminal CWS app must know the name of the desired data within the linking wireless mobile terminal CWS app. The builder establishes a data alias table that associates the desired linked wireless mobile terminal CWS app data names with corresponding recipient wireless mobile terminal CWS app data names. It is crucial that the type of each transmitted data, from the linked wireless mobile terminal CWS app, is the same data type used by the recipient wireless mobile terminal CWS app. The transmitted data is entered into a recipient CWS' data fields in the same manner as that for (OptionalInitialConditionsAssignmentList). Place holders are established for the transmitted data values before entries are made by the linked wireless mobile terminal CWS app. However, the interactive graphical compiler will not provide a default value into a place holder. A builder must enter each value into each data place holder to establish the proper data type. Hence, a builder must have thorough knowledge of the data to be acquired from a linked wireless mobile terminal CWS app. If a named constant or variable is transmitted from more than one linked wireless mobile terminal CWS app, overwriting data will cause the last value entry to be used during the recipient wireless mobile terminal CWS app execution. Moreover, the (OptionalInitialConditionsAssignmentList) is enacted after linked wireless mobile terminal CWS app data transmission; i.e., (OptionalLinkedCWSData). This results in prioritization of user entered data via the (OptionalInitialConditionsAssignmentList). The (OptionalLinkedCWSData) parameter follows the ninth comma. If a builder elects not to deploy (OptionalLinkedCWSData), the parameter will not appear within the graphical representation of Invoke and no data will be received from a linked wireless mobile terminal CWS app. The (OptionalLinkedCWSData) cannot exist without an (OptionalLinkedCWSList).

(OptionalNotifications)

This is an optional n-tuple to provide notification concerning the operation of the Invoke facility service after the Boolean expression was evaluated as "True". No notifications are reported when the Boolean expression has a "False" evaluation. A successful password entry is not necessary for the enactment of a notification. The notification n-tuple consists of four parts: a) notification cause, b) type of address for notification recipient, c) address of notification recipient, d) explanation message. It is the responsibility of the Invoke facility service to communicate the notification message to the designated address when a "cause" is observed. The principal intended use of (OptionalNotifications) is to provide an execution invocation failure message or warnings about the ensuing wireless mobile terminal CWS app execution after the Boolean expression had a "True" evaluation. However, a notification is available if desired, after a successful wireless mobile terminal CWS app invocation and an accompanying textual message could indicate this success. The potential address types to which the message could be sent are a World Wide Web (http) site name, an e-mail address, a Bluetooth address, a phone number, an Internet address, an Ethernet address, or a private network address. The representation of messages is not limited to a textual format. It may be in the form of a special ring signal, a recorded audio signal, an image, a recorded video signal, a wireless mobile terminal vibration, general data (as a single, n-tuple, array, or structure). Other notifications "causes" are excessive invalid (OptionalPasswordPair) entry attempts, the wireless mobile terminal CWS app had been disabled, the inability to disable a wireless mobile terminal app, the inability to enable a wireless mobile terminal CWS app, an unsuccessful wireless mobile terminal CWS app provisioning attempt by a user's initial conditions assignment with the builder selected named constants and variables, a failure in an attempt to link with another wireless mobile terminal CWS app, a password rejection by a potentially linked wireless mobile terminal CWS app, invalid data from a linked wireless mobile terminal CWS app, a change of location of the wireless mobile terminal, a wireless network problem, a notification from the wireless service provider, and unable to complete invocation for an unknown reason. The message associated with a "cause" is selected by the builder and should be appropriate for the "cause" parameters; e.g., if the "cause" corresponds to a textual password, then a textual output is usually preferable. As an input to Invoke, the (OptionalNotifications) parameter contains all potential quadruples (cause, address type, address, message). As an output of Invoke, only the quadruples for which a "cause" was observed appear in the (OptionalNotifications) parameter. The (OptionalNotifications) parameter follows the tenth comma. If a builder elects not to deploy (OptionalNotifications), the parameter will not appear within the graphical representation and no notifications will be provided.

(OptionalEventFailureNotification)

This is an optional means to provide a notification when an event test path results in a "False" evaluation of a wireless mobile terminal CWS app's Invoke facility service Boolean expression. That is, the tested events of a wireless mobile terminal CWS app's unique Boolean expression resulted in invocation denial. A successful password entry is not necessary for the enactment of a notification. Because of being a notification, its intent is to be an output for the Invoke facility service. As an input, the argument of (OptionalEventFailureNotification) is void. This notification is not reported for CWS apps that are invoked (Boolean expression is evaluated as "True"). Also, at least one event must pass its test (be "True") and at least one event must fail its test (be "False") for a notification to be made. A notification may be visually displayed on the wireless mobile terminal and/or by a recorded audio message. The data entered into an output (OptionalEventFailureNotification) parameter may be the notification itself or a pointer to the notification. Indirection via a pointer is useful when the notification is presented as an icon and/or a non-QWERTY keyboard audio and/or other visual value; i.e., a QWERTY keyboard representation points to a non-QWERTY keyboard value. The manner of presentation and their precise representation are at the discretion of the CWS app builder. The output parameter is determined from operations performed on the two input parameters (OptionalEventPathData) and (OptionalEventFailureNotificationSchema). The (OptionalEventPathData) contains all potential event test paths for the related CWS app's Boolean expression and the Boolean expression's evaluations. The event test paths are represented by an inverted tree that is specified by n-tuples. A final pair following an event test path n-tuple of pairs is (Boolean expression value, event test path label). The (OptionalEventFailureNotificationSchema) is a set of pairs that maps an event test path label into a builder's prescribed notification for a specific event test path. A wireless mobile terminal CWS app builder makes no value entries into (OptionalEventFailureNotification) output. The value of this output parameter is determined by operations on the input (OptionalEventPathData) and the input (OptionalEventFailureNotificationSchema) in conjunction with the event test paths results. All of these three parameters must be deployed, if this failure notification is to exist for a wireless mobile terminal CWS app. A builder is limited to an opportunity of specifying if (OptionalEventFailureNotification) is to be an input and/or output. The (OptionalEventFailureNotification) parameter follows the eleventh comma. If a builder elects not to deploy (OptionalEventFailureNotification), the parameter will not appear within the graphical representation and no notifications will be provided.

(OptionalEventPathData)

This optional parameter consists of set of triples and a set of pairs. The parameter must be included as an Invoke input parameter whenever (OptionalEventFailureNotification) is included as an Invoke output for a wireless mobile terminal CWS app. It represents the potential event test paths, in the form of an inverted, binary, directed tree, to evaluate the CWS app's Boolean expression. Each node of the tree corresponds to an event pointer and the root, the first node (event pointer), is at the tree top. A pair of branches is directed from this and all other event pointers to a successor node. One branch is directed to a corresponding successor node when the predecessor event pointer has a "True" value. The other branch is directed to a corresponding successor node when the predecessor event pointer has a "False". When the successor node is an event pointer, the triple consists of the predecessor event pointer, a branch representing either a "True" value or a "False" value, and the corresponding successor event pointer. The sequence of (predecessor event pointer, truth value, successor event pointer) triples create an event test path that terminates when a successor node is a leaf; i.e., (predecessor event pointer, truth value, leaf). A leaf is a pointer to a pair that consists of the Boolean expression value (either "True" or "False") and a label for the traced event test path, for a completely traced event test path. The (OptionalEventPathData) parameter is used in conjunction with a sequence of tests to evaluate a Boolean expression. As the events are tested, an event test path is formed by the wireless mobile terminal software. If identified as an Invoke output, the (OptionalEventPathData) will present a traced event test path label and its truth value for the observed events that terminated with the Boolean expression's evaluation. The event tree's set of triples entries data, for the (OptionalEventPathData) parameter, are produced by the CWS interactive compiler. A builder is limited to an opportunity of specifying if (OptionalEventPathData) is to be an input and/or output. The (OptionalEventPathData) parameter follows the twelfth comma. If a builder elects not to deploy (OptionalEventPathData), its parameter will not appear within the graphical representation and no notifications will be provided. The tree of the event paths is nevertheless produced by the graphical interactive compiler because it is used to evaluate the Boolean expression.

(OptionalEventFailureNotificationSchema)

This optional input set of pairs provides the failure notification parameter value to be identified in the (OptionalEventFailureNotification) output for its associated wireless mobile terminal CWS app. The pairs are of the form (event test path label, notification) or (event test path label, notification pointer). The (OptionalEventFailureNotificationSchema)

must be included as part of the Invoke facility service input whenever (OptionalEventFailureNotification) is included as an output of Invoke. It has the role of using an event test path label, provided by the (OptionalEventPathData) input parameter, to determine the CWS app builder specified notification for the (OptionalEventFailureNotification) output parameter. In effect, the event test path label within (OptionalEventNotificationData) represents a pointer, used by the (OptionalEventFailureNotificationSchema), to identify the notification to be displayed by the output (OptionalEventFailureNotification). A builder is permitted to select only event test paths for which: 1. the Boolean expression evaluation is "False", 2. at least one event had a "True" result, and 3. at least one event had a "False" result. The wireless mobile terminal CWS app builder is requested to provide a notification or notification pointer, if desired, for each such path. A builder also has an opportunity of specifying if (OptionalEventFailureNotificationSchema) is to be an input and/or output. The (OptionalEventFailureNotificationSchema) parameter follows the thirteenth comma. If a builder elects not to deploy (OptionalEventFailureNotificationSchema), the parameter will not appear within the graphical representation and no notifications will be provided.

Initial Conditions

The United States patent application entitled "Invoke facility service and its applications to compound wireless mobile communication services" (publication number 20110201318, application Ser. No. 12/931,172) describes initial conditions for all, but the following three Invoke facility service parameters. The following three parameters have been added to the definition of the Invoke facility service as part of the aforementioned patent application's continuation.

(OptionalEventFailureNotification), when included by the Invoke builder, will initially be a totally void parameter. That is, no initial conditions may be entered. A notification value is computed by the wireless mobile terminal and inserted for presentation to the wireless mobile terminal user, after an invocation failure occurs, and if the following criteria are satisfied: 1. the Boolean expression evaluation is "False", 2. at least one event had a "True" result, and 3. at least one event had a "False" result. Interactive graphical compiler interactivity will not avail an opportunity to insert a value into the (OptionalEventFailureNotification) output parameter. The notification value is determined by the wireless mobile terminal operations on event test path data, in conjunction with other Invoke facility service parameter data.

(OptionalEventPathData), when included by the Invoke builder, is intended to be an input constant that has its value established by the interactive graphical compiler. The interactive compiler operates on the Invoke Boolean expression, provided by the CWS app builder, to form the sets of n-tuples that represent potential event test paths. The event test paths constitute a parameter to compute the (OptionalEventFailureNotification) notification value. The event test path data initial conditions, established by the interactive graphical compiler, cannot be altered.

(OptionalEventFailureNotificationSchema), when included by the Invoke builder, is intended to be an input constant. It consists of a set of pairs (event test path label, notification or notification pointer) that are partially established by the wireless mobile terminal CWS app builder. A constant representing the event test path label is assigned by the interactive graphical compiler. The notification and/or the notification pointer are prescribed by the wireless mobile terminal CWS app builder. As such, the notifications and/or notification pointers are initialized by a wireless mobile terminal CWS app builder and cannot be otherwise altered. The set of pairs (event test path label, notification or notification pointer) constitute a parameter to compute the (OptionalEventFailureNotification) notification value.

Types of Events

The types of events and their contradictions will now be described (See FIG. 1). The most common event is the selection of a CWS app from either an alphanumeric and/or icon displayed list 1. A wireless mobile terminal user will use a key to scroll through the list, point to the desired CWS app, and select it (occurrence of the event) by some means. The contradictory event is to determine from a test that the designated CWS app was not selected. For example, if the CWS app is the event of selecting "Outgoing Voice Call" from the list, the contradiction of having "Not Outgoing Voice Call" "True" means that a CWS app other than "Outgoing Voice Call" had been selected or was "False". An important aspect of a truth value assignment is that the event test needs to take place. If no event test takes place the CWS app "Not Outgoing Voice Call" has no truth value assignment. The event "Outgoing Voice Call" is either "True" or "False" and the contradiction "Not Outgoing Voice Call" is either "False" or "True", depending on which CWS app was selected from the displayed app list. When the event values are reset, the values of "Outgoing Voice Call" and "Not Outgoing Voice Call" will be "Untested". Similar rational for "Untested", "True", or "False" values exists for the remaining event types.

The event of selecting a CWS app from a displayed list is not the only CWS app selection event type. A wireless mobile terminal user may type the name of or depress a dedicated key for the CWS app selection (Manual CWS app selection event type 2). For voice recognition wireless mobile terminals, a user may speak the name of a CWS app (Voice CWS app selection event type 3). Each of the preceding has a contradictory event which is "True" when the event of the "Event Type" column 16 is "False".

Other types of audio events exist. For instance, a voice command 4 to a voice recognition wireless mobile terminal that specifies a service request (e.g., what is today's weather forecast?). A voice command may be an event accepted by the wireless mobile terminal from anyone or can only apply to particular people. The distinction between any person and a particular person is determined from the precision implemented within the voice recognition software for the associated CWS app command. The precision for recognizing a particular person exceeds the precision for recognizing the command from any person. Also, if a particular person's command is to be recognized, then that particular person will record the command during the wireless mobile terminal CWS app building process to satisfy the precision requirements. A "True" value for this event type implies its contradictory event is "False", and conversely.

Events that are established by the transmission of a signal from the wireless mobile terminal are said to be "locally established". Events that are established by the reception of a signal to the wireless mobile terminal are said to be "non-locally established".

Audio events are not limited to voice commands. That is, the wireless mobile terminal's transmission (locally established) or reception (non-locally established) of an audio signal that matches a wireless mobile terminal stored audio pattern 5 can be any type of audio event; e.g., the sounds of a) a vehicle engine running, b) glass being broken, c) an automobile accident, d) a child crying, e) an explosion, f) the sound of thunder, g) the sound of gushing wind, h) the sound of falling rain, i) the sound of falling hail, j) a person's scream, k) a dog barking, l) screeching tires from excessive vehicular braking, m) an alarm siren, n) a gunshot, o) footsteps, p) a turning door knob, q) a door closing. The audio signal intensity and its time duration, as well as its pattern, are metrics that can be included to determine whether the audio event has occurred. A "True" value for this event type implies its contradictory event is "False", and conversely.

The wireless mobile terminal's transmission or reception of a video signal that matches a wireless mobile terminal stored video pattern 6 can also be an event; e.g., the patterns of a) the retina of an eye, b) a door opening, c) a license plate number, d) a fire, e) an explosion, f) a bolt of lightning, g) a bar code, h) a person's face, i) an automobile, j) a gun, k) an animal. The video signal intensity and time duration, as well as its pattern, are metrics that may be included to determine whether the video event has occurred. A "True" value for this event type implies its contradictory event is "False", and conversely.

A comprehensive list of events, constituting transmission or reception of signals, are: a) an audio signal that matches an audio signal stored by the builder in the wireless mobile terminal; b) an audio signal to an address that matches an address stored by the builder in the wireless mobile terminal; c) a video signal that matches a video signal stored by the builder in the wireless mobile terminal; d) a video signal to an address that matches an address stored by the builder within the wireless mobile terminal; e) a text message that matches a text message stored by the builder in the wireless mobile terminal; a text message to an address that matches an address stored by the builder in the wireless mobile terminal; g) a photograph that matches a photograph stored by the builder in the wireless mobile terminal; h) a photograph to an address that matches an address stored by the builder in the wireless mobile terminal; i) an e-mail with a subject that matches a subject stored by the builder within the wireless mobile terminal; j) an e-mail to an address that matches one stored by the builder within the wireless mobile terminal; k) an audio signal; l) a video signal; m) a text message; n) a photograph; o) an e-mail; p) connecting to an Internet address that matches an Internet address stored by the builder in the wireless mobile terminal; q) disconnecting from an Internet address that matches an Internet address stored by the builder in the wireless mobile terminal; r) dialing of a telephone number that matches a telephone number stored by the builder in the wireless mobile terminal; s) dialing of a telephone number; t) taking a photograph; u) recording a video; v) a wireless mobile terminal's entering a geographical location that matches a geographical location stored by the builder in the wireless mobile terminal; w) a wireless mobile terminal's leaving a geographical location that matches a geographical location stored by the builder in the wireless mobile terminal.

The events may be the contradictions of those indicated in the previous paragraph, that is: a) not having sent/received an audio signal that matches an audio signal stored by the builder in the wireless mobile terminal; b) not having sent/received an audio signal to an address that matches an address stored by the builder in the wireless mobile terminal; c) not having sent/received a video signal that matches a video signal stored by the builder in the wireless mobile terminal; d) not having sent/received a video signal to an address that matches an address stored by the builder within the wireless mobile terminal; e) not having sent/received a text message that matches a text message stored by the builder in the wireless mobile terminal; f) not having sent/received a text message to an address that matches an address stored by the builder in the wireless mobile terminal; g) not having sent/received a photograph that matches a photograph stored by the builder in the wireless mobile terminal; h) not having sent/received a photograph to an address that matches an address stored by the builder in the wireless mobile terminal; i) not having sent/received an e-mail with a subject that matches a subject stored by the builder within the wireless mobile terminal; j) not having sent/received an e-mail to an address that matches one stored by the builder within the wireless mobile terminal; k) not having sent/received an audio signal; l) not having sent/received a video signal; m) not having sent/received a text message; n) not having sent/received a photograph; o) not having sent/received an e-mail; p) not having connected to an Internet address that matches an Internet address stored by the builder in the wireless mobile terminal; q) not having disconnected from an Internet address that matches an Internet address stored by the builder in the wireless mobile terminal; r) not having dialed a telephone number that matches a telephone number stored by the builder in the wireless mobile terminal; s) not having dialed a telephone number; t) not having taken a photograph; u) not having recorded a video; v) not having a wireless mobile terminal's entering a geographical location that matches a geographical location stored by the builder in the wireless mobile terminal; w) not having a wireless mobile terminal's leave a geographical location that matches a geographical location stored by the builder in the wireless mobile terminal.

Events can deal with temporal measurements. For instance, a range of time 7 (start time, end time) specified as a pair having a combination of years, months, days, hours, minutes, seconds can identify when the temporal range event has occurred; e.g., Jan. 23, 2012 until forever (to represent a start date for a CWS app). That is, the start and end of the temporal range can be any pair combination of time of day, days of a week, day of a month, week of a month, day of a year, week of a year, month of a year. Temporal range events may be repetitive 8. That is, range of time (start time, end time) may be repeated and can be specified by any combination of time of a day, days of a week, weeks of a month, months of a year, and years; e.g., 9:00 AM to 5:00 PM on Monday through Friday of each week, the first of each month, each leap year. Temporal ranges may be used to limit when a CWS app's execution is permitted or not permitted. If the range event is monitored (tested) while the CWS app is executing, it can limit the time duration of a CWS app's execution. Temporal events have a large variety of uses. In education, they can prevent access to apps that should be inaccessible during the time of taking an examination, such as a Scholastic Achievement Test. In business, they can prevent an incoming phone call during the time of a business meeting.

Temporal events can be with regard to a specific time; e.g., a) an existing time of day that matches a time of day stored by the builder in the wireless mobile terminal; b) an existing day of the week that matches the day of a week stored by the builder in the wireless mobile terminal; c) an existing day of the month that matches a day of the month stored by the builder in the wireless mobile terminal; d) an existing day of the year that matches a day of the year stored by the builder in the wireless mobile terminal; e) a combination of the aforementioned day types that match a combination of the aforementioned day types stored by the builder in the wireless mobile terminal.

The event may be the contradiction of the preceding; that is: a) an existing time of day that does not match a time of day stored by the builder in the wireless mobile terminal; b) an existing day of the week that does not match the day of a week stored by the builder in the wireless mobile terminal; c) an existing day of the month that does not match a day of the month stored by the builder in the wireless mobile terminal; d) an existing day of the year that does not match a day of the year stored by the builder in the wireless mobile terminal; e)

a combination of the aforementioned day types that does not match a combination of the aforementioned day types stored by the builder in the wireless mobile terminal.

Events can relate to spatial containment. For instance, that a wireless mobile terminal is in a range of planar space (polygonal or circular) 9 can be the event. A polygon is defined as a closed figure in a plane. It can be identified by set of geographic points in a plane; i.e., each point is a pair (x, y) connected to exactly two edges, with as many edges as points, no edges intersect, and the edges enclose an area. The sequence of point pairs define the edge construction. That is, an edge exists between every two points of the sequence and the final point establishes an edge that subtends to the first point. A circular plane is identified by a center and a radius. The apparatus, used by the wireless mobile terminal to detect the planar spatial range event, may not recognize polygonal or circular planar configurations. In this case, the range of planar space configuration is defined by the apparatus' capability to detect the wireless mobile terminal location 10. Spatial events have a large variety of uses. For safety, they can prevent access to CWS apps on highways for which their execution creates dangerous situations. In medical practice, they can prevent an incoming phone call when in an operating room.

Spatial events can also deal with a range of a volume (sphere or polyhedron) 11. The event occurs when the wireless mobile terminal is located within the specified volume or its contradiction of outside the specified volume. A spherical volume is identified by a center and a radius. The polyhedron base for the volume is a planar polygon. A point in the third dimension exists above (below) the plane of the base polygon. The height (depth) of this third dimension point above (below) the base polygon's plane is also specified. Lines are formed from each point of the base polygon to the third dimension point. Each pair of lines, from a consecutive pair of polygon points, forms a triangular planar boundary for the volume. The volume is closed by the polygon base and the triangular planes that converge at the third dimension point. The volume can also be a frustum of the previous configuration. To be a frustum, another third dimension point is prescribed. The other third dimension (frustum) point is in the same vertical line subtended from the base polygon's plane (i.e., at a right angle to the plane of the base) to the convergent third dimension point. The frustum point is a shorter distance above (or below) the point of triangular plane convergence. A plane, parallel to the base polygon, is placed at the frustum point to form a second polygon. The second polygon has points constrained by the lines subtended from the base polygon points to the convergent third dimension point. That is, the intersections of the subtended lines and the paralleled plane define the points of the second polygon. The sides of the volume are no longer triangles, but quadrilaterals. It is possible to have the base polygon and the parallel frustum polygon of equal size by specifying convergence of the sides at the infinity point. That is, when the convergent (first) third dimension point is at infinity, all of the lines from the base polygon points are at right angles to the base polygon's plane. By selecting a finite height (depth) for the polygon at the frustum point, it will be identical to the base polygon. Both the frustum point and the convergent point can be at infinity, which means that the polyhedron sides are indefinitely long.

The apparatus, used by the wireless mobile terminal to detect the volume spatial range event, may not recognize the previously described category of polyhedrons or spherical volume configurations. In this case, the range of volume space configuration is defined by the apparatus' capability to detect the wireless mobile terminal location 12.

Rather than being located in a range of space, an event can constitute a specific wireless mobile terminal location 13. For example, a vehicle may contain a cradle for the wireless mobile terminal. Simple electrical contacts can ascertain if the wireless mobile terminal resides in a cradle. Other examples of specific locations are in a) one's home location, b) one's office desk, c) a safe, d) in a restaurant, e) one's locker at school or elsewhere, and f) located in one's parked automobile. A GPS capability or a mobile service provider's location services establish the specific location; from which the location value is entered into the appropriate event parameter.

A data communication link can exist between a wireless mobile terminal and sensors of an electro-mechanical system; e.g., via the Bluetooth protocol. The communication link can provide status data that represents pertinent invocation events for CWS apps 14. Example events are: a) heart pacer malfunction occurred, b) blood monitor sensed excessive glucose level, c) insulin pump nearly empty, d) epileptic seizure sensed, e) stroke precursor symptoms observed, f) heart rate is dangerous, g) temperature too high, h) carbon monoxide level dangerous, i) smoke level suggests fire, j) vehicle engine is running, k) vehicle speed is above a set maximum, l) vehicle brake fluid low, m) vehicle engine malfunction warning, n) accelerometer sensed impact. The contradictions of the preceding are also events.

Events may be instigated remotely 15. This is useful whenever it is desirable to have certain CWS apps executed by conditions that a wireless mobile terminal is unable to locally detect, especially with respect to electro-mechanical system operation. Some examples of such conditions are: a) intruder in one's home is detected, b) health emergency of a family member, c) notification to alter a business plan (e.g., an unscheduled package pick-up by a delivery service), d) incoming message (e.g., an e-mail) from a particular source, e) maintenance data or an update from a wireless service provider, f) a malfunctioning heating system at home, g) home alarm system is triggered, h) breathing support system is unsatisfactorily functioning. The example events cited previous paragraphs are all potentially useful for remote CWS app invocations. To identify a few of the prior example: a) heart pacer malfunction occurred, b) smoke level suggests fire, c) accelerometer sensed impact, d) wireless mobile terminal is located outside the specified volume, e) a person's face is recognized, f) an explosion is heard, g) a senior family member has shouted "Help". The remote invocation event communication would be over the same medium that the wireless mobile terminal uses to communicate with other remote entities. Password protection is advisable for CWS apps that have remote invocation capabilities. Such passwords can be automatically generated by the source transmitting the event data.

Polygon Construction Algorithm

Figure 2:
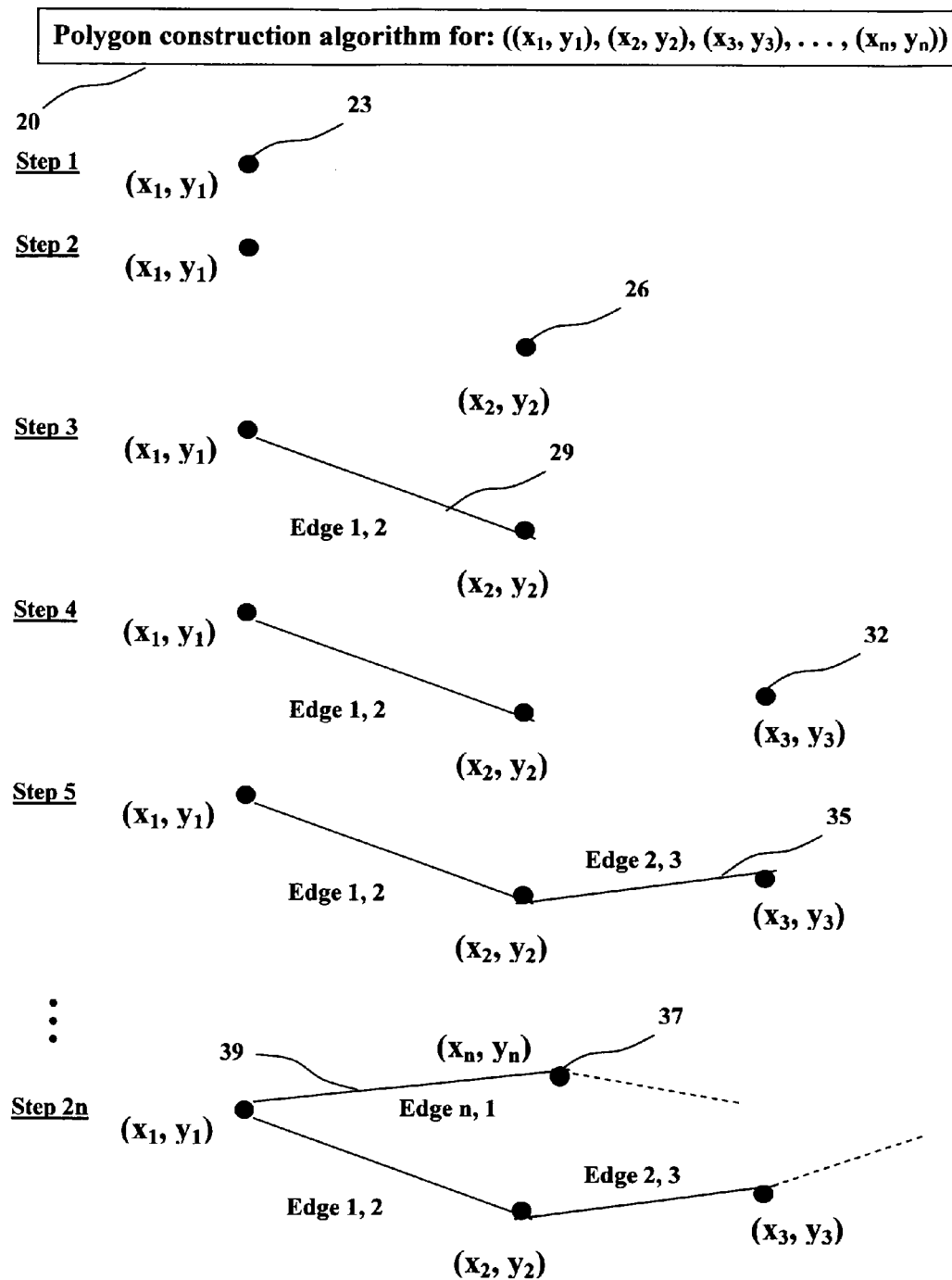
FIG. 2 illustrates an algorithm to construct polygons.

The event of being within or outside of an area requires that the area be defined; i.e., has its boundaries prescribed in a manner to establish that the event has taken place. The polygon construction algorithm will now be described to build a general polygon so that its boundaries are represented in a computer amenable form. This algorithm is deployed on a planar surface such as an image of a map. When the map is portrayed on a computer's monitor screen, one can use a curser to select the points of the polygon and thereby relieve the CWS app builder from determining and listing the coordinate values for (x, y). An alternate method is to use an apparatus with GPS communication and a memory to record the GPS position. The GPS position is stored in the memory by depressing a button on the apparatus. A closed set of straight line boundaries are established from the (x, y) pairs and then translated by the interactive graphical compiler into a congruent geographic polygon. The congruent geographic polygon possesses GPS metrics for the points so that the wireless mobile terminal's GPS position can be used to determine whether the wireless mobile terminal is within or outside of the polygon. The polygon construction algorithm is not limited to a CWS app invocation event. It may be applied for use in any CWS app for any purpose in which a planar polygon boundary is needed. Refer to FIG. 2 for a pictorial representation of the polygon construction algorithm.

A CWS app builder will prescribe an n-tuple of points that the interactive graphical compiler will regard to have the form $((x_1, y_1), (x_2, y_2), (x_3, y_3), \ldots, (x_n, y_n))$ 20. The subscripts of the pairs are indicative of the entry sequence of the presented points. The algorithm to construct the polygon is as follows:

Step 1—Locate point $(x_1, y_1)$ 23,

Step 2—Locate point $(x_2, y_2)$ 26,

Step 3—A straight line boundary is connected between the preceding and succeeding points 29 (this step is done automatically by the interactive graphical compiler), Step 4 to Step (2n–1)—Repeat steps 2 and 3 until point $(x_n, y_n)$ is located 32 35 37 (repetition of step 3 is done automatically by the interactive graphical compiler), Step 2n—A straight line boundary is connected between point $(x_n, y_n)$ and $(x_1, y_1)$ 39 (this step is done automatically by the interactive graphical compiler).

The event can be either that the wireless mobile terminal is within the area created by the polygon construction algorithm or the contradiction of being outside of the area. The Boolean expression is not limited to an event for a single polygon. It can possess an indefinite number of polygons; limited only by the capacity of the computing system and its software memory. The spatial relationships among the polygons also have no inherent constraints. Polygons can be separated, have contiguous boundaries, and be contained within one another. These spatial relationships can be multiple; e.g., any number of polygons can share any number of contiguous boundaries, containment of one polygon within another polygon can continue as many times as desired. Events can be when within an indefinite number of boundaries, also its contradiction of not within an indefinite number of boundaries, and/or any combination of within/not within an indefinite number of boundaries. This generality allows containment to be related to configurations comparable to donuts and any number of iterations of donuts within donuts. Even a composite of separately spaced donuts, each having an arbitrary varying number of iterations of donuts within donuts, is permitted.

Intersection Avoidance Algorithm

The straight lines, forming the polygon's perimeter, cannot intersect. An algorithm to avoid straight line intersections will now be described. The algorithm consists of two parts:

1. Determining the straight line equation between two points of a plane;

2. Ascertaining if the equations of two straight lines, each between a pair of points in the same plane, meet at other than one of their end points.

The determination of the straight line equation between pairs of points is not only used by the intersection avoidance algorithm, but is essential for determining whether the wireless mobile terminal is inside or outside of the polygon. Hence, the straight line equations and the pairs of points to form straight line segments, represent data that is stored in the wireless mobile terminal.

A straight line has the general equation of:

$$y = mx + b$$

Where:

y is the dependent variable;

m is the slope of the straight line;

x is the independent variable;

b is the y axis intercept.

Consider a straight line between the points $(x_1, y_1)$ and $(x_2, y_2)$. The pair of points provide two simultaneous equations to determine the slope "m" and the "y" axis intercept "b". Solving the simultaneous equations yields:

$$m = (y_2 - y_1)/(x_2 - x_1)$$

$$b = (x_2 y_1 - x_1 y_2)/(x_2 - x_1)$$

Where:

m is the slope of the straight line;

$(x_2, y_2)$ is an end point of the straight line;

$(x_1, y_1)$ is an end point of the straight line;

b is the y axis intercept.

The second part of the algorithm is to determine if two straight line segments, where one straight line segment extends from point $(x_1, y_1)$ to point $(x_2, y_2)$ and the other straight line segment extends from point $(x_3, y_3)$ to point $(x_4, y_4)$. Let the two straight lines conform to the following equations, respectively:

$$y_1 = m_1 x + b_1$$

$$y_2 = m_2 x + b_2$$

Assume the two straight line segments intersect at other than their end points. This implies that for some value of "x", say "$x_i$", "$y_1 = y_2 = y_i$". Hence:

$$y_i = y_1 = m_1 x_i + b_1 = y_2 = m_2 x_i + b_2$$

Thence: $x_i = (b_2 - b_1)/(m_1 - m_2)$

And: $y_i = (b_2 m_1 - b_1 m_2)/(m_1 - m_2)$

And point $(x_i, y_i)$ must simultaneously be between the pairs of points that define the two line segments:

$(x_1, y_1)$ and $(x_2, y_2)$ $(x_3, y_3)$ and $(x_4, y_4)$

The intersection avoidance algorithm begins when an Invoke facility service builder enters a pair of points for a polygon straight line segment. The Compound Wireless Service interactive compiler will afterwards perform the following steps:

Step 1—Use the entered points $(x_1, y_1)$ and $(x_2, y_2)$ to compute the straight line equation for $y_1 = m_1 x + b_1$, using the equations $m_1 = (y_2 - y_1)/(x_2 - x_1)$ and $b_1 = (x_2 y_1 - x_1 y_2)/(x_2 - x_1)$;

Step 2—If step 1 was the first straight line equation computation, then store the straight line segment data for $y_1$ and return to step 1 to await the next entered pair of points;

Step 3—Otherwise, select a previously computed straight line equation, for which no intersection test has been made with respect to the entered $y_1$ straight line segment data;

Step 4—If no selection of a previously computed straight line equation is possible because all straight lines have been tested with respect to the straight line segment data for $y_1$, then store the straight line segment data for $y_1$ and go to step 10;

Step 5—Otherwise, temporarily label the selected previously computed straight line equation to be $y_2 = m_2 x + b_2$, with the straight line segment end points designated as $(x_3, y_3)$ and $(x_4, y_4)$;

Step 6—If $m_1 = m_2$, go to step 3 (the lines are parallel and do not intersect);

Step 7—Otherwise, compute the intersection point for the straight lines of $y_1$ and $y_2$ from $x_i=(b_2-b_1)/(m_1-m_2)$ and $y_i=(b_2m_1-b_1m_2)/(m_1-m_2)$;

Step 8—If the point $(x_i, y_i)$ is between the pair of points $((x_1, y_1), (x_2, y_2))$ and between the pair of points $((x_3, y_3), (x_4, y_4))$, then warn the Invoke facility service builder that the straight line segment data corresponding to $y_1$ and $y_2$ intersect, then permit the Invoke facility service builder to delete entries or abort the polygon generation, and then go to step 1 if the Invoke facility service builder elected segment correction or stop the polygon generation otherwise;

Step 9—Otherwise, store the straight line segment data for $y_1$ and go to step 3.

Step 10—Otherwise, if the pair $(x_2, y_2)$ of the straight line segment data is the initial point entered for the polygon, then end the computations (the polygon is closed);

Step 11—Otherwise, go to step 3.

Two examples of the algorithm's computations will now be presented. Consider as the first entered pair of points to be $(x_1, y_1)=(-1, 3)$ and $(x_2, y_2)=(2, -3)$. Equation substitutions yields $m_1=(y_2-y_1)/(x_2-x_1)=-2$ and $b_1=(x_2y_1-x_1y_2)/(x_2-x_1)=1$; so that $y_1=-2x+1$. The equation and end points are then stored as the first straight line segment data. The labels $x_1, y_1, m_1$, etc. are not permanently assigned to this straight line segment data. The labels temporarily exist for the algorithm and the Compound Wireless Service interactive graphical compiler assigns its own labels to the straight line segment data.

According to step 2, the first straight line segment data is stored and the next pair of points are entered by the Invoke facility service builder. The same labels are used for the next pair of points and the computations, without confusion because of the interactive graphical compiler's re-labeling of the preceding data and computations. Consider now the step 1 activity for the entered pair of points are $(x_1, y_1)=(2, 0)$ and $(x_2, y_2)=(-2, -4)$. The equation substitutions yield $m_1=(y_2-y_1)/(x_2-x_1)=1$ and $b_1=(x_2y_1-x_1y_2)/(x_2-x_1)=2$; so that $y_1=x-2$.

No processing is done by step 2 and step 3 results in selecting the stored previously computed straight line equation. No processing is done by step 4 and step 5 assigns $y_2=-2x+1$ and $((x_3, y_3), (x_4, y_4))=((-1, 3), (2, -3))$. The condition of step 6 is false and step 7 performs the intersection computations of $x_i=(b_2-b_1)(m_1-m_2)=(1-(-2))/(1-(-2))=1$ and $y_i=(b_2m_1-b_1m_2)/(m_1-m_2)=((1)(1)-(-2)(-2))/(1-(-2))=-1$.

Observe that for the $y_1$ straight line segment, $x_1=2>x_i=1>-2=x_2$ and $y_1=0>y_i=-1>-4=y_2$. Hence, the intersection point is on the $y_1$ straight line segment. For the $y_2$ straight line segment, $x_4=2>x_i>-1=x_3$ and $y_3=3>y_i>-3=y_4$. Hence, the intersection point is on the $y_2$ straight line segment; which means that the two straight line segments intersect. Step 8 will provide a warning that the Invoke facility service builder needs to correct the previous point pair entry or abort the polygon generation algorithm.

Assume corrected entries of $(x_1, y_1)=(0, -2)$ and $(x_2, y_2)=(-2, -4)$ are provided by the Invoke facility service builder. The equation substitutions yield same straight line equation of $y_1=x-2$. Because $y_1$ and $y_2$ have the same, equations, the lines still intersect at the same point of $x_i=1$ and $y_i=-1$. However, $x_1=0<x_i=2>-2=x_2$ and $y_1=-2<y_i=-1>-4=y_2$. Consequently, the intersecting point is not on the $y_1$ straight line segment. This means that step 8 will not provide a warning.

Step 9 will have the $y_1$ straight line segment stored as a boundary of the polygon. Afterwards, the process of testing for intersections continues until the point $(x_2, y_2)$ is discovered to be the same as the first point provided (step 10), which implies that polygon is closed.

Polyhedron Construction Algorithm

The event of being within or outside of a volume requires that the volume be defined; i.e., has its boundaries prescribed in a manner to establish that the event has taken place. The polyhedron construction algorithm will now be described to build a general polyhedron so that its boundaries are represented in a computer amenable form. This algorithm begins on a planar surface such as an image of a map. This is because the base of the polyhedron is a planar polygon. One can use a curser, as described previously for the polygon construction algorithm, to select the points of the polygon base without providing the coordinate values for (x, y). The third dimension edge convergent point and the third dimension frustum point can be specified to the interactive graphical compiler in a suitable metric; e.g., feet, kilometers, light years, infinity. An alternate method to establish the polygon base is to use an apparatus with GPS communication and a memory to record the GPS position. The GPS position is stored in the memory by depressing a button on the apparatus. A closed set of straight line boundaries are established from the (x, y) pairs and then translated by the interactive graphical compiler into a congruent geographic polygon. The third dimension points can be established by using an apparatus to measure height; e.g., ruler, tape measure, altimeter. The combination of GPS inputs for the polygon base and the input of an apparatus to establish the wireless mobile terminal's height can be used to determine whether the wireless mobile terminal is within or outside of the volume. This algorithm is not limited to a CWS app invocation event. It may be applied for use in any CWS app, for any purpose. Refer to FIG. 3 for a pictorial representation of the polyhedron construction algorithm.

A CWS app builder will prescribe an n-tuple of points that the interactive graphical compiler will regard to have the form $((x_1, y_1), (x_2, y_2), (x_3, y_3), \ldots, (x_n, y_n), (x_c, y_c, z_c, z_f))$ 41. Where $(x_i, y_i)$ represent the points of the polygon base, for which the height is zero (i.e., $z_i=0$) and are oriented according to their entry sequence of the presented points. Also, the quadruple $(x_c, y_c, z_c, z_f)$ provides x, y, z coordinates for the third dimension edge convergence point $(z_c)$ and the third dimension frustum plane point $(z_f)$. If the volume is not to be a polyhedron frustum, then $z_c=z_f$ is assigned. Positive values for $z_c, z_f$ indicate the points are above the polygon plane. Negative values for $z_c, z_f$ indicate the points are below the polygon plane. Both $z_c, z_f$ must have the same sign.

The algorithm to construct the polyhedron is as follows:

Step 1 to step 2n—Build the polygon as described by the polygon construction algorithm 42, Step (2n+1)—Locate the reflection of the convergence point in the polygon's plane $(x_c, y_c)$ 44, Step (2n+2) to step (3n+2)—Locate the third dimension convergence point $(x_c, y_c, z_c)$ 46 according to its reflection position 48, then subtend the "n" straight lines between each point of the polygon base and the convergence point 50 52 54 (subtending of the straight lines is done automatically by the interactive graphical compiler), If $z_c=z_f$ then stop here.

Step (3n+3)—Provide the third dimension frustum point $(x_c, y_c, z_f)$ 56,

Step (3n+4) to Step (4n+4)—Pass a plane parallel to the base polygon through the frustum point $(x_c, y_c, z_f)$ 56 and then establish the "n" frustum plane points 58 60 from the "n" intersecting lines subtended between the points of the base polygon and the third dimension edge convergence point $(z_c)$ to a distance of $z_f$ from the base plane (these steps are done automatically by the interactive graphical compiler).

The event can be either that the wireless mobile terminal is within the volume created by the polyhedron construction algorithm or the contradiction of being outside of the volume. The Boolean expression is not limited to an event for a single polygon and/or a single polyhedron. It can possess an indefinite number of polygons and/or of polyhedrons; limited only by the capacity of the computing system and its software memory. The spatial relationships among the polygons and/or polyhedrons also have no inherent constraints. Polygons and/or polyhedrons can be separated, have contiguous boundaries, and be contained within one another. These spatial relationships can be multiple; e.g., any number of polygons and/or polyhedrons can share any number of contiguous boundaries, containment of one polygon and/or polyhedron within another polygon and/or polyhedron can continue as many times as desired. Events can be when within an indefinite number of boundaries, also its contradiction of not within an indefinite number of boundaries, and/or any combination of within/not within an indefinite number of boundaries. It is also permissible to combine polygon areas and polyhedron volumes within a Boolean expression. Temporal and spatial events can also be combined. This has utility, for instance, to monitor prisoners in a jail. A prisoner can be required to be in one location for a certain time of day duration (dining hall during lunch), but somewhere else for another time of day duration (prison cell overnight). A wireless communicating ankle bracelet can be used to invoke a monitoring system alarm for a particular prisoner when the events indicate the prisoner is in a non-permitted location/time duration combination.

Temporal and Spatial Tolerances

A measuring apparatus does not have perfect accuracy. Tolerances should be considered for the values specified by a CWS app builder. One can view the tolerances as a shade of gray between black and white. For example, if the measurement mechanism has a temporal tolerance of $\pm\Delta T$ and the temporal boundary for the event is when t=T, then the gray shade is temporal range of $T-\Delta T \leq t \leq T+\Delta T$. This temporal ($\pm\Delta T$) is provided to the CWS app builder by a notation. A CWS app builder has an option to ignore the gray shade notation or take some preparatory action; e.g., provide a gray shade warning during the execution of the Invoke facility service. That is, provide a user notification that an event is within a gray area and the color (black or white, figuratively) was used to evaluate the Boolean expression.

The perimeters of an enclosed space will also possess a tolerance based on the accuracy of the measurement mechanism. This spatial tolerance is provided to the CWS app builder by a notation (e.g., $\pm\Delta A$ for an area or $\pm\Delta V$ for a volume) and/or a graphical representation of the perimeter line that is straddled by an area (perhaps in gray) to represent the tolerance. That is, the areas $A-\Delta A$ and $A+\Delta A$ have exactly the same shapes as the planar spatial range, identified by A, but straddle A; i.e., $A-\Delta A$ is within A and $A+\Delta A$ is outside of A. Similarly, the volumes $V-\Delta V$ and $V+\Delta V$ have exactly the same shapes as the volume spatial range, identified by V, but straddle V; i.e., $V-\Delta V$ is within V and $V+\Delta V$ is outside of V. A CWS app builder has an option to ignore the gray shade notation or take some preparatory action; e.g., provide a gray shade warning during the execution of the Invoke facility service.

Invoke Facility Service Build Example

One purpose of the example is to demonstrate the benefit of using an interactive compiler. The interactive compiler, used to build wireless mobile terminal CWS apps, possesses salient advantages. A major advantage of interactivity with the interactive graphical compiler guides and simplifies the building of a wireless mobile terminal CWS app, including building an Invoke facility service. The guiding and simplification is achieved by: a) requesting builder responses to queries while the wireless mobile terminal CWS app is being built, b) denying invalid builder responses to the queries, c) recommending valid alternatives to a builder following an invalid response, d) providing an explanation to a builder when a "help" request is made, e) providing examples on the use and purpose of a component service when a "help" elaboration is requested.

To further assist in understanding the role of the interactive compiler, an example of the interactive graphical compiler's interactions with a CWS builder will now be provided. This example resembles part of that presented in United States patent application entitled "Invoke facility service and its applications to compound wireless mobile communication services" (publication number 20110201318, application Ser. No. 12/931,172). The main distinction herein is the focus of using the Invoke facility service to restrict the invocation of a CWS app for situations that are potentially dangerous when the CWS app is executing for a vehicle's driver.

The convention of bold, italicized words without spaces (BoldItalicized) is used to represent the parameters in a Boolean expression. The Invoke facility service Boolean expression, for the example of interactive graphical compiler interactions, will operate on two event parameters:

1. SendTextMessage is the event of a wireless mobile terminal user's pointing to the CWS app icon that will permit sending a text message, after having scrolled through an icon list of CWS apps.
2. VehicleIsMoving is the event that the wireless mobile terminal, that is located in a vehicle, is moving.

The Boolean expression for wireless mobile terminal CWS app invocation is to be:

SendTextMessage And Then (Not VehicleIsMoving)

The use of the conjunction And Then implies a sequence of test path events. The event SendTextMessage is first tested. If the event SendTextMessage has occurred (a "True" value), then a test is made of the event (Not VehicleIsMoving). The intent of the above Boolean expression is to prohibit invocation of the wireless mobile terminal CWS app when the vehicle is moving. The wireless mobile terminal's speed can be monitored by its GPS software or by communication with the vehicle's speedometer. The speedometer communication can be achieved by a radio signal generated within the vehicle (e.g., a Bluetooth communication link) or a hard wired connection to the speedometer (e.g., when the wireless mobile terminal is part of the vehicle or resides in a vehicle's cradle).

Figure 4:
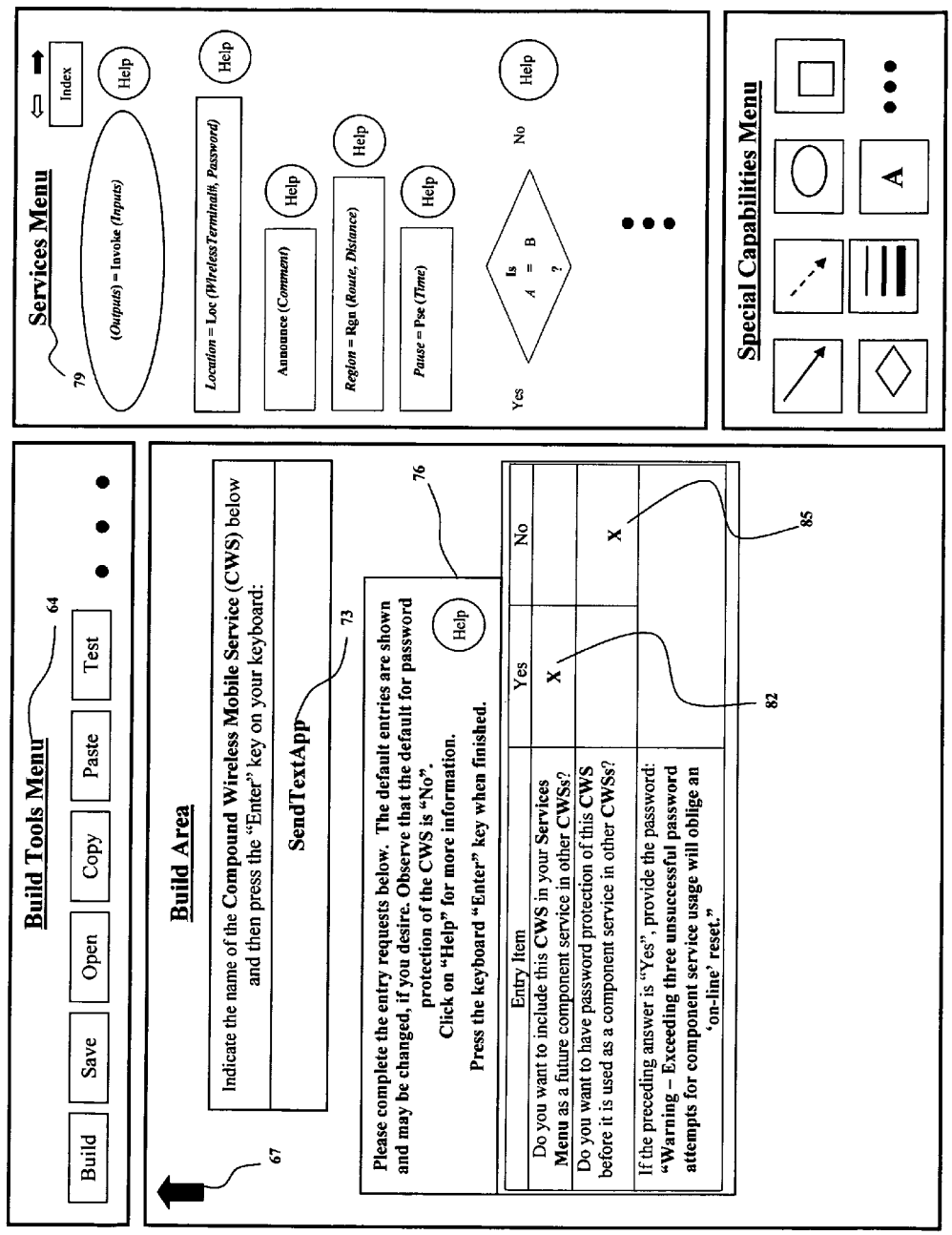
FIG. 4 demonstrates how to begin building a CWS app which includes providing the CWS app name, indicating if it is to be used recursively, and if it is to be password protected.

FIG. 4 illustrates the first-part of building a new wireless mobile terminal CWS app. The building process is begun by clicking on the "Build" button 61 of the "Build Tools Menu" 64. This is achieved by the builder's actions of clicking on the curser arrow 67, shown in its resting place, and then dragging it to point onto the "Build" button area. After releasing the clicked curser arrow 67, while pointing to "Build" button area, a window appears that requests the name for the wireless mobile terminal CWS app 70 to be built. The builder is shown to have entered the wireless mobile terminal CWS app name of SendTextApp 73. The curser arrow 67, in the mean time, had returned to the upper left corner (resting place) to await future use; e.g., to point to buttons and to drag icons while building the wireless mobile terminal CWS app. After the keyboard "Enter" key is depressed, the second window 76 appears. The second window 76 provides instructions for having wireless mobile terminal CWS apps included within the "Services Menu" 79 and thereby use it as a future CS within some later wireless mobile terminal CWS app to be built. Instructions also appear for having password protection for such future use.

Figure 5:
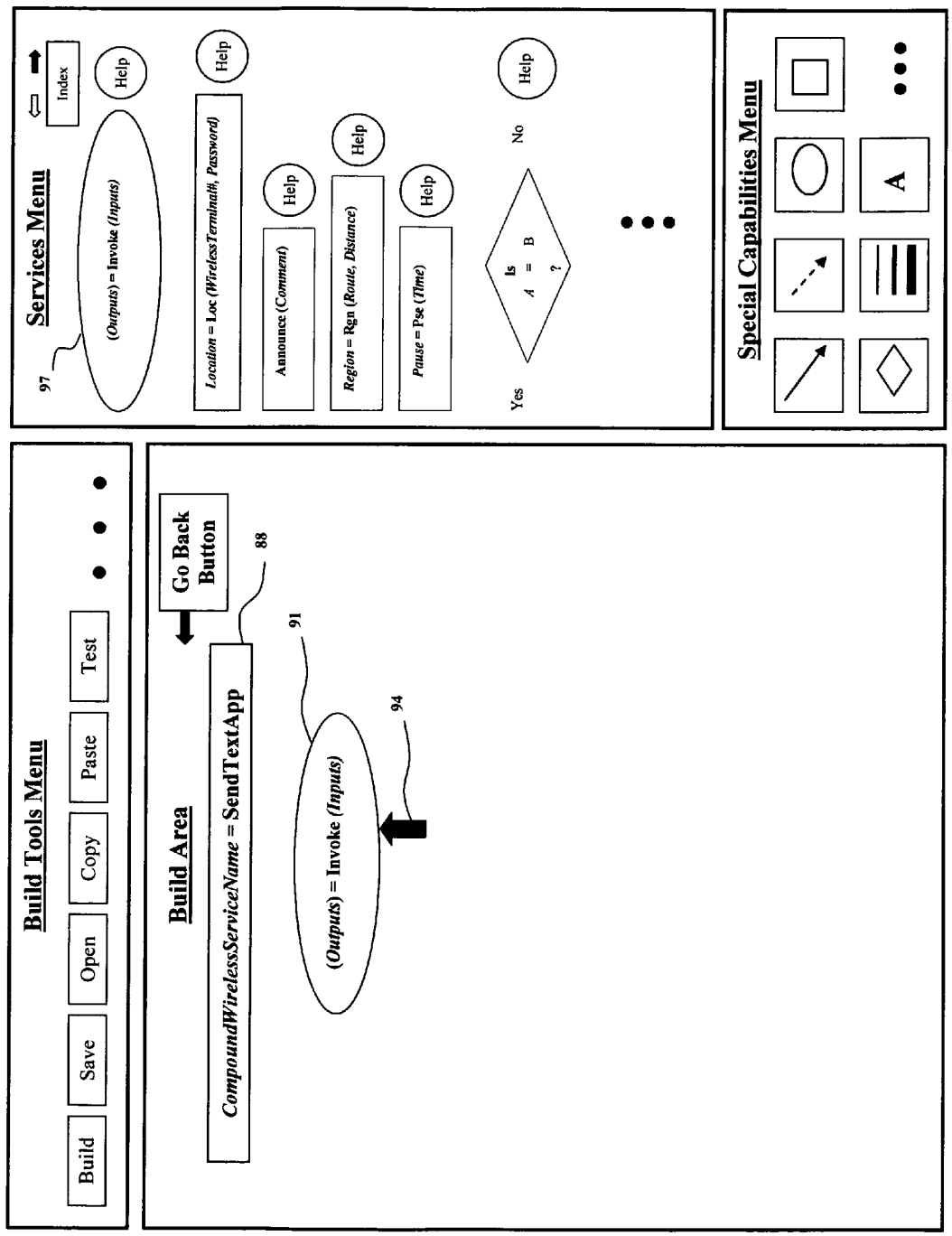
FIG. 5 shows how the Invoke facility service is selected.

The entry table window contains default values for inclusion 82 within the Services Menu 79 ("Yes") and "No" password protection 85. Inclusion within the Services Menu 79 signifies that the wireless mobile terminal CWS app being built can become a CS within another wireless mobile terminal CWS app. The builder has the choice of overriding the default values 82 85 by making entries in the appropriate table cells, but decides to maintain the default values. The interactive graphical compiler stores the builder's decisions when the "Enter" key is depressed the second time. FIG. 5 will now appear with a window that contains the wireless mobile terminal CWS app name 88.

FIG. 5 shows the result of dragging the Invoke CS 91 with the curser arrow 94 from the Invoke CS's position in the Services Menu 97. The most general names of (Inputs) and (Outputs) appear as the Invoke parameters within FIG. 5. When the curser arrow 94 is released, the windows of FIG. 6 appear.

Figure 6:
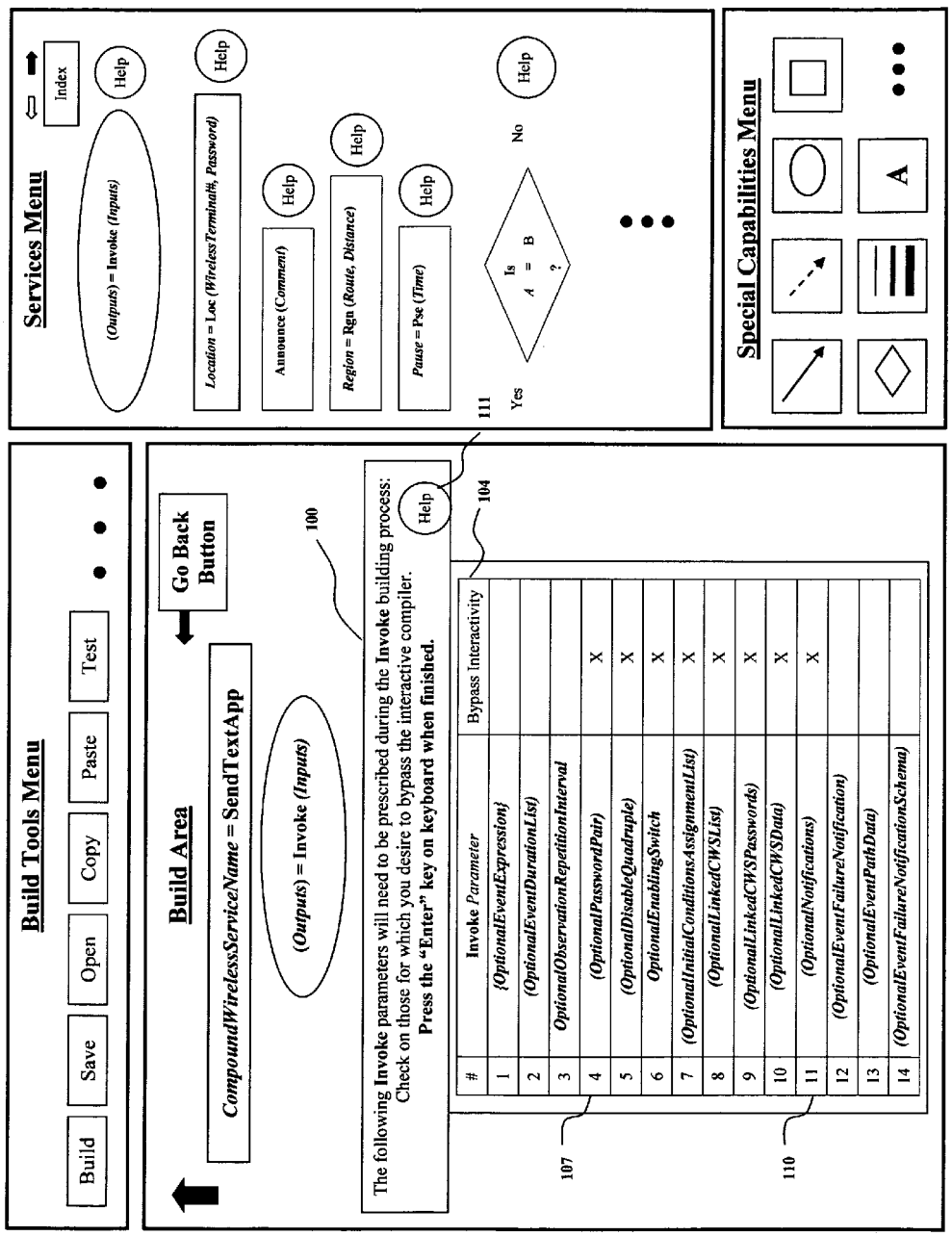
FIG. 6 illustrates the step of selecting parameters that are to have interactive graphical compiler interactivity for the Invoke facility service.

A FIG. 6 window 100 provides instructions for selecting those Invoke parameters for which no interactive graphical compiler interactivity 104 is desired. Excluded from interactive graphical compiler interactivity is the fourth parameter 107 (OptionalPasswordPair) through to the eleventh parameter 110 ((OptionalNotifications). The interactive graphical compiler will not interact with a wireless mobile terminal CWS app builder for those rows of the parameter table that were checked (bypassed). Bypassing interactivity for a parameter does not mean that the parameter must be excluded from Invoke. It means that inclusion of such a parameter must be incorporated within Invoke without the guidance of the interactive graphical compiler. For the example of this description, the parameters corresponding to rows 4 through 11 will not have interactive graphical compiler interactivity 104 and will also be excluded from explicit representation in the Invoke facility service. However, those parameters that play a role in the Invoke facility service will be assigned default values by the interactive graphical compiler, as specified by the service provider and implemented by the wireless mobile terminal manufacturer. The default parameter values can be observed by placing the cursor arrow and clicking on the "Help" button 111. It is also permissible for Invoke to be explicitly devoid of all parameters. For the case of no explicit Invoke parameters, invocation of a CWS app occurs according to a default event and pertinent Invoke parameters assume default values, as specified by the service provider and implemented by the wireless mobile terminal manufacturer.

Figure 7:
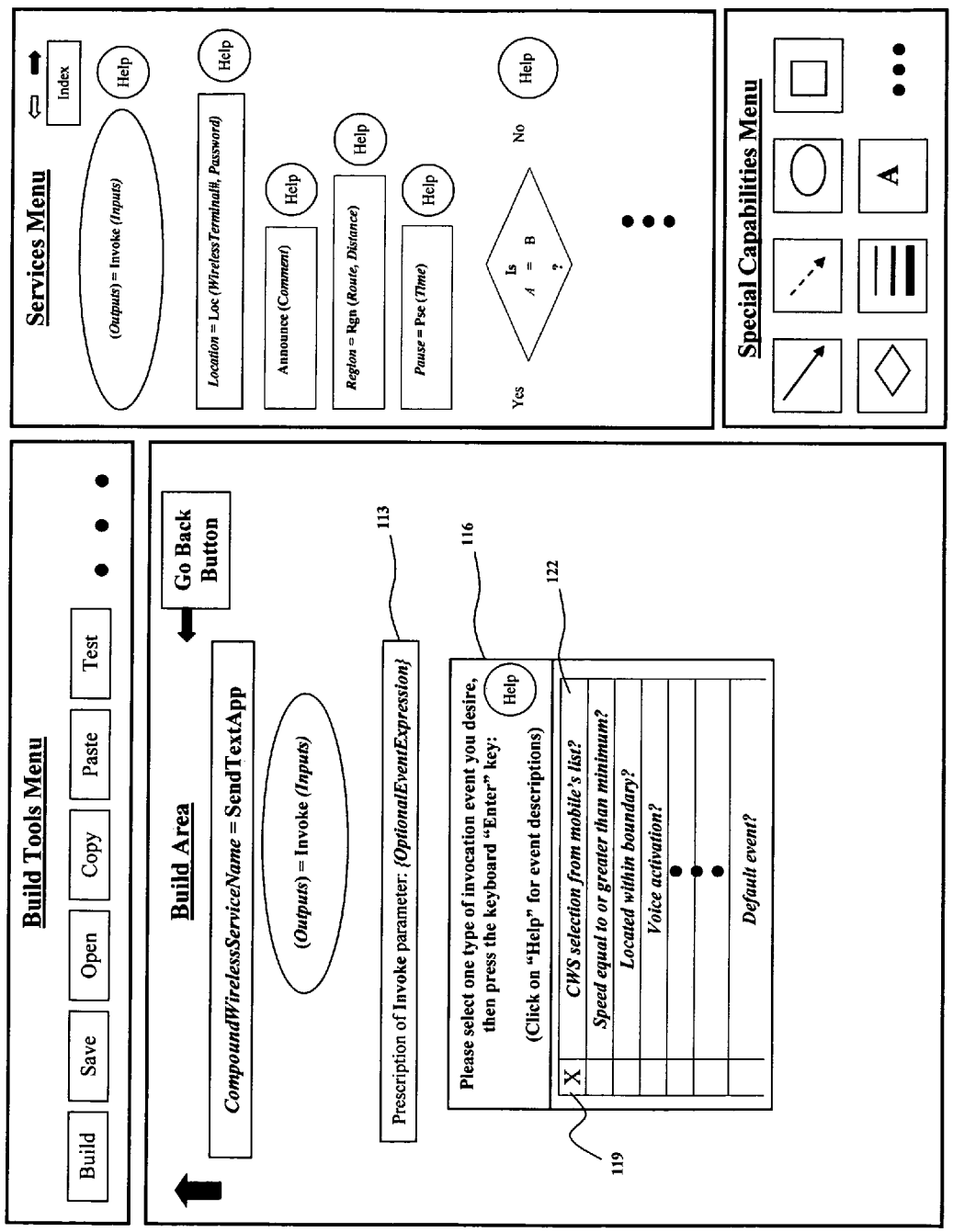
FIG. 7 shows how to select the first event for a Boolean expression.

After the builder presses the "Enter" key, the windows of FIG. 7 appear, containing a window 113 that specifies the parameter {OptionalEventExpression} will be addressed. This parameter represents the Boolean expression for invocation. A list of events 116 appears in another window. The builder is shown to have checked 119 the row "CWS selection from Mobile's list?" 122 for one of the wireless mobile terminal CWS app invocation events (the curser was pointed to the corresponding box 119 and checked). By selecting this invocation event, a user is to perform the actions on a wireless mobile terminal that displays the CWS apps on its screen. Depending on the wireless mobile terminal and/or a user's option, the wireless mobile terminal displays the names and/or icons to represent the mobile's list of CWS apps. The user is to scroll through the list and click on the desired CWS app, when it appears, to instigate the invocation event.

Figure 8:
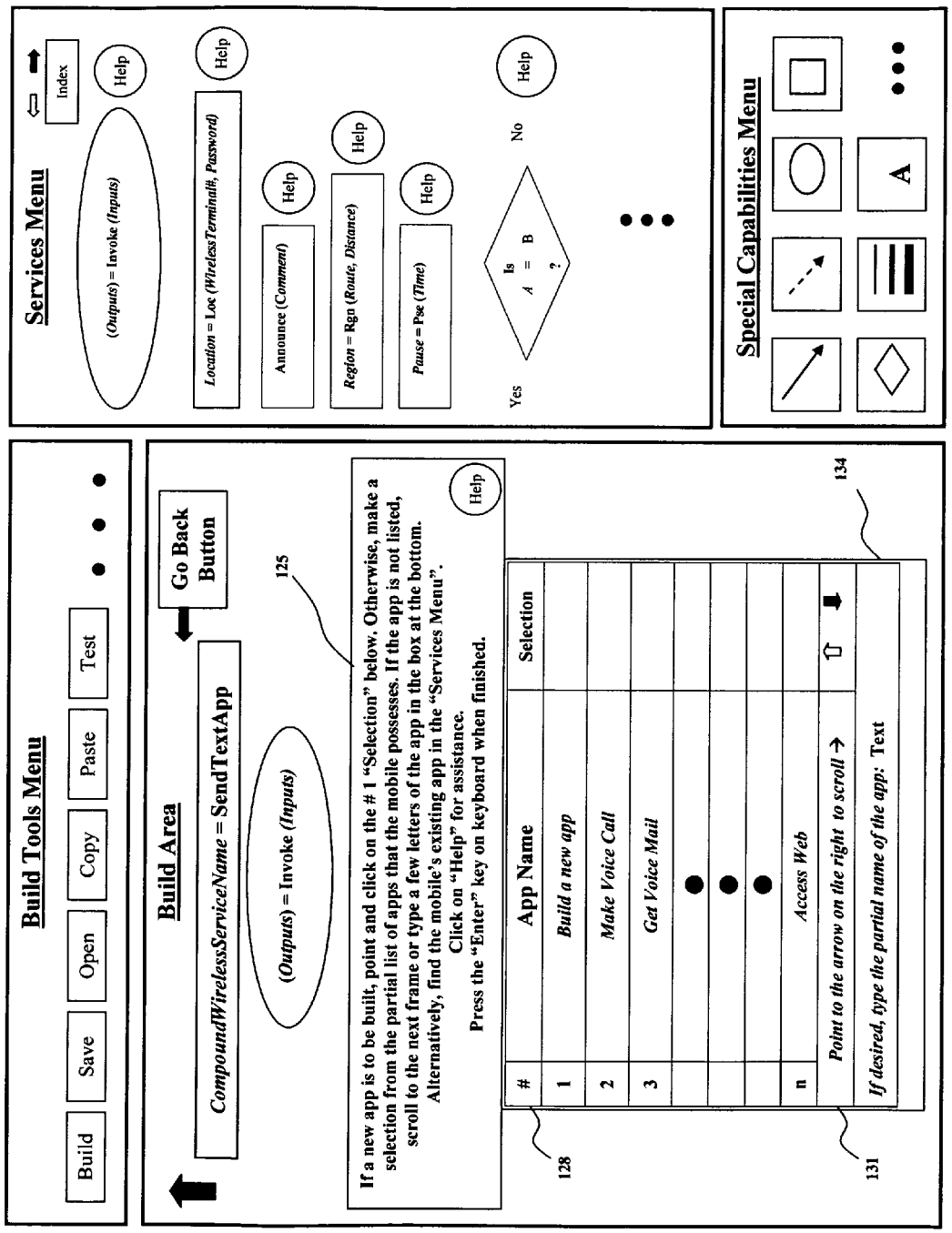
FIG. 8 demonstrates identifying a CWS app by means of typing a partial name of the CWS app.

By depressing the "Enter" key, FIG. 8 will now appear. The CWS app builder is asked to indicate whether a new CWS app will be built or if the Invoke facility service is to be concatenated onto an existing CWS app, then the existing CWS app is to be identified 125. If the CWS app name 128 is not listed, the builder has the option of scrolling farther in the list 131 (the grayed arrow implies no scrolling in its direction is possible for the shown CWS app frame list) or typing some of the CWS apps letters 134. Another option is to scroll through the Services Menu to find the existing CWS app. The builder decided not to build a CWS app and selected the option of typing some of the CWS app's letters ("Text"). By doing this, the interactive graphical compiler will search the list of CWS apps to provide one or more potential matches in another window (not shown here). The window will identify the potential matches in the same manner as in the list displayed by the wireless mobile terminal; i.e., name and/or icon. If the CWS app desired by the builder is not among those proposed by the interactive graphical compiler, the builder's rejection will result in a fresh version of FIG. 7; i.e., the FIG. 7 windows are presented, without a checked box 119, to iterate the process of determining the desired CWS app or to build a new CWS app.

Assume that the CWS app builder has found the CWS app (e.g., GenericTextTransmission) from which the CWS app SendTextApp is to be built with a Boolean expression for invocation; the Boolean expression is evaluated as "True" for texting to be permitted. Not shown is the CWS app building step that provides an acknowledgement window in which the interactive graphical compiler displays the full name of the selected CWS app (e.g., GenericTextTransmission) and requests confirmation that the displayed CWS app is the one desired by the builder.

Figure 9:
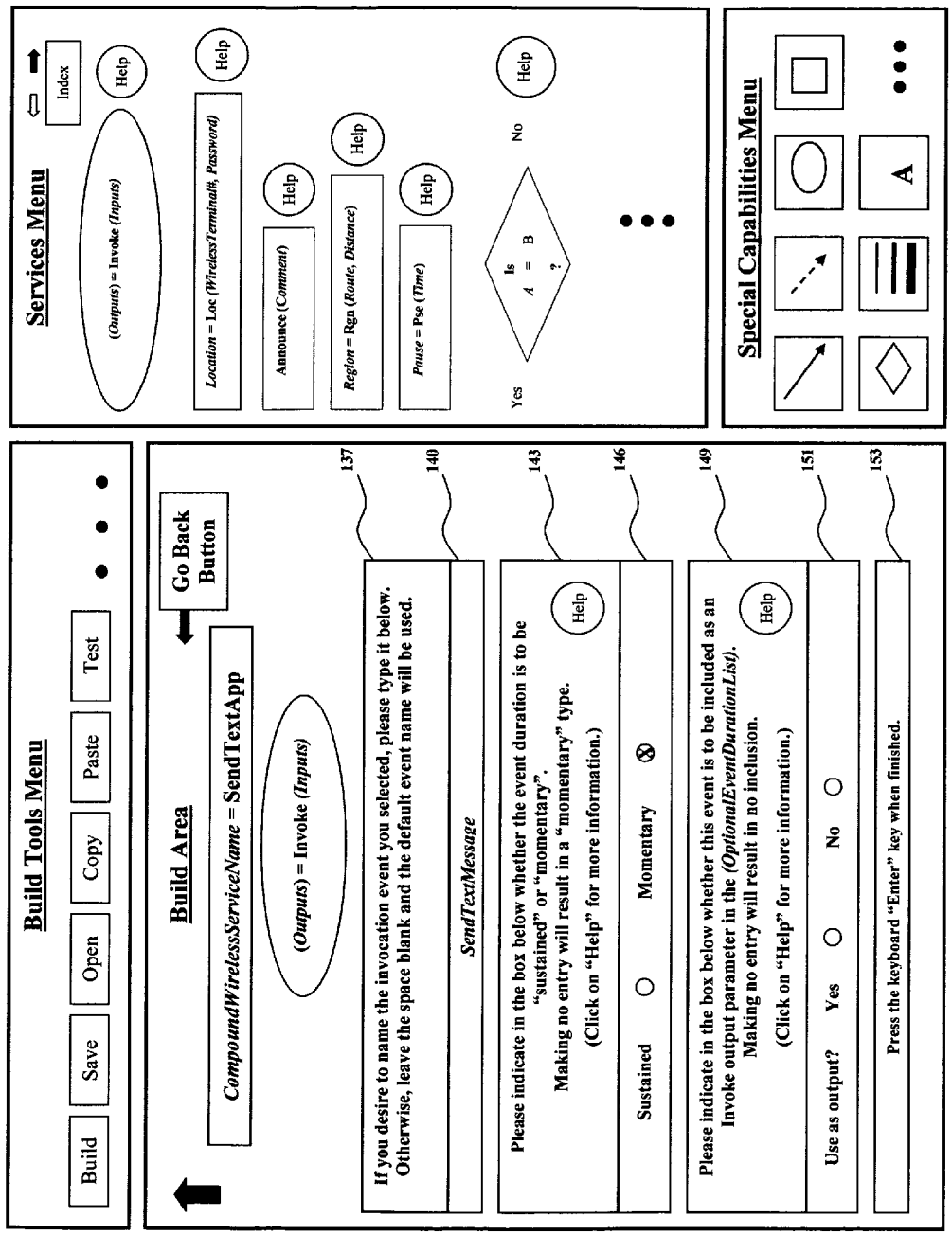
FIG. 9 demonstrates naming the first event, indicating its duration, and identifying if it is to be an output.

After the builder and the interactive graphical compiler agree on the CWS app for which the Invoke facility is to apply, FIG. 9 will appear. The builder is provided with an option to name the selected event 137 of manually selecting the CWS app from the wireless mobile terminal's list. A window 140 shows that the event name SendTextMessage was typed by the builder. Had the builder not entered a name, a generic event type name (e.g., GenericTextTransmission) would appear in the Boolean expression for wireless mobile terminal CWS app invocation Boolean expression.

The next lower window 143 requests that the event duration be prescribed. This is the parameter (OptionalEventDurationList), as previously selected for interactive graphical compiler interactivity. The builder selected the event SendTextMessage is to be "Momentary" 146 rather than "Sustained". The difference between the two durations is that "Momentary" means that one observance suffices in establishing the event occurrence (a "True" value) of a CWS app. "Sustained" means that the event will be repeatedly examined over a time period. The examination period need not be limited to the interval for which the Boolean expression's event test path takes place, but can continue during the entire CWS app's execution. If the event occurs (a "True" value), it must remain "True" for every successive examination; otherwise a "Sustained" event reverts to a "False" value until another occurrence of the "Sustained" event.

A window also exists that inquires whether the event name of SendTextMessage and its assigned duration is to be part of the Invoke output 149. Being an output permits the values to be displayed to the wireless mobile terminal user when the CWS app is executed. Because the builder decided not to respond 151, the default of not being an output will exist. After the "Enter" key 153 is depressed, the windows of FIG. 10 will appear. Had the builder provided a "Yes" response to the output request, another window (not shown) would have appeared to create an output parameter name belonging to the (OptionalEventDurationList). That is, the interactive graphical compiler would pose a query to allow a name substitution for the (event name, duration) pair to be used in the (OptionalEventDurationList).

Figure 10:
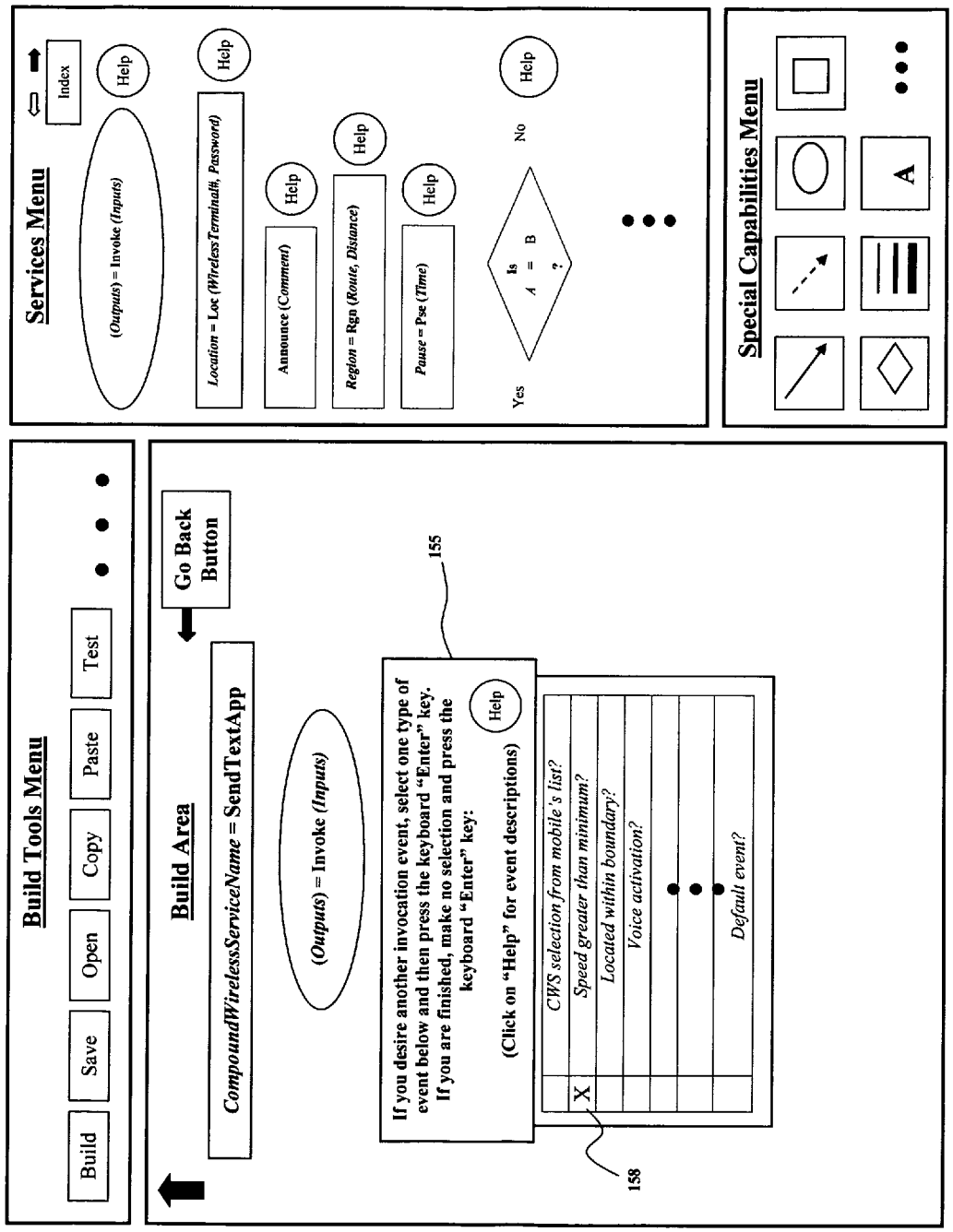
FIG. 10 shows how to select the second event for a Boolean expression.

In FIG. 10, the builder is queried 155 as to whether another invocation event is desired. The window shows that "Speed greater than minimum?" 158 was selected as another event for the wireless mobile terminal CWS app invocation. The speed of the wireless mobile terminal can be determined in a variety of ways. The service provider and/or the manufacturer may decide to use the difference of two GPS measurements divided by the time interval between measurements. For the wireless mobile terminal speed while in a vehicle, two possibilities are:

1. When the wireless mobile terminal is a permanent part of the vehicle—A wired communication link to a vehicle's speed sensor; e.g., the vehicle's speedometer.
2. For a portable wireless mobile terminal—A wireless link (e.g., Bluetooth) to a vehicle's speed sensor to ascertain the wireless mobile terminal speed.

A combination consisting of the above two and/or other possibilities can be used to prevent having a driver defeat detection of an attempt to invoke the wireless mobile terminal CWS app while a vehicle is in motion.

After the "Enter" key for FIG. 10 is depressed, ensuing windows will appear (not shown here) to continue dialog with the interactive graphical compiler. One of the windows will be for an entry of the minimum numerical wireless mobile terminal speed above which the event is "True". Another window is provided for the minimum speed in terms of distance units and time units; e.g., inches, feet, yards, miles, centimeters, meters, kilometers, seconds, minutes, hours, days, and months. Assume the builder indicates a minimum of zero (0) miles/hour, hence a speed greater than zero is the contradiction of not moving.

Figure 11:
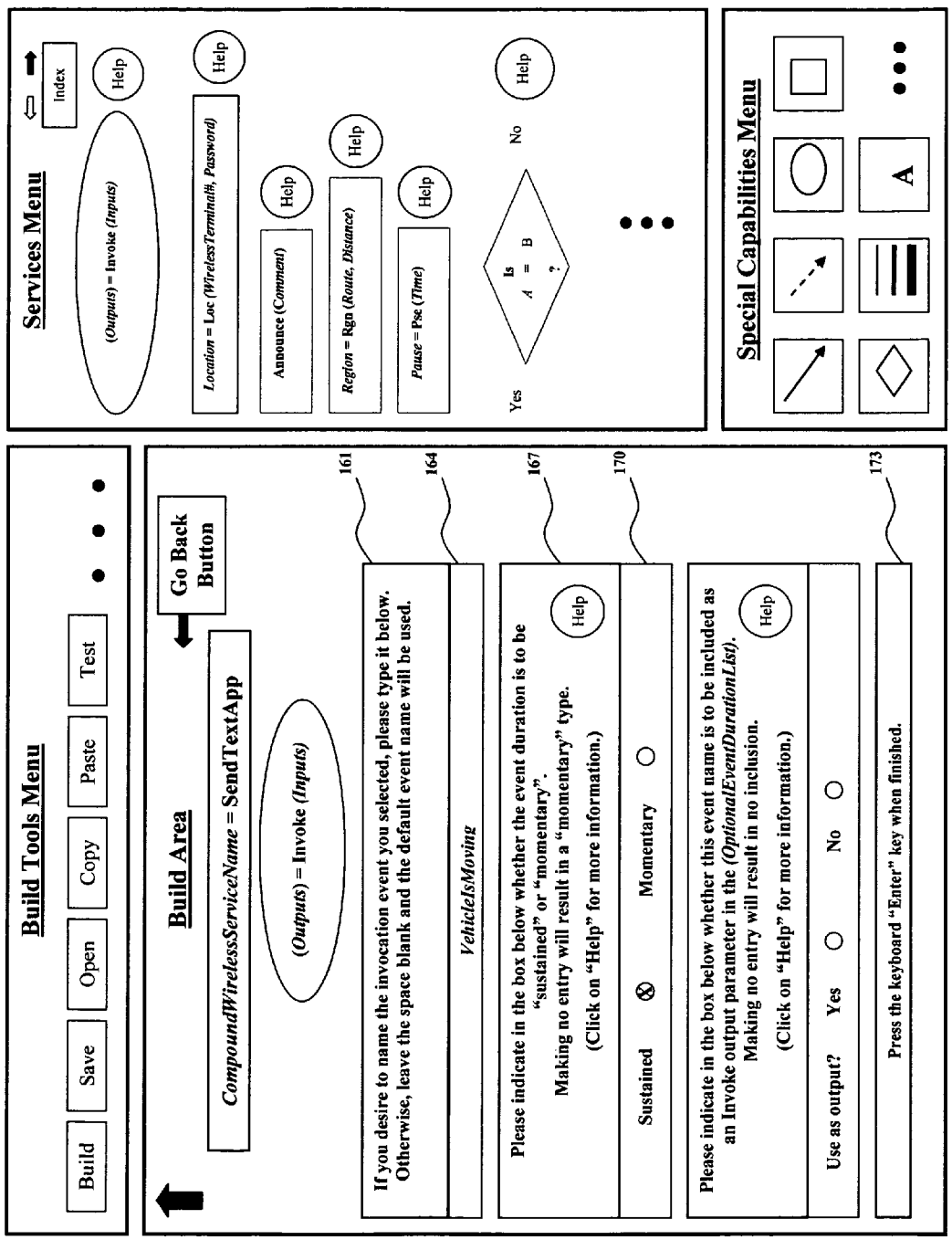
FIG. 11 demonstrates naming the second event, indicating its duration, and identifying if it is to be an output.

After completing the not shown window to provide the minimum speed value and depressing the "Enter" key, the windows of FIG. 11 appear. The interactive graphical compiler now requests 161 that a name for the event be placed in the window below 164. For this example, the builder typed VehicleIsMoving 164. The interactive graphical compiler also requests that the event duration be specified 167, for which "Sustained" duration is selected 170. After depressing the "Enter" key 173, FIG. 12 appears.

Figure 12:
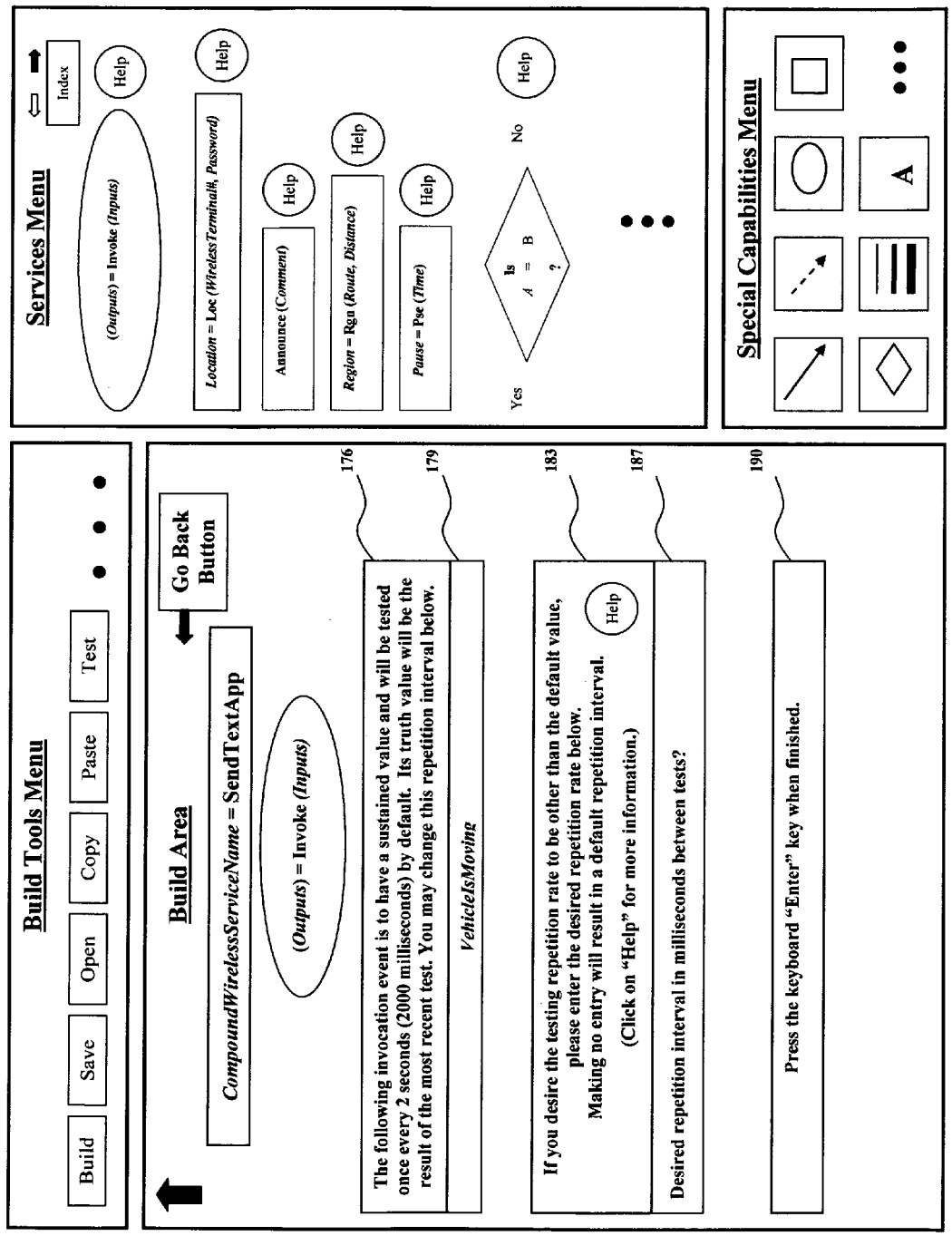
FIG. 12 indicates the default interval between "Sustained" event tests and indicates how to change this interval.

A window in FIG. 12 indicates that the default repetition rate is one test every 2 seconds 176 for the "Sustained" event VehicleIsMoving 179. Another window 183 exists in FIG. 12 which describes the opportunity to change the repetition rate 187 in milliseconds between tests. The builder has decided not to change the repetition rate by not entering a different repletion rate 187. The event testing will continue beyond invocation, while the CWS app is executing. This is because all events represent parameters accessible throughout the execution of a CWS app, testing this event continually can assure that, following the CWS app's invocation, the driver is unable to continue texting if vehicle's motion is resumed. The builder of the CWS app needs only to strategically insert component services (CS) that examine the value of VehicleIsMoving and, if "True" terminate the SendTextApp CWS app. An alternate means to assure that the CWS app will not continue to execute if the vehicle resumes its motion, is to re-use the Invoke facility service, with only the event (Not VehicleIsMoving), in strategic places within the CWS app.

Figure 13:
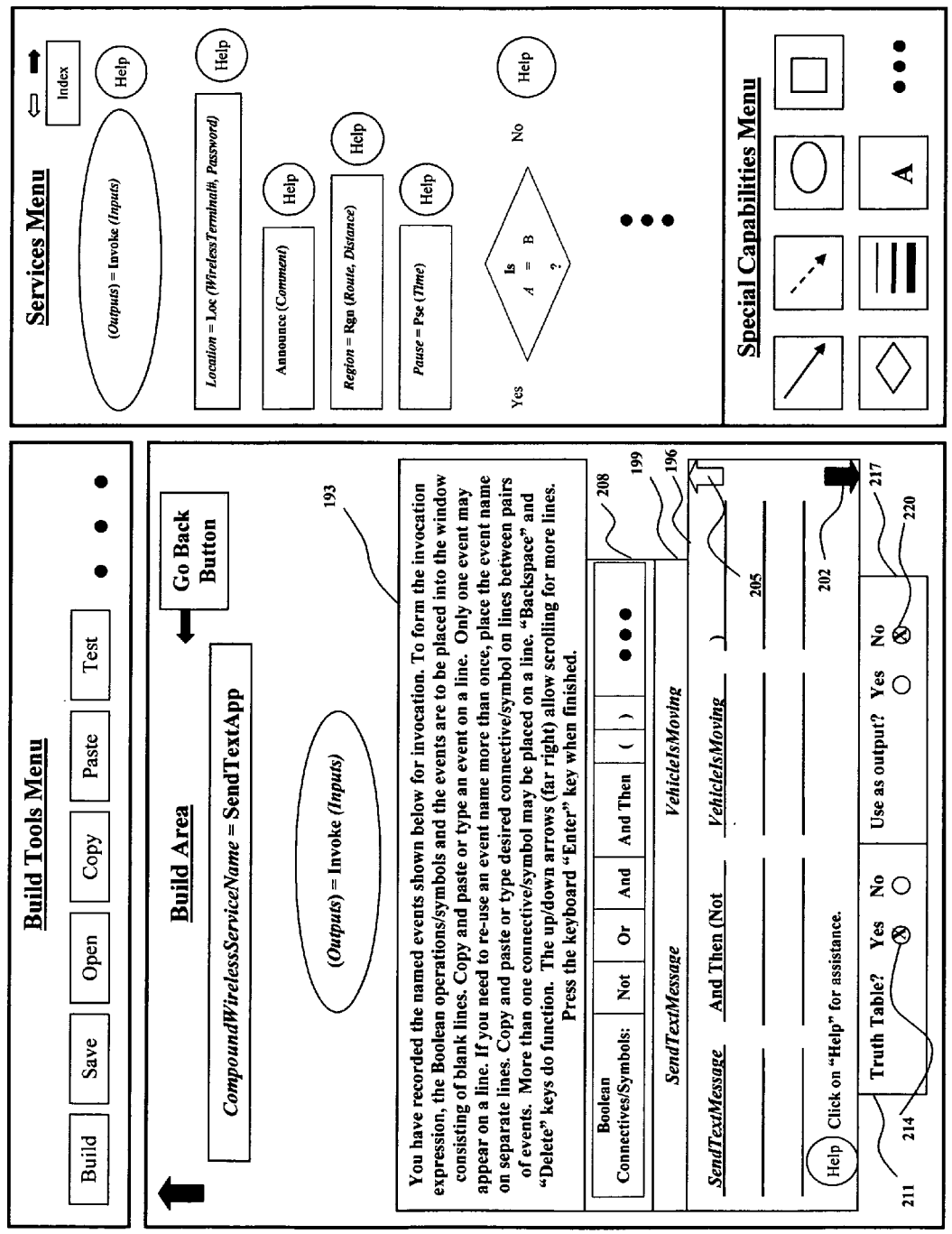
FIG. 13 illustrates how to specify the Boolean expression of the prescribed events, request a truth table for the Boolean expression, and indicate whether the Boolean expression is to be an output.

After completing the dialog 190 for FIG. 12, the windows of FIG. 10 will reappear, but without the checkmark 158. Because no more events are planned, the builder will press the enter key with no event selection. This will result in windows for the formation of an invocation Boolean expression, as illustrated in FIG. 13. A window 193 in FIG. 13 indicates that the Boolean expression is to be written into a window 196 below, initially consisting of blank lines. The builder defined events 199 are shown in a separate window and each is to be placed on a blank line 196. If more lines are needed, then the window 196 can be scrolled with the down arrow 202. The grayed up arrow 205 will only function (becomes black) when some scrolling has taken place. The instruction window 193 also requests the typing/copying of Boolean connectives (operations) and symbols 208 onto the blank lines of the Boolean expression table 196, such that they separate each pair of events. The connective (operation) "Not" 208 is used to negate the occurrence of an event. That is, {Not Eventu} has a "True" evaluation when the test result of Eventu is "False" (Eventu has not occurred). The connective "Or" performs an inclusive disjunction. That is, the expression {Eventu Or Eventw} evaluates as "True" whenever Eventu is "True" (occurred) or Eventw is "True" or both events are "True". The connective "And" performs a conjunction. That is, the expression {Eventx And Eventy} evaluates as "True" if and only if Eventx and Eventy are "True". The expression {Event1 And Then Event2} evaluates as "True" if and only if both Event1 and Event2 are "True". Observe that And Then operates exactly as And. There is no logical distinction between these two operations. The distinction is that the interactive graphical compiler will create wireless mobile terminal instructions to have Event1 tested before Event2. A test for Event2 is performed if and only if the test for Event1 yields "True". The advantage of And Then is to eliminate unnecessary event testing, The named invocation events 199 were typed/copied onto the blank lines of the Boolean expression window 196 along with the Boolean Connectives/Symbols 208. The builder's result is the Boolean expression:

{SendTextMessage And Then (Not VehicleIsMoving)}

Figure 14:
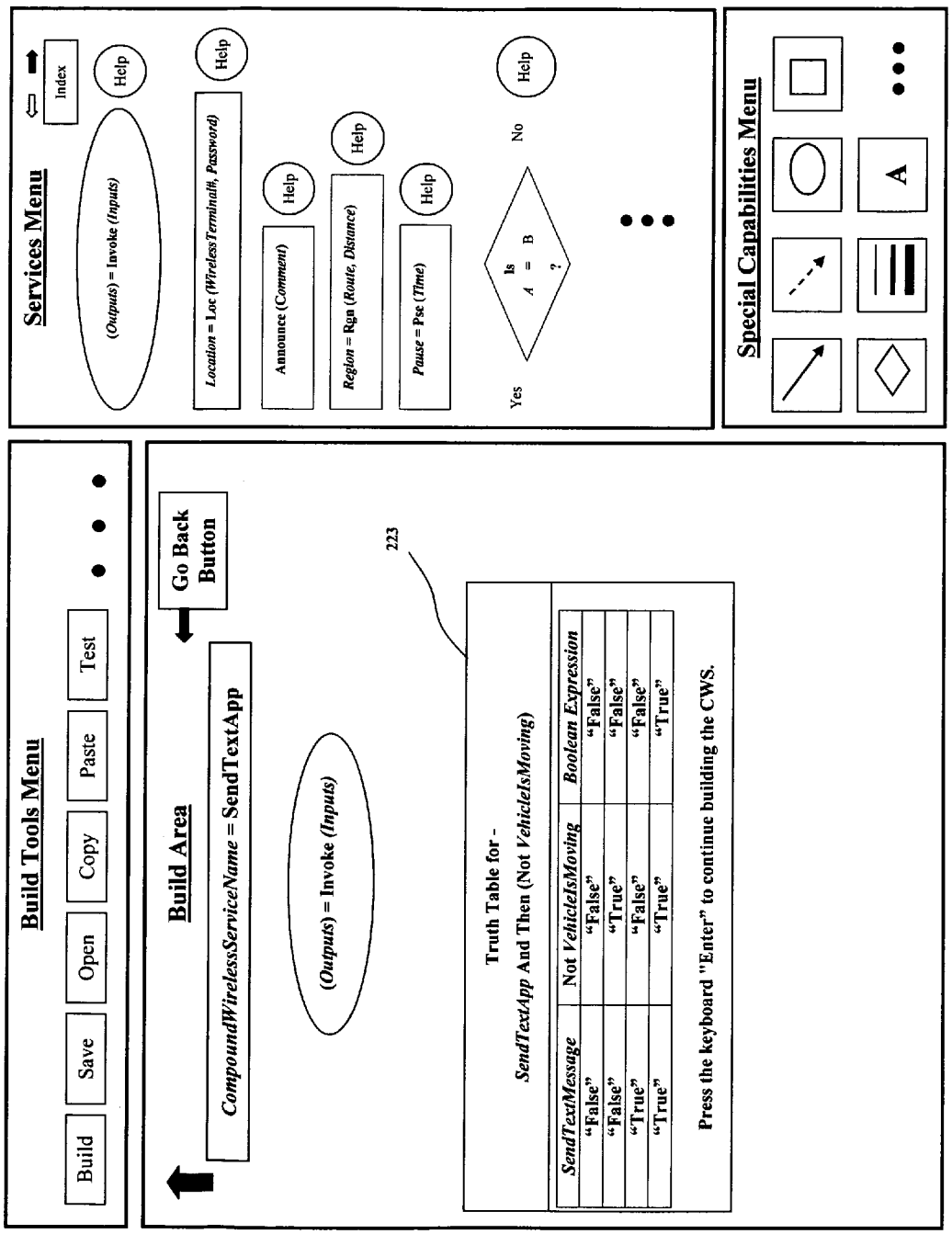
FIG. 14 presents the truth table for the CWS app builder's specified Boolean expression.

The builder is provided with an opportunity to see a truth table of the Boolean expression 211 and does so by pointing the curser and clicking on the "Yes" circle 214. An opportunity is also provided to use the Boolean invocation expression as an output 217. The builder decided not to have it an Invoke output by clicking on "No" 220. Had the builder provided a "Yes" response, a window would have appeared, after depressing the Enter key, for the output parameter for {OptionalEventExpression}. The interactive graphical compiler would then pose a query for a name substitution of the prescribed {OptionalEventExpression}. This name would be used in the CWS app for a display the prescribed {OptionalEventExpression} to the wireless mobile terminal user. Because "No" 220 was selected for an output, FIG. 14 will appear after depressing the Enter key.

The truth table 223 entries appear (FIG. 14) because the builder had requested to see it. After examining the truth table for consistency with the intended Boolean expression, the builder has the option to click on the "Go Back Button" to modify the Boolean expression or press the "Enter" key. By pressing the "Enter" key, FIG. 15 appears and summarizes the building results thus far 225. The (Inputs) of Invoke contain the {OptionalEventExpression} and the non-default (builder prescribed) entries to the (OptionalEventDurationList) 225. No (Outputs) have been prescribed by the builder 225.

The interactive graphical compiler indicates a default value of 1 second for the event observation repetition interval and a 2 seconds event reset interval 227. The builder had requested interactive graphical compiler interactivity for the OptionalObservationRepetitionInterval (FIG. 6 104). The builder is therefore provided with an opportunity to change from the default values by making entries into another window 230

Figure 15:
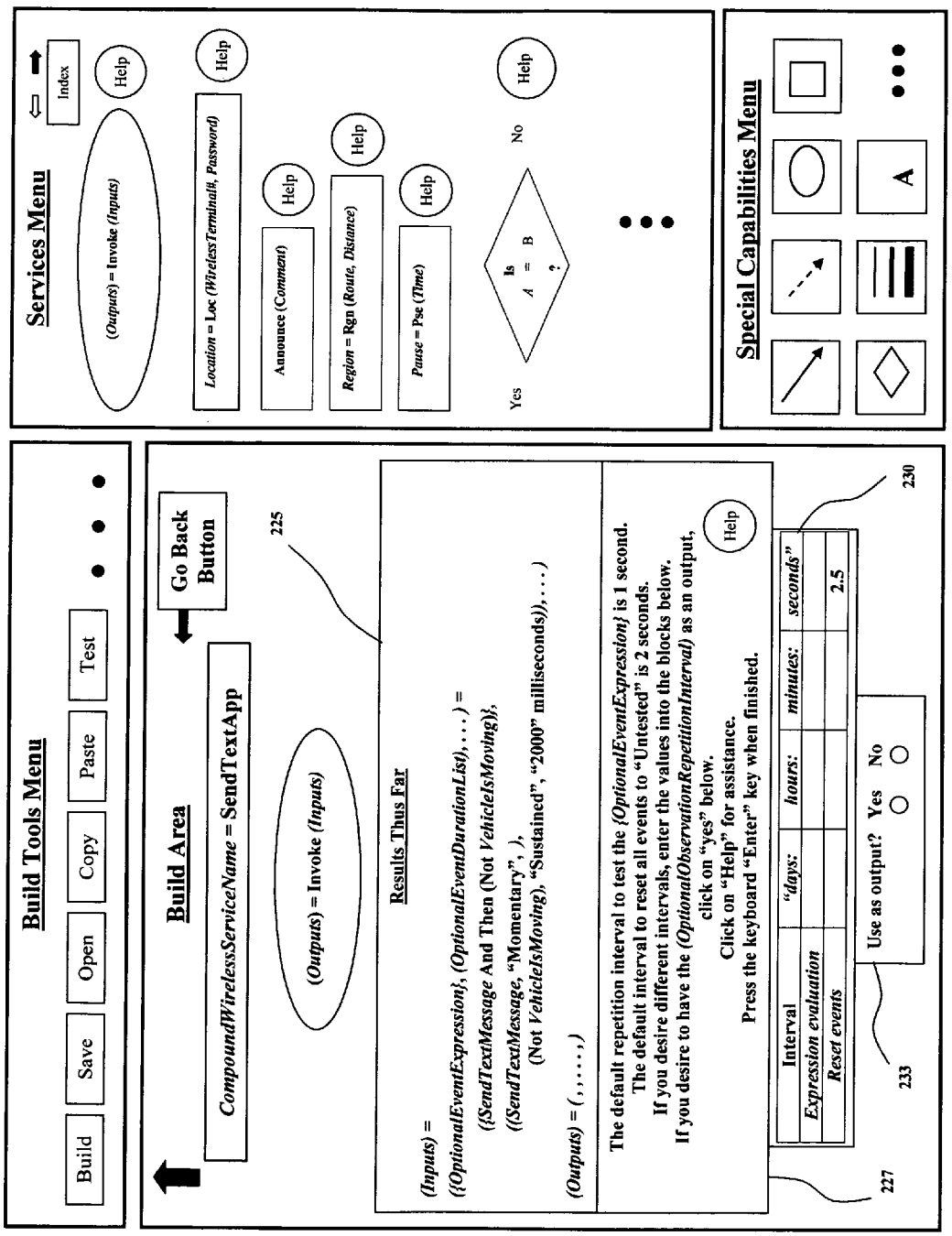
FIG. 15 presents the partial Invoke facility service builder defined parameters and provides an opportunity to change the interval for Boolean expression evaluation and interval to reset event values.

(FIG. 15). The builder decided to only change the reset interval and made the entry of "2.5" seconds into the appropriate window 230. The builder also decided to maintain the default value for the Boolean expression evaluation interval. The builder is provided an opportunity to have OptionalObservationRepetitionInterval as part of the Invoke output 233. No selection is made for the output and OptionalObservationRepetitionInterval will not be included in the output. After the builder presses the "enter" key 227, the windows of FIG. 16 appear. Had the builder provided a "Yes" response 233, a different window would have appeared to create the output for the parameter OptionalObservationRepetitionInterval. The interactive graphical compiler would pose the query for name substitutions for OptionalObservationRepetitionInterval components in this window.

The remaining parameters of the Invoke facility service, for which the builder requested interactive graphical compiler interactivity, are:
(OptionalEventFailureNotification)
(OptionalEventPathData)
(OptionalEventFailureNotificationSchema)

Figure 16:
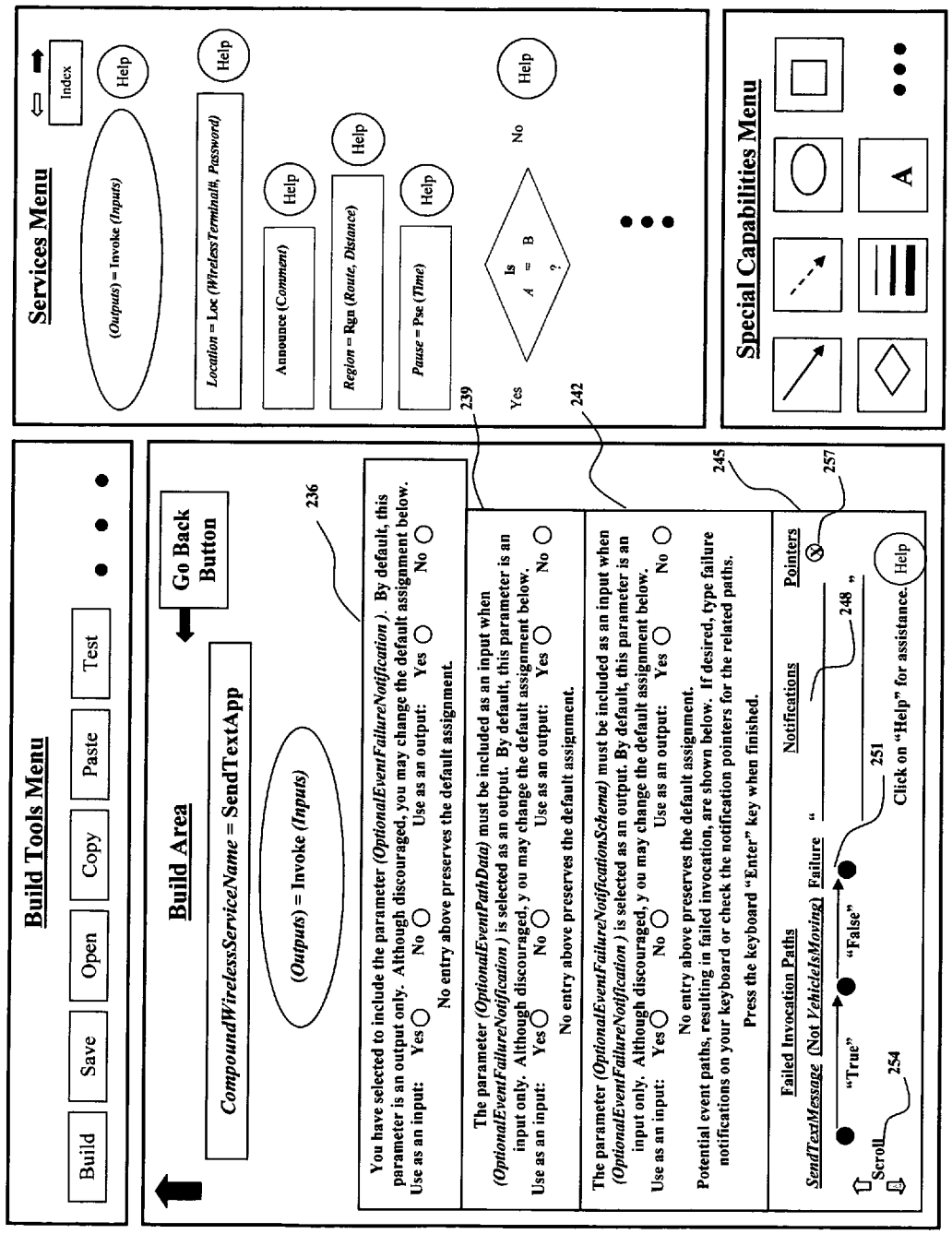
FIG. 16 illustrates how to assign the event failure parameters as inputs/outputs and how to QWERTY keyboard prescribe failure notifications or failure notifications pointers for the failed invocation paths.

Interactive graphical compiler interactivity for the preceding three parameters is shown in FIG. 16. The window 236, which pertains to (OptionalEventFailureNotification) output parameter, provides an opportunity for the builder to make this parameter an input and/or output parameter. Changing the output default assignment of (OptionalEventFailureNotification) is discouraged because it can establish erroneous results when Invoke is executed. By making no entry, the default of solely an output parameter is assigned to (OptionalEventFailureNotification). The next window 239 deals with the parameter (OptionalEventPathData). The (OptionalEventPathData) is intended as an input and possesses all potential event test paths for the prescribed Boolean expression. It also contains the Boolean expression's evaluation for each path and an event test path label. These values are assigned by the interactive graphical compiler and cannot be altered by the wireless mobile terminal CWS app builder. Although discouraged for possibly erroneous results reasons, the builder is provided an opportunity to make this parameter an input and/or output parameter. By making no entry, the default of solely an input parameter is assigned to (OptionalEventPathData). Although discouraged for possibly erroneous results reasons, the next window 242 provides an opportunity for the builder to make (OptionalEventFailureNotificationSchema) an input and/or output parameter. By making no entry, the default of solely an input parameter is assigned to (OptionalEventFailureNotificationSchema). This window 242 also contains instructions for assigning notifications to event test paths that result in an invocation failure. The notifications are assigned in the window below 245. Typed QWERTY keyboard notifications 248 may be entered on the lines to the right of a displayed events path 251. For this example, only one path 251 satisfies the three conditions of at least one "True" event test, at least one "False" event test, and a failed ("False") invocation. Because of only one path, the "scroll" arrows 254 are grayed. Had more paths been available, a black scroll arrow(s) would have existed to move to other failed invocation paths. Also, the interactive graphical compiler will oblige the wireless mobile terminal CWS app builder to scroll to and view every failed invocation path before proceeding to the next set of windows. Rather than entering a notification 248, the builder placed a check 257 for a notification pointer. This needs to be done whenever a notification has a non-QWERTY keyboard component. For the example, an audio notification (e.g., the audio announcement "texting is not permitted within a moving vehicle") may be the reason for the pointer. Pointers can be used to other than audio announcements; e.g., video messages, general pictorial representations such as icons, remote destination addresses, any data signal.

Figure 17:
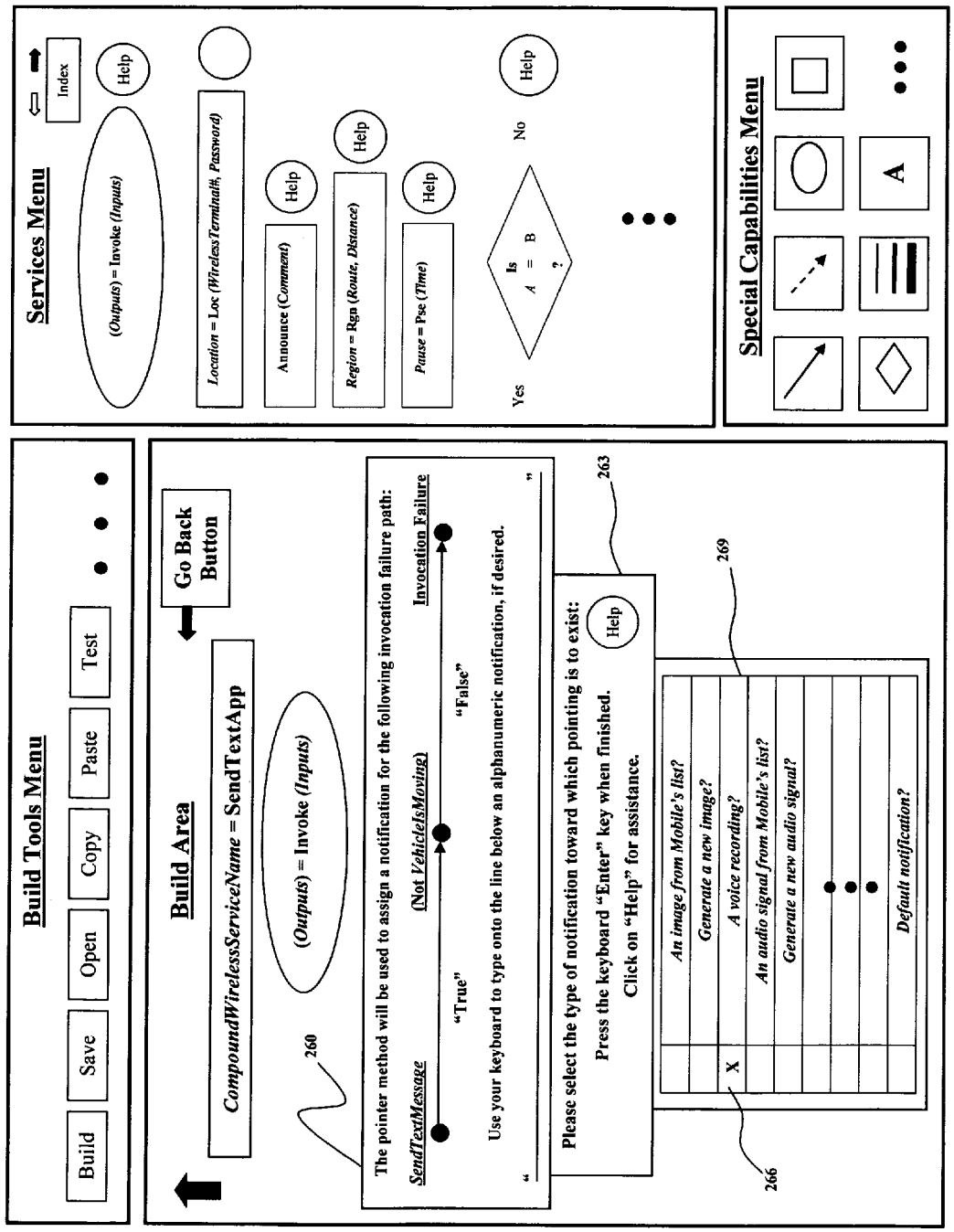
FIG. 17 demonstrates selecting a type of failure notification when a pointer to a failure notification is selected.

After depressing the keyboard "Enter" key, FIG. 17 will appear. A window exists 260 that displays the path for which a notification pointer (indirection) is to be used. This window 260 provides another opportunity to include a QWERTY keyboard notification (in conjunction with the indirect notification). Instructions 263 for selecting the non-QWERTY keyboard notification are provided in another window. The builder has selected 266 "A voice recording" 269 from the list.

After the keyboard "Enter" key is depressed for FIG. 17, windows (not shown here) will appear for interactive graphical compiler interactivity to record a voice message. If other failed invocation paths are to have notification pointers, the windows of FIG. 17 will be presented with alterations commensurate with another failed invocation path. Interactive graphical compiler interactivity will again take place in a manner appropriate for the type of notification. This process is repeated until the notification entries are completed. During the process of completing the failure notifications, the builder is provided with an opportunity to rename all three of the failure notification parameters.

The (OptionalEventFailureNotificationSchema) is the final parameter of the Invoke facility service. The resultant Invoke facility service built is:
(,,,,,,,,,,,EventFailureNotification,,)=Invoke
({SendTextMessage And Then (Not VehicleIsMoving)}, ((SendTextMessage, "Momentary"), ((Not VehicleIsMoving), "Sustained"), ,,,,,,,,,,EventPathData, EventFailureNotificationSchema)

Although complete renaming of parameters is permitted, only the part "Optional" and parentheses have been removed above to assist in the association with the syntactical definition of the Invoke facility service. The commas are very important because they identify the parameters. For example, the input parameter "EventFailureNotification" follows the eleventh comma, which identifies it as the (OptionalEventFailureNotification) parameter. Afterwards, a rectangle, representing the CWS app (e.g., GenericTextTransmission), appears in the "Build Area". An arrowed line is directed from the Invoke facility service to the rectangle. The remainder of the wireless mobile terminal CWS app is to be built, using the Invoke facility service and the GenericTextTransmission as CS of the CWS app.

Considerations to Enhance Safe Use of Wireless Mobile Terminals in Moving Vehicles Considerations for restricting a wireless mobile terminal to safe usage in vehicles are now addressed. Safe usage is enhanced by preventing a driver from invoking CWS apps that are considered to create dangerous situations when the vehicle is moving. The restrictive methods depend on at least the following:
1. The wireless mobile terminal is a fixed part of the vehicle and cannot be moved (non-portable);
2. The wireless mobile terminal is portable, but must rest in a vehicle's wireless mobile terminal cradle to operate within the vehicle when the engine is running and/or the vehicle is in motion;
3. The wireless mobile terminal is portable and does not need to rest in a vehicle's wireless mobile terminal cradle to operate;
4. The restricted wireless mobile terminal CWS app is to respond to voice commands, including invocation;

5. The restricted wireless mobile terminal CWS app requires manual operations, including invocation.

First consider that the wireless mobile terminal is part of the vehicle and cannot be moved (1. above). Locating the non-portable wireless mobile terminal beyond the reach of the driver will restrict all CWS apps that require manual operations (5. above). However, there may be CWS apps that should be invoked by the driver; e.g., changing the destination in a GPS system because of an emergency. This suggests that a vehicle's non-portable wireless mobile terminal should include CWS apps that respond to voice commands (4. above).

Now consider a portable wireless mobile terminal that must rest in a vehicle's cradle (2. above). As before, locating the portable wireless mobile terminal cradle beyond the reach of the driver will restrict all CWS apps that require manual operations (5. above). Those CWS apps that should be invoked by the driver are to respond to voice commands (4. above). Because the wireless mobile terminal can be used outside of the vehicle, the wireless mobile terminal must detect when it is in the vehicle with the engine running and/or the vehicle is in motion. If so, be rendered inoperable unless the wireless mobile terminal is in its cradle. An activation signal, such as that provided by an electromagnetic radio wave (e.g., a Bluetooth signal), can be used to oblige the wireless mobile terminal to placed in its cradle. The radio wave could be generated whenever engine is running and/or the speedometer indicates that the vehicle is in motion. The wireless mobile terminal interacts with the cradle to permit its operation.

Further consider a portable wireless mobile terminal that does not need to rest in a vehicle's wireless mobile terminal cradle to operate (3. above). Restrictions on CWS apps to enhance safety are still possible. For example, a wireless mobile terminal with GPS capability can determine if it is moving in the range of an automobile speed or if it is on a major highway.

Below is a partial list of restrictions, including those previously described, which may be deployed in an Invoke facility service:

1. A wireless mobile terminal moving beyond a specified threshold speed; e.g., as determined via a GPS measurement or a communication link to the vehicle's speedometer.
2. A wireless mobile terminal detected to be in proximity of the vehicle driver's seat; e.g., a Bluetooth or other radio wave position detection via high directivity dashboard antennae.
3. A voice actuated wireless mobile terminal CWS app that detects the voice of the vehicle driver; e.g., by means of a high directivity microphone for a stationary wireless mobile terminal or voice recognition of a driver's recording of the command to actuate the CWS app.
4. CWS app execution disapproval from an outside source communication; e.g., a service provider or law enforcement remotely sets a parameter state to restrict invocation of the CWS app.
5. A wireless mobile terminal is in a restricted area; e.g., when on a high speed highway as determined by a GPS measurement or a service provider's location service.
6. Denial of a CWS app when the wireless mobile terminal is in a particular vehicle; e.g., the particular vehicle possesses a Bluetooth or other radio wave generator that signals an invocation restriction of one or more CWS apps.
7. Denial of a CWS app when the driver's seat of a vehicle is occupied and the vehicle's engine is running; e.g. a pressure transducer that senses weight on the seat and communicates with the wireless mobile terminal to restrict one or more CWS apps.

Restricting invocation is achieved by means of the negation operation Not. That is, the logical expression to invoke a wireless mobile terminal CWS app will contain the operation "Not" followed by an event that will restrict invocation of the wireless mobile terminal CWS app.

Example of Restrictive Deployment

The previous dependencies for restrictive methods and the corresponding list of restrictions will now be employed to provide an example of a CWS app invocation Boolean expression to enhance safe use of a wireless mobile terminal in a vehicle. First consider a wireless mobile terminal that is a fixed part of the vehicle and cannot be moved (restriction 1.). Also, the wireless mobile terminal CWS app is to be voice invoked by the parameter named AppVoiceCommand. (Bold italicized words are used to represent the parameters in a Boolean expression for wireless mobile terminal CWS app invocation.)

It is desirable to have the wireless mobile terminal designed to detect when it is moving and thereby determine that a vehicle is moving (e.g., the event VehicleMoving). It is also desirable to only restrict the driver from invoking AppVoiceCommand when the vehicle is moving. However, a passenger could be permitted to invoke the CWS app with an AppVoiceCommand, irrespective of the EngineRunning truth value. Hence, the wireless mobile terminal would determine when the driver issues the voice command (e.g., the event DriverVoice) represented by AppVoiceCommand parameter and restrict invocation. Various methods exist to accomplish such detection of the driver's voice command. One method is voice recognition. That is, the driver will record the voice command for the wireless mobile terminal CWS app. The wireless mobile terminal will identify the driver by comparing a received voice command with the recorded version. Another method is to have a high directivity microphone for the vehicle's wireless mobile terminal that determines when the voice command arrives from the driver's position. A passenger, who would never drive the vehicle, need not have their voice recorded for the AppVoiceCommand parameter. A generic version of AppVoiceCommand can be used that would match anyone speaking the command. The parameter DriverVoice contains the specific recording of the command made by the driver.

In the interest of safety, if the driver speaks AppVoiceCommand, invocation of the CWS app is conditioned on (i.e., Not VehicleMoving). The following Boolean expression will accommodate the safe condition for a driver's invocation and also invoke the CWS app whenever AppVoiceCommand is spoken by a passenger (i.e., Not DriverVoice) regardless of whether the vehicle is moving and or is stationary:

{AppVoiceCommand And Then ((Not Driver Voice) Or (Not VehicleMoving))}

The truth table 272 for the preceding Boolean expression is shown in FIG. 18.

The "And Then" Basis to Improve Event Test Path Efficiency

It is important to digress from presenting Invoke facility service examples on enhancement of safe wireless mobile terminal usage in a vehicle. The topic of improving event test path efficiency will now be addressed.

It is expected that a plethora of invocation event types will exist. Because the wireless mobile terminal is a multi-tasking device, continual testing of all event types would burden and cause slow operation of the wireless mobile terminal's central processor unit. Mitigation of this potential problem is accomplished by the logical connective "And Then". Consider the following Boolean expression:

{PrecedingExpression And Then FollowingExpression}

The use of "And Then" is defined to logically operate exactly as the conjunctive connective "And". The truth tables for {PrecedingExpression And FollowingExpression} 275 and for {PrecedingExpression And Then FollowingExpression} 278, are shown in FIG. 19, to be exactly the same. Another point that should be brought to bear is that {PrecedingExpression And Then FollowingExpression} 278 is not equivalent to {If PrecedingExpression Then FollowingExpression} 281 (i.e., the conditional connective or implication "If . . . , Then . . . " is not the same operation as "And Then"). The truth table in FIG. 19 also delineates between the use of "And Then" and "If . . . , Then . . . ", as connoted herein.

The "And Then" connective introduces a sequential aspect to testing the occurrence of events (i.e., event truth values). That is, the event(s) constituting PrecedingExpression are first tested for their truth value(s) before the events of FollowingExpression are tested for their truth value(s). Because "And Then" is logically the same operation as "And", if the events of PrecedingExpression result in a "False" value for the PrecedingExpression, then the entire Boolean expression (i.e., {PrecedingExpression And Then FollowingExpression}) is "False". Hence, there exists no need to test the events within the FollowingExpression for the situation of a "False" PrecedingExpression and processing time can be saved. In here, {PrecedingExpression And Then FollowingExpression} is merely to imply, that the physical implementation for sensing events, is to test for the binary value of PrecedingExpression before testing the binary value FollowingExpression. If and only if PrecedingExpression has the value of "True", will testing need to be made for the binary value of FollowingExpression.

Boolean Expression Evaluation Algorithms

It is permissible for a Boolean expression to contain more than one substitution of "And Then" for the operator "And". Such substitutions will reduce the quantity of events to be tested for concluding the Boolean expression's truth value. However, it is possible to alter the intent of a Boolean expression by indiscriminately replacing "And" by "And Then" and consequently resulting in an erroneous event test path. An algorithm, termed "test path efficiency algorithm", is now provided to reduce the quantity of tested events and correctly determine the event test path to ascertain a Boolean expression's truth value.

An important ingredient of the test path efficiency algorithm is a minimization procedure for the representation of a logic function; e.g., Karnough maps, Quine-McCluskey method. Minimization procedures are used to reduce the cost of computer logic circuits by obtaining switching functions that imply the smallest number logic elements. They are described in terms of switching algebra, which is a descendent of Boolean logic. The two mathematical disciplines are equivalent; i.e., they are isomorphic algebras.

Because minimization procedures are described with respect to switching algebra, switching algebra will be employed for the remainder of the test path efficiency algorithm description. A transformation will now be defined to transform from Boolean (logic) expressions to switching (algebra) functions. The Boolean logic operator symbols of "And" and "Or" will be represented in the switching algebra notation of "*" (named "product") and "+" (named "sum"), respectively. Variables will no longer be identified by words (e.g., Driver Voice), but by single letters (D) and subscripted letters ($D_V$). The operator "*" is generally used for emphasis. Two letters, side by side, are understood to have the operator "*" between them; i.e., $AD_V = A*D_V$. Negation (Not) will be represented by an apostrophe following the negated variable (D'). The binary values "True" and "False" are represented by "1" and "0", respectively. Because the two algebras are equivalent, it is possible to apply the minimization procedures to Boolean logic. However, notational convenience makes switching algebra preferable when deploying a minimization procedure.

The above two minimization procedures are generally used to form switching functions (f) that are represented as a sum of products:

$$f = P_1 + P_2 + \ldots + P_i \ldots P_n$$

Where:
$P_i = X_{i1} X_{i2} \ldots X_{ij} \ldots X_{im}$
And: $X_{ij}$ represents an event of the switching function.
And: $m \geq 1$ (a product can contain only one event).

The operator "And Then" is intended to imply the sequence of events to be tested. This indicates that the sum of products format is inappropriate for the test path efficiency algorithm. The appropriate format is a switching function (g) having a product of sums format:

$$g = S_1 * S_2 * \ldots * S_i \ldots * S_q$$

Where: $S_i = Y_{i1} Y_{i2} + \ldots + Y_{ij} \ldots + Y_{ir}$ ($r \geq 1$, implying a sum can contain only one event).
And: $Y_{ij}$ represents an event of the switching function.

Conversion from a sum of products to a product of sums is possible via De Morgan's theorem:

$$(P_1 + P_2 + \ldots + P_i \ldots + P_n)' = P'_1 * P'_2 * \ldots * P'_i \ldots * P'_n$$

Where: $P'_i = (X_{i1} X_{i2} \ldots X_{ij} \ldots X_{im})' = X'_{i1} + X'_{i2} + \ldots + X'_{ij} \ldots + X'_{ir}$ Because of the negation, one performs minimization on the negated switching function and afterwards negates the negated switching function. With respect to the previously used function f, the switching function would be f'. This means that when f'=1, then f=0, and conversely. As will be seen in an ensuing example, this is simpler than the previous sentences may suggest.

It is also possible to have the minimization procedures yield a product of sums result. To accomplish this, the minimization procedures incorporate De Morgan's theorem directly. This incorporation will not be done here since the approach in which De Morgan's theorem is used directly is not intuitively satisfying. By using De Morgan's separately, the procedure is more easily understood.

The event test path is established from the minimized product of sums function. The product operation (*) is to connote "And Then"; signifying that the implied event test path proceeds from left to right for the sums of the function. This sequence also applies within a sum; i.e., the event test path proceeds from left to right within a sum.

If a sum of events is discovered to be "False" ($S_i = 0$), event test path can terminate since the function is "False" (g=0). If a sum is discovered to be "True" ($S_i = 1$), event test path needs to continue since all sums must be "True" (all $S_i = 1$) for the function to be "True" (g=1).

All events within a sum must be "False" (all $Y_{ij} = 0$) for the sum to be "False" ($S_i = 0$). This means that event test path within a sum must continue, when all preceding tested events of a sum were "False". Only one event of a sum needs to be "True" ($Y_{ij} = 1$) for a sum to be "True" ($S_i = 1$). This means that once an event within a sum is "True" ($Y_{ij} = 1$), there is no need to test the remaining events within the sum ($S_i = 1$). It should be added that prior to testing an event, the event is flagged as "Untested"; meaning that the value is unknown and cannot yet be used to evaluate a switching function.

Three additional strategies are incorporated to reduce the number of test path events:

1. The events within the sums are to be arranged so that the most frequently appearing events in the switching function are positioned to the left in the sums. This is achieved by counting the number of times an event appears in the switching function and placing those with the higher counts to the left within the sums.
2. The sums are to be arranged so that the sums with the fewest events appear to the left in the function. This is achieved by counting the number of times an event appears in the sums and placing those sums with the lowest counts to the left in the product of sums function.
3. When the sums have the same number of events, these sums are arranged so that those sums having the most frequently appearing events are positioned to the left in the product of sums function. This is achieved by counting the number of times an event appears in all of the sums and computing the total of these appearances for the events contained in a sum. The sums having the same number of events are ordered so that those of the highest totals are placed to the left in the product of sums function.

Sums containing fewer events will require fewer tests to determine the sum logic value. Hence, sums with fewer events should appear earlier (farther left) in the product. The events that appear more frequently in the function will impact more of the sums. Placing these events to the left in the sums will have them evaluated sooner, which hastens the value determination of more of the sums. If two sums have the same number of events, the sum having events that appear more frequently should have its events evaluated sooner for the same reasons as ordering the events in the sums.

The stepwise presentation of the test path efficiency algorithm to form the sum of products expression follows:

1. Transform the Boolean expression into a switching function (optional, but recommended).
2. Apply the negative of the switching function to a minimization procedure to obtain a sum of products expression.
3. Apply De Morgan's theorem to obtain the minimized product of sums form of the switching function (this is the second negation operation which achieves (g')'=g).
4. Count each of the event variables appearances in the switching function.
5. Order the event variables in each sum according their number of appearances in the switching function, such that the number of appearances increases to the left in each sum.
6. Order the sums in the product function to have the sums with the fewest events to the left.
7. For those sums having the same number of events, use the counts of the event variables appearances in the switching function to establish a total count for the event variables appearing in each of these sums.
8. Order the sums having the same number of events in the switching function according the total counts for the event variables appearing in each sum, such that their count totals increase to the left; when the number of events within a sum are equal; i.e., step 7 applies.
9. Transform the resultant switching function into the Boolean expression of the Invoke facility service, using "And Then" between the sums of product of sums expression.

The interactive graphical compiler will use the switching function to establish the sequential testing of events procedure. The implied sequence of the switching function is from the left to the right. The sum that is farthest to the left is selected first. The farthest left event within this sum is the first to be evaluated. The event test path continues by examining events to the right until a logic value for the sum is determined. If a switching function is not yet evaluated, the logical product "And Then" implies that the succeeding sum is to be selected. The events of the succeeding sum are again tested from left to right until a logic value for the sum is determined. If a switching function is not yet evaluated, the process is iterated until a switching function is evaluated. All event test paths conclude when the switching function is evaluated.

The ordering part of the test path efficiency algorithm is designed for sequences generated by having events proceed from left to right in the switching function. It is possible to have an equivalent algorithm that has event tests that proceed from right to left in the switching function. One merely reverses the ordering of the sums and the ordering of the events within the sums to arrive at an equivalent algorithm. Two other equivalent algorithms are possible by minimizing to a sum of products algorithm. One sum of products algorithm has sequences that proceed from left to right in examining the switching function events and the other would proceed from right to left in examining the switching function events.

It is not imperative to use for "And Then" for all conjunctive operations. Because of the logical identity with "And", no errors result when using them in the above test path efficiency algorithm to separate the sums. However, a use of "And Then" in lieu of "And" ensures that the algorithm's reduction of tested events is preserved.

An example of the test path efficiency algorithm will now be provided. In the interest of expediency, assume the following switching function represents a transformation of a Boolean expression (result of step 1):

$$g = X_1 X_2 X_3 + X_1 X'_3 X_4 + X_1 X_2 X'_3 + X'_2 X'_3 X_4 + X_1 X'_3 X'_4 + X_2 X'_3 X_4$$

Figure 20:
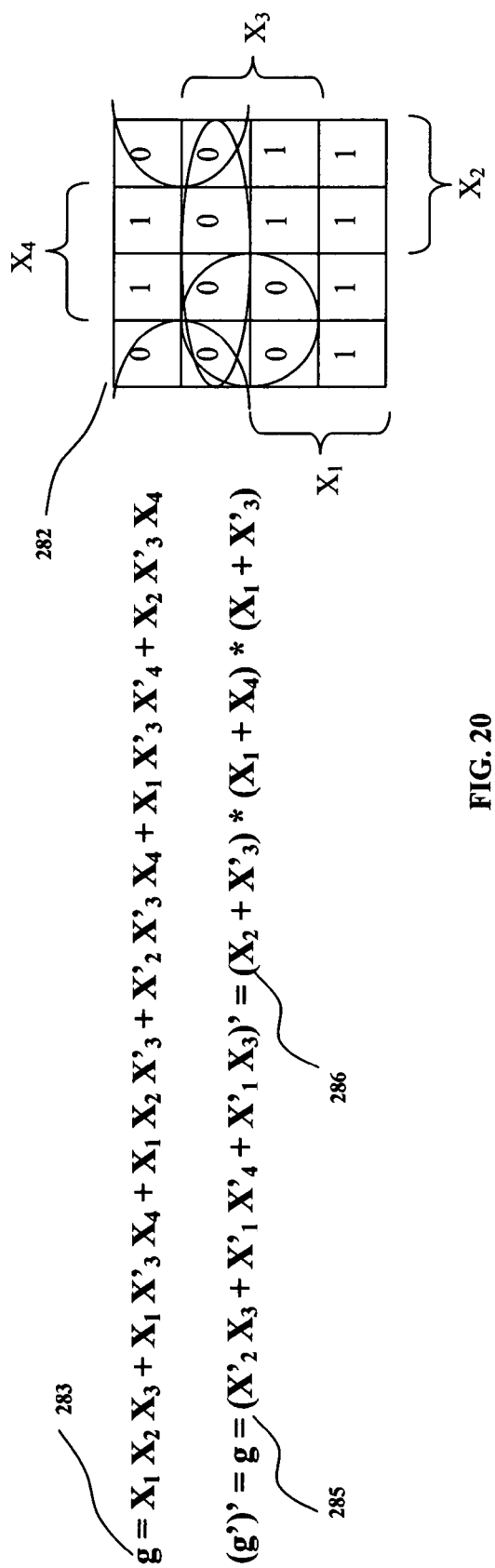
FIG. 20 shows the Karnough map to minimize.

Because software programs of Quine-McCluskey minimization method exist, the interactive compiler would minimize "g" with such a method. However, this method is very laborious when performed manually. Hence, the Karnough map method will be employed for the minimization procedure example. The Karnough map cell entries 282 of FIG. 20 represent the value of the preceding switching function (g) 283 for the various variable values. The negative of "g" (i.e., g') has opposite values. Hence, it can be formed by obtaining the sum of products expression from the map's "0" entries 282 (result of step 2) 285:

$$g' = X'_2 X_3 + X'_1 X'_4 + X'_1 X_3 +$$

Applying De Morgan's theorem yields (result of step 3) 286:

$$(g')' = g = (X'_2 X_3 + X'_1 X'_4 + X'_1 X_3)' = (X_2 + X'_3) * (X_1 + X_4) * (X_1 + X'_3)$$

The counts of the event variables appearances are (result of step 4): $X_1$ is 2, $X_2$ is 1, $X'_3$ is 2, and $X_4$ is 1.

Rearranging the order of events in each sum according to the number of their appearances yields (result of step 5):

$$g = (X'_3 + X_2) * (X_1 + X_4) * (X_1 + X'_3)$$

All sums contain two events. Hence, no rearrangement according to the number of events within a sum is necessary (step 6). The counts of the variables appearances within the sums are (result of step 7): $(X'_3+X_2)$ is 3 (1+2), $(X_1+X_4)$ is 3 (2+1), and $(X_1+X'_3)$ is 4 (2+2).

Rearranging the sums and the appearances of the variables in the sums yields (result of step 8):

$$g=(X_1+X'_3)*(X'_3+X_2)*(X_1+X_4)$$

The above test path efficiency algorithm is the first of two algorithms for evaluating an Invoke facility service's Boolean expression. An inverted binary tree (i.e., the root is at the top and said to be in level 0) will represent the event test paths that an Invoke facility service utilizes to evaluate a Boolean expression. A node of the tree corresponds to an event in a path. Directed tree branches between nodes indicate the succession of events in a path. The level of each successive event node is said to be at one higher level; i.e., the root is at level 0, its next successive event node is at level 1, etc. Each node (event) connects to two directed branches, where each branch corresponds to one of the two possible test results for the event ("True" or "False"). The tree represents the schema of event test path sequences that will be deployed by the wireless mobile terminal to evaluate the Invoke facility service's Boolean expression. The test path efficiency algorithm herein invented provides the criteria for designing the schema of sequences with a commensurate reduction in event value determinations.

A criterion to generate the tree is that events should not appear more than once in a path's sequence. The wireless mobile terminal traces a path according to the event value when a test determines that it is "True" ($Y_{ij}=1$) or it is "False" ($Y_{ij}=0$). After this value is established, the event no longer needs to be examined during a sequence. Another tree generating criterion evolves from the consequence of a "True" ($Y_{ij}=1$) result. When an event is "True", every sum containing this event will be "True" ($S_i=1$). This signifies that no sums containing this event need to have its events examined. Recall that the contradiction of an event is also an event. Hence, the above applies to events expressed as contradictions; i.e., are preceded by "Not".

A leaf, which indicates the Boolean expression value, exists after the final branch of a path sequence of events. For the tree to be complete, every event test path must continue to a leaf. The succession of tree nodes herein will correspond to the sequence that results from the test path efficiency algorithm and implied by the product of sums switching function.

A second algorithm, necessary for establishing the schema to evaluate an Invoke facility service's Boolean expression, generates an event test path tree (event tree algorithm). The event tree algorithm will now be described. The event tree algorithm iteratively utilizes the test path efficiency algorithm. For convenience, the switching function notation is also used for the event tree algorithm. That is, the final step of the test path efficiency algorithm (9. Transform the resultant switching function into the Boolean expression of the Invoke facility service . . . ), is not deployed until the event tree algorithm is completed. After each conclusion of the test path efficiency algorithm, the left most (first) event of a reduced switching function becomes a node of the event test path tree. A reduced switching function is obtained by substituting a branch value into a source switching function, revising the resultant switching function according to the branch value, and then deploying (all but step 9) of the test path efficiency algorithm.

The event tree algorithm begins with the switching function obtained from the first use of the test path efficiency algorithm. This switching function is associated with the root node event of the tree. The test path efficiency algorithm is repeated for each subsequent event node to determine a reduced expression associated with the subsequent event node. Say for event $E_i$, a "True" ($E_i=1$) value branch is inserted into the tree being produced.

This value is then inserted into a current switching function associated with event $E_i$. A resultant switching function is evaluated as consequence of substituting $E_i=1$ in the switching function. A new (reduced) switching function is formed from the $E_i=1$ substitution and the test path efficiency algorithm. The first event of this new expression becomes the next event node that is subtended by the "True" branch. The same process is used for the event $E_1$ is "False" ($E_i=0$) branch. That is, a substitution of $E_i=0$ into a switching function is made, an evaluation from this substitution follows, and then the test path efficiency algorithm is repeated. The first event of the reduced switching function becomes the node between $E_i$ and the branch for $E_i=0$. The substitution of $E_i=1$ ($E_i=0$) can lead the elimination of all event variables. This indicates a leaf has been reached for which the switching function has a "1" ("0") value and the iterations of the two algorithms terminate for this path. The two algorithms end when all paths terminate with a leaf.

The event tree algorithm for generating the event test path tree now follows:

1. Perform the test path efficiency algorithm to form the sum of products switching function (for convenience, step 9 of the test path efficiency algorithm is excluded until the tree is completed).
2. Make the left most (first) event of the first sum into a tree root node and associate the switching function with the root node (this event is at level 0).
3. Subtend a "True" (1) branch from the preceding first event and substitute this value for the first event's appearances in the switching function.
4. Operate on the switching function following the substitutions to form a modified switching function.
5. If the modified switching function's value has become 1 ("True"), a leaf of the tree has been reached.
6. Otherwise, perform step 4 through step 8 of the test path efficiency algorithm on the modified switching function and associate the resultant reduced switching function with the node at the end of the "True" (1) branch.
7. Assign the first event of the first sum, in the associated reduced switching function of step 6 above, to the tree node (this event is at one higher numbered level than its connected event node).
8. Return to the first event node of step 2 above and extend a "False" (0) branch from the preceding first event and substitute this value for the first event's appearances in the switching function.
9. Operate on the switching function following the substitution to form a modified switching function.
10. If the modified switching function's value has become 0 ("False"), a leaf of the tree has been reached.
11. Otherwise, perform step 4 through step 8 of the test path efficiency algorithm on the modified switching function and associate the resultant reduced switching function with the node at the end of the "False" (0) branch.
12. Assign the first event of the first sum, in the associated reduced switching function of step 11 above, to the tree node (this event is at one higher numbered level than its connected event node).
13. Repeat step 3 through 12 above for all events at the current level.
14. If all branches have terminated in a leaf, the algorithm is completed.

15. Otherwise, consider all of the above newly created nodes as roots of sub-trees and repeat step 3 through step 14 for each sub-tree.

An example of applying the event tree algorithm will now be presented. Consider the following product of sums switching function that is the result of step 1 of the event tree algorithm:

$$g=(X_1+X'_3)*(X'_3+X_2)*(X_1+X_4)$$

According to step 2, as shown in FIG. 21, $X_1$ is to be the root node 287 at level 0. Steps 3, 4, 5, and 6 indicate: a "True" (1) branch 288 is to subtend from $X_1$, the assignment $X_1=1$ is to be substituted into "g" 289, and the test path efficiency algorithm is to be applied to the reduced "g" ($g_{11}$) switching function. These steps result in the following switching function 290 to be associated the level 1 node at the end of the subtended branch:

$$g_{11}=(1+X'_3)*(X'_3+X_2)*(1+X_4)=1*(X'_3+X_2)*1=(X'_3+X_2)$$

Applying step 7 to $g_{11}$, results in having $X'_3$ 292 the level 1 node 293. Also, $X'_3$ represents a sub-tree root and the prior steps are iterated in the manner done for the first root ($X_1$).

Applying steps 8, 9, 10, and 11 results in the following switching function 295:

$$g_{12}=(0+X'_3)*(X'_3+X_2)*(0+X_4)=X'_3*(X'_3+X_2)*X_4=X'_3*X_4*(X'_3+X_2)$$

Observe that $X_4$ is moved in the above equation for $g_{12}$. This is a consequence of the test path efficiency algorithm (step 11). Applying step 12 to $g_{12}$, results in having $X'_3$ 296 the level 1 node 293. Also, $X'_3$ represents a sub-tree root and the prior steps are iterated in the manner done for the first root ($X_1$).

The iteration of steps 3, 4, and 5 on the sub-tree 292, with the switching function $g_{11}$, results in a $g=_1$ leaf 297. The iteration of steps 8, 9, 10, 11, and 12 on the sub-tree 292, with the switching function $g_{11}$, yields a level 2 node 299 for the event $X_2$.

The iteration of steps 3, 4, and 5 on the sub-tree 296, with the switching function $g_{12}$, yields a level 2 node 300 for the event $X_4$. The iteration of steps 8, 9, 10, 11, and 12 on the sub-tree 296 with the switching function $g_{12}$ yields a $g=0$ leaf 302. The iterations algorithm's steps on the two level 2 nodes, $X_2$ 299 and $X_4$ 300, all yield the terminating leaves 303 304 305 306 shown in FIG. 21.

As indicated earlier, each wireless mobile terminal CWS app must have its own unique invocation means and no event test path can be included as part of another CWS app's entire event test path. That is, the complete or partial event test paths of a CWS app's {OptionalEventExpression} cannot result in an evaluation of a Boolean expression assigned to some other CWS app. Otherwise, CWS app invocation confusion will exist. One means, to ensure unique CWS app invocation, is to have the first examined event (beginning of each event test path) uniquely assigned to a single CWS app such that no invocation occurs if the event is "False" (0). This implies that a $g=0$ leaf exists at the end of the "False" (0) branch for the root event and only the "True" (1) branch leads to an eventual $g=1$ leaf. The switching function of FIG. 21 violates this requirement. As can be seen, the "False" (0) branch, subtended from the root node $X_1$, connects to the event node $X'_3$. Nevertheless, it is still possible to comply with the need for uniqueness. This is achieved by extending the root node requirements to the next higher numbered level event node. That is, 1) the next event is to be unique to a CWS app and 2) the "False" (0) branch stemming from next event node, if possible, is to conclude with a $g=0$ leaf. If requirement 2) is not satisfied because the "False" (0) branch subtends to another event node, then the two requirements are applied to the next event node.

The rational for avoiding invocation confusion is based on the need for some events (or their negatives) to occur (be "True") for invocation ($g=1$). A product of sums form inherently implies a set of events required to occur for a $g=1$ conclusion. Furthermore, when the final event of an event test path is "False", then $g=0$. The above algorithm requires that the succession of events, starting with the root event, are all unique when a subtended "False" branch results in a succeeding event; i.e., not in a $g=0$ leaf result. Therefore, at least one unique event must occur to reach a $g=1$ leaf. Because this unique event applies to only one CWS app, no other CWS app can be invoked while testing a particular Boolean expression.

The test path efficiency algorithm, in combination with the event tree algorithm, are employed by the interactive compiler to produce the event test path tree. The CWS app builder does not need to interact with the interactive compiler to produce the event test path tree. Also, after the event test path tree is completed, the interactive compiler will perform step 9 of the test path efficiency algorithm (Transform the resultant switching function into the Boolean expression of the Invoke facility service, using "And Then" between the sums within the product of sums expression) to complete the schema for evaluating a CWS app's Boolean expression.

The tree of FIG. 21 is redrawn in FIG. 22 without the information pertaining to the event tree algorithm procedure. The FIG. 22 tree has 5 nodes 307, 10 branches 308 (always twice as many branches as nodes for a binary tree), and 6 leaves 310. The first node tested is the event $X_1$, then the event $X'_3$. Depending upon the results of the first two tests, event $X_2$ or event $X_4$ may or may not be tested.

Not all trees will yield the value of the Boolean expression for "g" as quickly as that implied in FIG. 22. For example, the "g" event test paths implied by FIG. 23 are far less efficient, while still yielding correct results for the same switching function. The event test paths were either haphazardly selected or designed by constraints other than event test path efficiency. The quantity of event nodes 311 in FIG. 23 is 13, 26 branches 312, and 14 leaves 315; more than twice that of FIG. 22 for each parameter.

A quantitative measure of event test path reduction efficiency ($\eta$) will now be defined. The two limits for efficiency are 0% and 100%. When there is no improvement of the event test paths, the measure's result is $\eta=0\%$. Also, the measure concludes that when there are N events in the Boolean expression, an event test path sequence of all N events possesses no event test path reduction. The ideal event test path reduction will not require any events to be examined; for which the measure concludes $\eta=100\%$. The ensuing equation for $\eta$ possesses the above quantitative measure's properties.

As seen in FIG. 22 and FIG. 23, the number of event tests, from the root to a leaf, varies from one sequence to another. In order to evaluate $\eta$ for a tree, a statistical basis will be employed. Assume an equally likely situation for all possible sequences. Having this a'priori assumption permits the statistical average:

$$E_{ave} = \left(\sum_{i=1}^{S} E_i\right) / S$$

Where:

$E_{ave}$ is the statistical average number of events to be tested for all sequences of a tree.

And: S is the number of unique event test path sequences in a tree.

And: $E_i$ is the number of events to be examined in the unique sequence "i".

The equation to satisfy the bounds for 0% and 100% and the other quantitative measure's properties is:

$$\eta_E = 1 - (E_{ave}/N)$$

Where:

$\eta_E$ is the event test path reduction efficiency of a tree.

And: $E_{ave}$ is the statistical average number of events to be tested for all sequences of a tree.

And: N is the number of unique events to be tested for the Boolean expression.

In FIG. 22 and FIG. 23, the number of unique events to be tested is 4 (N). There are 3 unique event test paths in FIG. 22: $(X_1, X'_3)$, $(X_1, X'_3, X_2)$, and $(X_1, X'_3, X_4)$. The number of events examined for these sequences are 2, 3, and 3, respectively. The average number of events is therefore 2.67 from (2+3+3)/3. The tree efficiency is therefore 33.3% from 1−(2.67/4).

There are 4 unique event test paths in FIG. 23: $(X_2, X'_3, X_4)$, $(X_2, X'_3, X_4, X_1)$, $(X_2, X_4, X_1)$, and $(X_2, X_4, X_1, X'_3)$. The number of events examined for these sequences are 3, 4, 3, and 4, respectively. The average number of events is therefore 3.5 from (3+4+3+4)/4. The tree efficiency is therefore 12.5% from 1−(3.5/4). The efficiency of the FIG. 22 tree is nearly three times better than the tree in FIG. 23.

The test path efficiency algorithm, to improve the efficiency of evaluating a Boolean expression, establishes an ordering of events (or their negatives) within sums and an ordering of the sums in the product function. These orderings are based on how quickly the sums can be evaluated (ordering of the sums) and how many sums will be influenced by an event determination (ordering of events (or their negatives) within sums). No consideration was given to extenuating other factors that may influence the likelihood that an event (or its negative) or a sum may occur. That is, all events and commensurate sequences were considered equally likely. Extenuating factors may play a significant role; i.e., some events may rarely occur and thereby influence the efficiency. Hence, the final tree to be deployed by a wireless mobile terminal should be influenced by extenuating factors, as well as the above test path efficiency algorithm. This is especially encouraged when ties result from the test path efficiency algorithm. Consider for instance the previously broached example:

$$g = (X_1 + X'_3)*(X'_3 + X_2)*(X_1 + X_4)$$

According to the test path efficiency algorithm, the sum $(X'_3 + X_2)$ and the sum $(X_1 + X_4)$ are tied; i.e., the two sums contain exactly the same number of events (two each) and the totals of the number of times the events of the sums appear in the expression are the same (2+1=3 each). Hence, there exists no guidance from the test path efficiency algorithm as to the ordering of these two sums. This tie might be broken by extenuating factors; e.g., physical conditions make event $X'_3$ more likely to occur than $X_1$ or the processing to test event $X'_3$ is faster than testing event $X_1$. In this example, the switching function with a juxtaposition of the sum $(X'_3 + X_2)$ with the sum $(X_1 + X_4)$ has efficiency equal to the original efficiency, when the test path efficiency algorithm is deployed. Consequently, the ordering of these two sums is irrelevant without consideration of extenuating factors.

Another measure of event test path tree complexity is with respect to its number of leaves (L), which is the quantity of tree paths. The ideal tree has two paths; one for which the Boolean expression has a "True" evaluation and the other for which the Boolean expression has a "False" evaluation. The leaf efficiency of a tree is therefore defined as:

$$\eta_L = 2/L$$

Where: $\eta_L$ is the leaf efficiency of a tree.

And: L ($\geq 2$) is the number of tree leaves (event test paths).

Observe that for L=2, $\eta_L$=100% and $\eta_L$=0% for L at infinity. The overall tree efficiency ($\eta_T$) is defined as:

$$\eta_T = \eta_L * \eta_E$$

For FIG. 22, the number of leaves 306 (L) is 6. Hence, $\eta_L = 2/6 = 33.3\%$. Previously, $\eta_E$ was computed to also be 33.3%. The overall tree efficiency is therefore $\eta_T = 11.1\%$. For FIG. 23, which represents the same Boolean expression, the number of leaves 315 (L) is 14. Hence, $\eta_L = 2/14 = 14.3\%$. Previously, $\eta_E$ was computed to also be 12.5%. The overall tree efficiency is therefore $\eta_T = 1.8\%$. Consequently, the event test path tree of FIG. 22 has on overall tree efficiency about 6 times more than the event test path tree of FIG. 23.

More Examples of Safety Enhancing Boolean Expressions

Further examples of safety enhancing Boolean expressions will now be examined. Consider a portable wireless mobile terminal CWS app that is to be voice invoked by the parameter named AppVoiceCommand. Because the wireless mobile terminal is portable, it is designed to sense when it is in a vehicle's cradle (i.e., InCradle) It is assumed here that being in its cradle is important for the wireless mobile terminal to properly sense the other events, such as DriverVoice (restriction 2. "A wireless mobile terminal detected to be in proximity of the vehicle driver's seat; e.g., a Bluetooth or other radio wave position detection via a high directivity dashboard antenna."). To use the wireless mobile terminal outside of the vehicle (e.g., in one's office or while walking), the wireless mobile terminal is designed to detect when the vehicle's engine is running (i.e., EngineRunning). That is, if the vehicle's engine is running, it must reside in its cradle; otherwise it can be used outside of its cradle. The wireless mobile terminal can also determine when it is moving (i.e., VehicleMoving); which is to restrict invocation by the driver. However, a passenger is permitted to invoke the CWS app with an AppVoiceCommand, irrespective of the EngineRunning or VehicleMoving truth values. Hence, the wireless mobile terminal must determine when the driver issues the voice command (i.e., DriverVoice) and restrict invocation when the VehicleMoving is "True". The resultant Boolean expression is:

{AppVoiceCommand And Then ((Not EngineRunning) Or (InCradle And ((Not VehicleMoving) Or (Not DriverVoice))))}

In FIG. 24 a compressed truth table 318 of the Boolean expression 321 is shown. The entire truth table contains 32 rows, because of the 5 binary variables 324. However, only 11 rows result in a "True" Boolean expression. Eight of these rows are represented by the first row 327 of FIG. 24 by virtue of the "True/False" entries for three of the events 324. That is, the first row of FIG. 24 manifests that the three events of InCradle, "Not VehicleMoving", and "Not DriverVoice" can either be "True" or "False" with the same Boolean expression result. Three binary variables result in 8 possibilities.

The test path efficiency algorithm to reduce the quantity of tested events will now be applied to the example:

{AppVoiceCommand And Then ((Not EngineRunning) Or (InCradle And ((Not VehicleMoving) Or (Not DriverVoice))))}

The transformation of event representations to switching algebra symbols will be:
V represents AppVoiceCommand
W represents "Not EngineRunning"
X represents InCradle
Y represents "Not VehicleMoving"
Z represents "Not DriverVoice"

The transformation yields the following switching function:

$$g=V*(W+(X*(Y+Z)))$$

The Karnough map 330 for this function is shown in FIG. 25. The result of the Karnough map (FIG. 25) minimization yields 333:

$$g=(g')'=(V'+(W'*Y'*Z)+(W'*X'))'=V*(W+Y+Z)*(W+X)$$

Reordering the variables in the sums according to the test path efficiency algorithm yields:

$$g=V*(W+X)*(W+Z+Y)$$

Hence, the preceding equation 336 is prepared to determine the event test path tree (see FIG. 26) and its efficiency. The event test path reduction efficiency ($\eta_E$) of the FIG. 26 sequence tree is 33.3% (1−(20/6)/5). The leaf efficiency ($\eta_L$) of the tree is also 33.3% (⅔). The overall tree efficiency is therefore $\eta_T$=11.1%.

The next example is when the wireless mobile terminal is portable and does not need to rest in a vehicle's wireless mobile terminal cradle to operate. That is, InCradle is no longer an event parameter. Absence of a cradle places limits on how the events EngineRunning, VehicleMoving, Driver Voice, and ManufacturerDefault are determined. For example, placing a wireless mobile terminal in a cradle permits a direct (non-radio wave) communication system between the vehicle's processor and the wireless mobile terminal's processor, which is a more economical implementation.

The remaining event parameters can be achieved when appropriate sensatory mechanisms are implemented within the wireless mobile terminal. For instance a radio wave, generated by the vehicle, can send the signal EngineRunning. Likewise, the vehicle's speedometer or the wireless mobile terminal's GPS system can send the signal VehicleMoving. Hence, these parameters can be used when a vehicle and a wireless mobile terminal provide them. For voice actuated CWS apps, Driver Voice is also possible by recording the driver's AppVoiceCommand. When manual operations are necessary, such as for texting, it is possible to detect that the driver is holding the wireless mobile terminal. For instance, a radio wave (e.g., a Bluetooth signal) can be sent from a highly directive antenna residing in the driver's dashboard. The parameter name DriverHasSmartphone will be later used to indicate that the driver is holding the wireless mobile terminal.

The resultant Boolean expression for voice actuation of a portable wireless mobile terminal without using a vehicle cradle is shown below:

{AppVoiceCommand And Then ((Not EngineRunning) Or (Not VehicleMoving) Or (Not Driver Voice))}

The FIG. 27 truth table 339 of the preceding Boolean expression 342 and the event test paths tree appears in FIG. 28. The switching function parameter transformation labels are the same as before 345. Note that X, which represents In Cradle, does not appear. The event test path reduction efficiency ($\eta_E$) of the tree in FIG. 28 is 30%. The leaf efficiency ($\eta_L$) of the tree is 40%. The overall tree efficiency is therefore $\eta_T$=12%.

Consider now wireless mobile terminal CWS apps that are manually and not voice actuated. Because AppVoiceCommand is not used for the manual operations case, the parameter name ManufacturerDefault will be used in its place. This is to represent whatever manual operation is used to begin CWS app invocation, as implemented by the manufacturer; e.g., scrolling though a list of icons that represent CWS apps and then pointing to the one desired. The resultant Boolean expression for manual operations of a portable wireless mobile terminal without using a vehicle cradle is shown below:

{ManufacturerDefault And Then ((Not EngineRunning) Or (Not VehicleMoving) Or (Not DriverHasSmartphone))}

The truth table for the preceding expression is the same as that in FIG. 27, except that the event ManufacturerDefault replaces AppVoiceCommand. Consequently, the two sequence trees are isomorphic and efficiencies are equal ($\eta_E$=30%, $\eta_L$=40%, $\eta_T$=12%).

Each event to be sensed will add to the cost of the wireless mobile terminal and to the vehicle. To reduce cost, consider economy versions (fewest events to test) that sense either EngineRunning or VehicleMoving, but not both. Four possibilities exist, each with certain deficiencies. The four possible Boolean expressions are shown below. Their truth tables are shown in FIG. 29, FIG. 30, FIG. 31, and FIG. 32, respectively.

{AppVoiceCommand And Then (Not EngineRunning)} 348

{ManufacturerDefault And Then (Not EngineRunning)} 351

{AppVoiceCommand And Then (Not VehicleMoving)} 354

{ManufacturerDefault And Then (Not VehicleMoving)} 357

The four Boolean expressions are all in a minimized form; i.e., no minimization is possible. The efficiencies are $\eta_E$=16.7%, $\eta_L$=66.7%, and $\eta_T$=11.1% for each of these four Boolean expressions.

The main disadvantage of the preceding Boolean expressions containing EngineRunning is the obvious of needing to stop the vehicle and turning off the engine. This needs to be done, even with a passenger present to operate the wireless mobile terminal. Additionally, if the mechanism to test for EngineRunning, is a wireless mobile terminal microphone that tests for the sound of a vehicle's running engine, the sounds of passing vehicles on a road can generate an erroneous "True" for this event.

The main disadvantage of the preceding Boolean expressions containing VehicleMoving is the obvious need to stop the vehicle. This needs to be done, even with a passenger present to operate the wireless mobile terminal. Additionally, if the mechanism to test for VehicleMoving, is a wireless mobile terminal GPS system that tests for the wireless mobile terminal speed, this event parameter can preclude invocation while the operator is jogging or riding a bicycle.

Expanded Use of the Invoke Facility Service

Recall that a CWS app can be a component service (CS) of a more elaborate CWS app. Each CWS, when built, begins with an Invoke facility service. Hence, the CWS that is a CS of another CWS will contain an internal Invoke facility service. The internal Invoke facility service within a CS is ignored and the CS commences execution immediately after its preceding CS completes its execution. The interactive graphical compiler has the internal Invoke facility service superseded by an unconditional invocation (no Boolean expression). It achieves this by considering the graphed arrow, which interconnects two successive CS, as an indication to supersede the internal Invoke facility service with an unconditional invocation of the succeeding CS. However, should it be desirable to have the successor CS depend upon certain events for invocation, an Invoke facility service can be placed as an intermediary CS between two successive CS. That is, CS execution conditional upon the occurrence of events can be dispersed throughout a CWS app.

Although the Invoke facility service has been designed for use with the graphical, interactive compiler to build CWS type apps, the syntactical definition permits a more general usage. The syntactical definition can be employed to compose a function in virtually any computer language; e.g., C, C++, Java. By having the Invoke facility service function execute prior to other operations of a C language or C++ language wireless mobile terminal CWS app, it can enhance safety by restricting invocation of CWS apps that create dangerous situations in a moving vehicle. A similar conclusion can be made for Invoke facility service applets as applied to wireless mobile terminal CWS apps written in Java.

What I claim as my invention is:

1. A process, residing in the memory of a Smartphone or cellular phone, that is used to invoke a compound wireless mobile communication service also known as a Smartphone app or its diminutive app, by using a Boolean expression of events, which when a combination of events that either occur or events that do not occur result in a "True" evaluation of the Boolean expression, the aforementioned compound wireless mobile communication service will commence its execution, where the Boolean expression is contained within a service termed Invoke facility service; such that the builder of an Invoke facility service associated the said Invoke facility service with the aforementioned compound wireless mobile communication service; wherein the contained Boolean expression is built with events interconnected by the logical connectives of "And", "Or", "Not", "If X, Then Y", "And Then"; such that the negation operation "Not" establishes a contradictory event, signifying that an event and its contradictory event are both considered to be events, where if the event did not occur (is "False"), then its contradictory event did occur (is "True") and conversely; and such that "And Then" is a conjunctive connective, meaning it has the same logical operation as "And"; whereas, "And Then" includes a sequential implication for testing the occurrence of events; as illustrated in the partial Boolean expression "PrecedingExpression And Then FollowingExpression", for which "PrecedingExpression" and "FollowingExpression" are logic expressions each containing one or more events, wherein the events within "PrecedingExpression" are tested for occurrences prior to testing occurrences of the events within "FollowingExpression"; where both logic expressions contain events or their contradictory events that are observable when tested by the wireless mobile terminal; such that events observed by or linked to the Smartphone or cellular telephone, are of the following event types or their contradictions: A) audio events such as a) a vehicle engine running, b) glass being broken, c) an automobile accident, d) a child crying, e) an explosion, f) the sound of thunder, g) the sound of gushing wind, h) the sound of falling rain, i) the sound of falling hail, j) a person's scream, k) a dog barking, l) screeching tires from excessive vehicular braking, m) an alarm siren, n) a gunshot, o) footsteps, p) a turning door knob, q) a door closing; B) visual events such as a) the retina of an eye, b) a door opening, c) a license plate number, d) a fire, e) an explosion, f) a bolt of lightning, g) a bar code, h) a person's face, i) an automobile, j) a gun, k) an animal; C) electromechanical system communication links that provide status data events as a) heart pacer malfunction occurred, b) blood monitor sensed excessive glucose level, c) insulin pump level below threshold, d) epileptic seizure sensed, e) stroke precursor symptom(s) observed, f) heart rate is dangerous, g) temperature level above threshold, h) carbon monoxide level dangerous, i) smoke level suggests fire, j) vehicle engine is running, k) vehicle speed is above a set maximum, l) vehicle brake fluid low, m) vehicle engine malfunction warning, n) accelerometer sensed impact, o) malfunctioning heating system at home, p) home alarm system is triggered, q) breathing support system operating unsatisfactorily, r) password protection is violated, s) credit card charge beyond maximum, t) bank transfer beyond maximum, u) check cashed beyond maximum, v) sale made, w) purchase made.

2. The method of claim 1, wherein further improvements include Invoke facility services as Component Services of a compound wireless mobile communication service, such that Invoke facility services can appear anywhere and multiple times within a compound wireless mobile communication service and thereby also control the internal execution of other Component Services within a compound wireless mobile communication service.

3. The method of claim 1, wherein further improvements include having events initially assigned a flag of "Untested"; meaning that no knowledge exists as to whether an event has occurred or an event has not occurred, which signifies a test needs to be made in order to provide a "True" value, meaning the event has occurred, or a "False" value, meaning the event has not occurred, and having the event values reset to "Untested" after the elapsed time from an event's test exceeds the compound wireless mobile communication service builder's prescribed time interval; wherein the Boolean expression computation cannot proceed when an "Untested" event is encountered and the event must be tested for its value before continuing the Boolean expression evaluation.

4. The method of claim 3, wherein further improvements include a testing repetition rate, prescribed by the compound wireless mobile communication service builder, for observing whether events have occurred for those events designated as "Sustained", meaning the event occurrence must persist from the time first observed and then for each repeated observation for a "True" value, which continues beyond invocation of the Compound Wireless Service app and onto the entire execution of the Compound Wireless Service app, but ends when the Compound Wireless Service app execution ends; whereas events designated as "Momentary", meaning the event occurrence only needs to be observed once for a "True" value, retain their values beyond invocation of the Compound Wireless Service app and onto the entire execution of the Compound Wireless Service app without repeated tests, whereby the "Sustained" event parameters and the "Momentary" event parameters are accessible throughout the entire execution of a Compound Wireless Service app.

5. The method of claim 1, wherein the Boolean expression is evaluated according to a schema provided by: a) an inverted binary tree, termed event test path tree, having its root node at the top and said to be in level 0; b) each node, including the root node, of the tree represents an event of the Boolean expression; c) two branches subtend from an event node, wherein one branch represents a "True" value for its event from which the branch is subtended and the other branch represents a "False" value for its event from which the branch is subtended; d) each branch is directed to the next event node of the Boolean expression to be considered and increases the subsequent event level by an increment of 1; e) a sequence of nodes and branches, termed an "event test path", is concluded at a leaf where the Boolean expression possesses a value of either "True" or "False"; such that the negation operation "Not" is represented by a contradictory event, meaning that an event and its contradictory event are both events, where if the event did not occur (is "False"), then its contradictory event did occur (is "True"), and conversely.

6. The schema of claim 5, whereby its event test path tree is used to guide an Invoke facility service's evaluation of its Boolean expression according to the values of the tested events and in the sequence of an event test path; which originates at the event root node and continues until a leaf representing the Boolean expression value is reached, wherein encountered "Untested" events are first tested for occurrence before proceeding farther in the event test path and such that the event test path sequence is according to the appearance of the logical connective "And Then" in the Boolean expression, where "And Then" has the same logical operation as "And"; whereas the "And Then" sequential implication for testing the occurrence of events is as illustrated in the partial Boolean expression "PrecedingExpression And Then FollowingExpression", for which "PrecedingExpression" and "FollowingExpression" are logic expressions each containing one or more events, wherein the events within "PrecedingExpression" are tested for occurrences prior to testing occurrences of the events within "FollowingExpression"; where both logic expressions contain events or their contradictory events that are observable when tested by the wireless mobile terminal.

7. The method of claim 1, wherein a wireless mobile terminal timing event is specified by a range of time, identified by a start time and an end time pair, having a combination of time of a day, days of a week, weeks of a month, months of a year, and years; such that an event has occurred when the time is either outside the specified range of time or the contradiction of not outside the specified range of time.

8. The method of claim 7, wherein further improvements include the temporal tolerance embodiment of $\Delta T$ for time values provided by the Compound Wireless Service interactive graphical compiler to the Compound Wireless Service app builder; such that an indeterminate temporal region of $T-\Delta T \leq t \leq T+\Delta T$ is identified; to avail the possibility of providing a warning notification to a user when a time measurement is within the indeterminate temporal region, during the execution of the Invoke facility service.

9. The method of claim 1, wherein events that are either sent or received by the wireless mobile terminal include: a) an audio signal that does not match an audio signal stored by the builder in the wireless mobile terminal; b) an audio signal's address that does not match an address stored by the builder in the wireless mobile terminal; c) a video signal that does not match a video signal stored by the builder in the wireless mobile terminal; d) a video signal's address that does not match an address stored by the builder within the wireless mobile terminal; e) a text message that does not match a text message stored by the builder in the wireless mobile terminal; f) a text message's address that does not match an address stored by the builder in the wireless mobile terminal; g) a photograph that does not match a photograph stored by the builder in the wireless mobile terminal; h) a photograph's address that does not match an address stored by the builder in the wireless mobile terminal; i) an e-mail's subject that does not match an e-mail's subject stored by the builder within the wireless mobile terminal; j) an e-mail's address that does not match an e-mail's address stored by the builder within the wireless mobile terminal; k) an Internet address that does not match an Internet address stored by the builder in the wireless mobile terminal; l) a "caller ID" that does not match a "caller ID" stored by the builder within the wireless mobile terminal; m) an Internet signal with an address that does not match an Internet signal with an address stored by the builder within the wireless mobile terminal; n) a wireless service provider signal that does not match a wireless service provider signal stored by the builder within the wireless mobile terminal; o) the date of an e-mail that does not match the date of an e-mail stored by the builder within the wireless mobile terminal; p) a transducer signal value that does not match a transducer signal value stored by the builder within the wireless mobile terminal.

10. The method of claim 1, wherein the Invoke facility service possesses the enhancement parameters: (OptionalEventDurationList)—an optional list of triples; where each triple designates 1) an event name, 2) its value of "Sustained" or "Momentary", 3) the testing repetition interval for a "Sustained" event or a null entry for a "Momentary" event; (OptionalObservationRepetitionInterval)—a pair that specifies two time intervals: 1) the interval between successive evaluations the Boolean expression parameter {OptionalEventExpression} and 2) the time interval to reset all event test values to an "Untested" flag; (OptionalEventFailureNotification)—a means to provide a notification when an event test path results in a "False" evaluation of a wireless mobile terminal Compound Wireless Service app's Invoke facility service Boolean expression; such that the notification can be visually displayed on the wireless mobile terminal and/or by a recorded audio message; where the manner of presentation and precise representation are at the discretion of the Compound Wireless Service app builder; (OptionalEventPathpata)—represents the potential event test paths to evaluate the Compound Wireless Service app's Boolean expression; in the schema of an inverted, binary, directed tree; consisting of set of triples and a set of pairs, for which the triples define the tree, whose nodes are pointers to the events and two subtended branches represent the "True" or "False" possibilities for an event node; such that the end nodes are leaves that point to pairs, for which each pair contains the Boolean expression value (either "True" or "False") and a label for the traced event test path leading to a leaf; (OptionalEventFailureNotificationSchema)—is a set of pairs, of the form (event test path label, notification) or (event test path label, notification pointer), to provide the failure notification parameter value to be displayed by the (OptionalEventFailureNotification) parameter output; after acquiring the event test path label from the (OptionalEventNotificationData) parameter, which specifies an event test path label from the traced event test path, to point to the notification part of the pair; such that the notification or the notification pointer can be provided to the (OptionalEventFailureNotification) parameter, and thereby identify the notification to be displayed by the output (OptionalEventFailureNotification).

* * * * *